(12) United States Patent
Tanigawa et al.

(10) Patent No.: US 9,922,301 B2
(45) Date of Patent: Mar. 20, 2018

(54) INFORMATION DISPLAY METHOD FOR STORE WORK RELATING TO LIGHTING CONTROL SYSTEM, AND LIGHTING CONTROL METHOD

(71) Applicant: Panasonic Intellectual Property Corporation of America, Torrance, CA (US)

(72) Inventors: Toru Tanigawa, Osaka (JP); Masaki Takahashi, Osaka (JP); Kento Ogawa, Osaka (JP); Katsufumi Inoue, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 657 days.

(21) Appl. No.: 14/578,976

(22) Filed: Dec. 22, 2014

(65) Prior Publication Data

US 2015/0193716 A1     Jul. 9, 2015

(30) Foreign Application Priority Data

Jan. 9, 2014   (JP) ................. 2014-002090

(51) Int. Cl.
*G06Q 10/00*    (2012.01)
*G06Q 30/00*    (2012.01)
(Continued)

(52) U.S. Cl.
CPC ..... *G06Q 10/06393* (2013.01); *H05B 37/029* (2013.01); *G06Q 30/0201* (2013.01)

(58) Field of Classification Search
CPC ................. G06Q 30/0201; G06Q 10/06393
(Continued)

(56) References Cited

U.S. PATENT DOCUMENTS

2010/0262297 A1* 10/2010 Shloush ............. H05B 37/0218
                                                            700/276
2012/0303446 A1* 11/2012 Busch ..................... H04W 4/02
                                                            705/14.45
(Continued)

FOREIGN PATENT DOCUMENTS

JP      2008-295532      12/2008
JP      2010-075243      4/2010

*Primary Examiner* — Sujay Koneru
(74) *Attorney, Agent, or Firm* — Greenblum & Bernstein, P.L.C.

(57) ABSTRACT

An information display method is disclosed in a control system in which a lighting mode is selected from among a plurality of lighting modes, and lighting equipment is controlled at a lighting target area in accordance with the selected lighting mode. The method comprising: generating each of the merchandising values representing an index for evaluating a performance of at least one store; classifying each of the merchandising values in according with each of time periods; obtaining lighting mode information from the control system, the lighting mode information indicating the lighting mode selected in each of the time periods; and transmitting to the terminal device, each of the classified merchandising values and each pieces of the obtained lighting mode information corresponding to each of the classified merchandising values, in each of the time periods.

15 Claims, 39 Drawing Sheets

(51) Int. Cl.
*G06Q 10/06* (2012.01)
*H05B 37/02* (2006.01)
*G06Q 30/02* (2012.01)

(58) Field of Classification Search
USPC .............................................. 705/7.29, 7.39
See application file for complete search history.

(56) References Cited

U.S. PATENT DOCUMENTS

| | | | |
|---|---|---|---|
| 2012/0310703 A1* | 12/2012 | Cavalcanti ......... | G06Q 30/0201 705/7.29 |
| 2013/0176398 A1* | 7/2013 | Bonner ................ | G09F 19/18 348/46 |
| 2013/0226655 A1* | 8/2013 | Shaw .................. | G06Q 30/0201 705/7.29 |
| 2013/0346229 A1* | 12/2013 | Martin ................ | G06Q 40/00 705/26.3 |

* cited by examiner

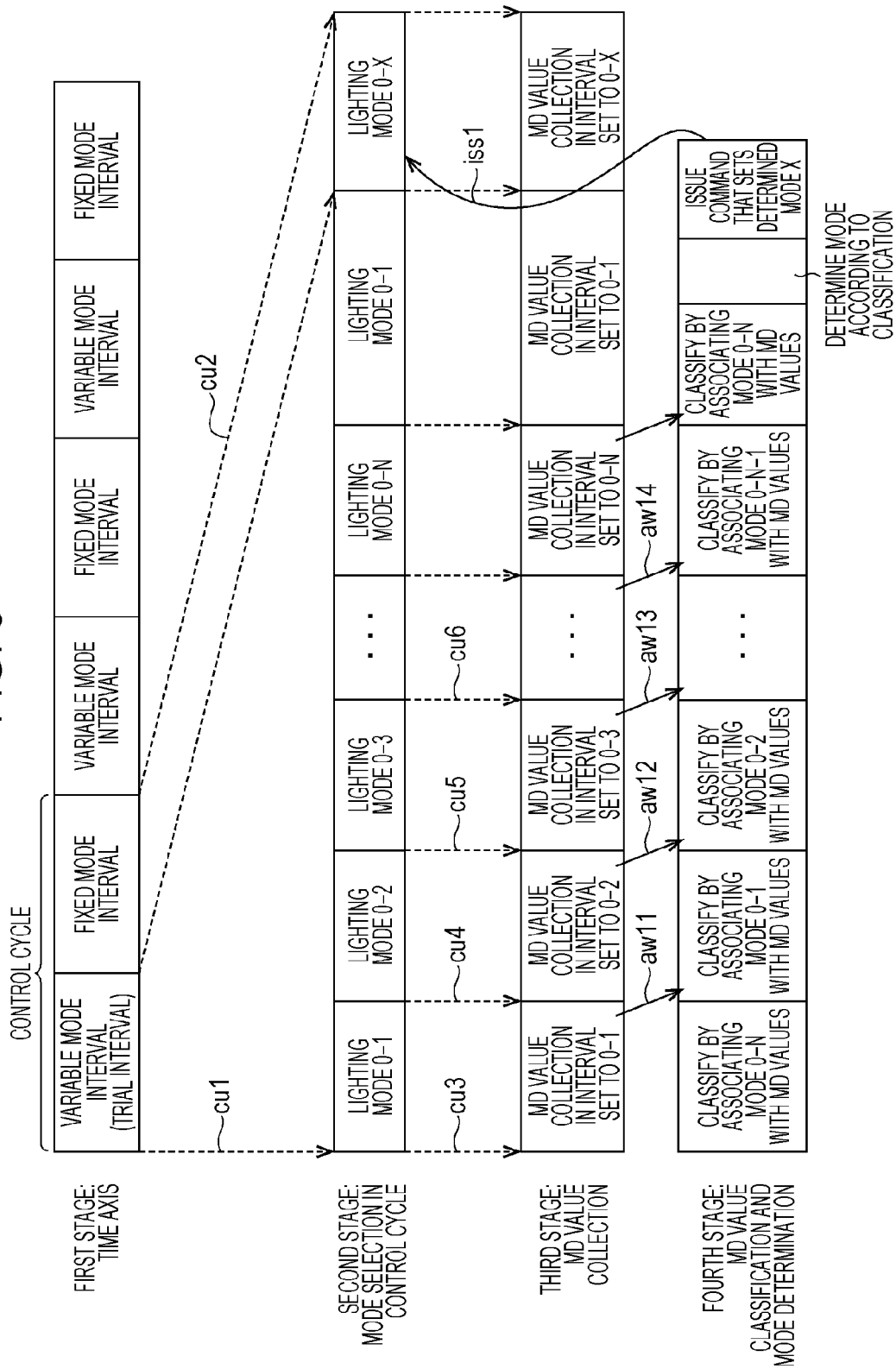

FIG. 7A

| DATE AND TIME | SHELVING UNIT NUMBER | LIGHTING MODE |
|---|---|---|
| ... | ... | ... |
| 11/12/2013 10:00:00 | 0 | 0-1 |
| 11/12/2013 10:00:00 | 1 | 1-1 |
| 11/12/2013 10:00:00 | 2 | 2-1 |
| ... | ... | ... |
| 11/12/2013 11:00:00 | 0 | 0-2 |
| 11/12/2013 11:00:00 | 1 | 1-2 |
| 11/12/2013 11:00:00 | 2 | 2-2 |
| ... | ... | ... |
| 11/12/2013 12:00:00 | 0 | 0-3 |
| ... | ... | ... |

FIG. 7B

| LIGHTING MODE 1-1 | BRIGHTNESS 80% COLOR TEMPERATURE 80% (WARM COLOR 100% ⇔ COLD COLOR: 0%) |
|---|---|
| LIGHTING MODE 1-2 | BRIGHTNESS 60% COLOR TEMPERATURE 60% |
| LIGHTING MODE 2-1 | BRIGHTNESS 60% R=144 G=80 B=80 |
| ⋮ | ⋮ |

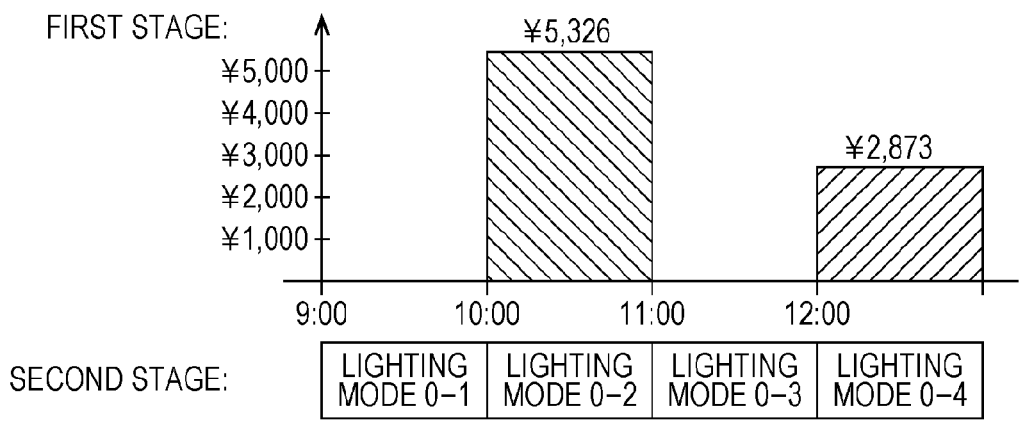

FIG. 11B
| PRODUCT ID | SHELVING UNIT NUMBER | OCCUPYING RANGE ((x1, z1), (x2, z2)) cm |
|---|---|---|
| RICEBALL A | 1 | ((10, 10), (80, 30)) |
| ... | ... | ... |
| POTATO CHIPS A | 23 | ((10, 10), (80, 30)) |
| POTATO CHIPS B | 23 | ((10, 40), (80, 70)) |
| CHOCOLATE A | 23 | ((10, 80), (80, 110)) |
| CHOCOLATE B | 23 | ((10, 120), (80, 150)) |
| CUP NOODLES A | 24 | ((10, 10), (80, 30)) |
| CUP NOODLES B | 24 | ((10, 40), (80, 70)) |
| CUP FRIED NOODLES A | 24 | ((10, 80), (80, 110)) |
| CUP FRIED NOODLES B | 24 | ((10, 120), (80, 150)) |
| ... | | |
*RECTANGULAR RANGE HAVING THE TWO POINTS OF (x1, z1) AND (x2, z2) AS DIAGONAL POINTS
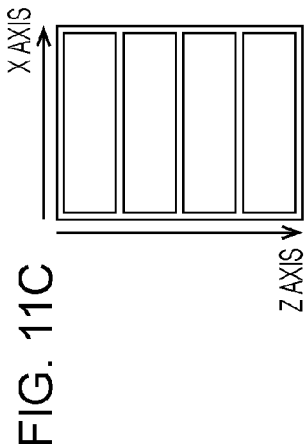
FIG. 11C
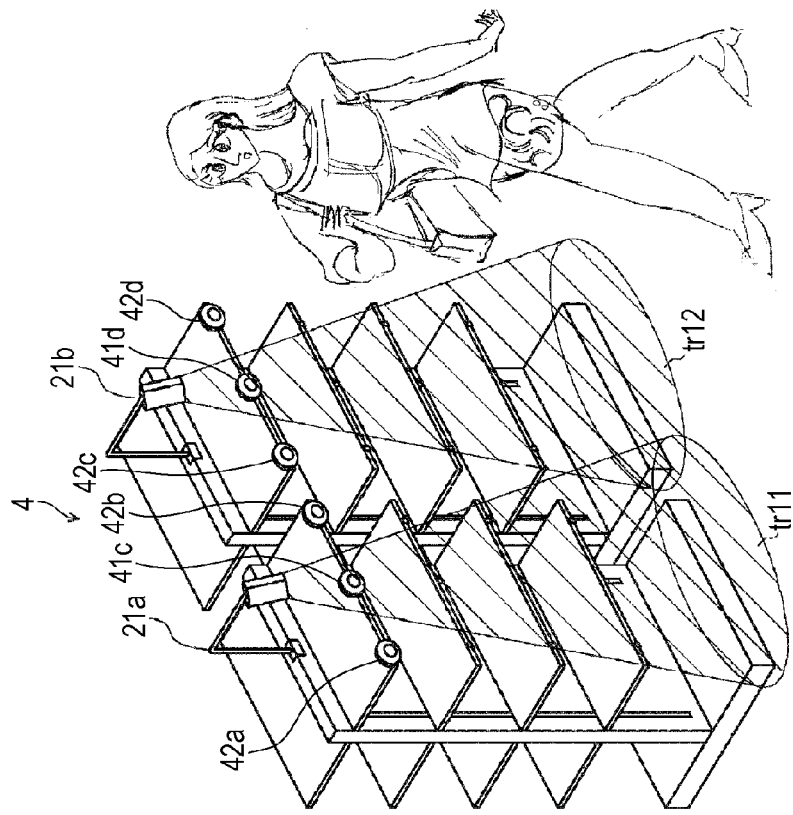
FIG. 11A

| DATE AND TIME | LOCATION NUMBER | NUMBER OF PEOPLE DETECTED | NUMBER OF HAND EXTENSIONS DETECTED |
|---|---|---|---|
| ... | ... | ... | ... |
| 11/12/2013 10:38:30 | FIRST ENTRANCE | 0 | 0 |
| 11/12/2013 10:38:31 | FIRST ENTRANCE | 1 | 0 |
| 11/12/2013 10:38:32 | FIRST ENTRANCE | 0 | 0 |
| ... | ... | ... | ... |
| 11/12/2013 10:38:30 | SECOND ENTRANCE | 0 | 0 |
| 11/12/2013 10:38:31 | SECOND ENTRANCE | 0 | 0 |
| 11/12/2013 10:38:32 | SECOND ENTRANCE | 1 | 0 |
| ... | ... | ... | ... |
| 11/12/2013 10:38:30 | SHELVING UNIT 4 | 0 | 0 |
| 11/12/2013 10:38:31 | SHELVING UNIT 4 | 1 | 0 |
| 11/12/2013 10:38:32 | SHELVING UNIT 4 | 1 | 0 |
| 11/12/2013 10:38:33 | SHELVING UNIT 4 | 1 | 0 |
| 11/12/2013 10:38:34 | SHELVING UNIT 4 | 1 | 1 |
| 11/12/2013 10:38:35 | SHELVING UNIT 4 | 1 | 0 |
| ... | ... | ... | ... |

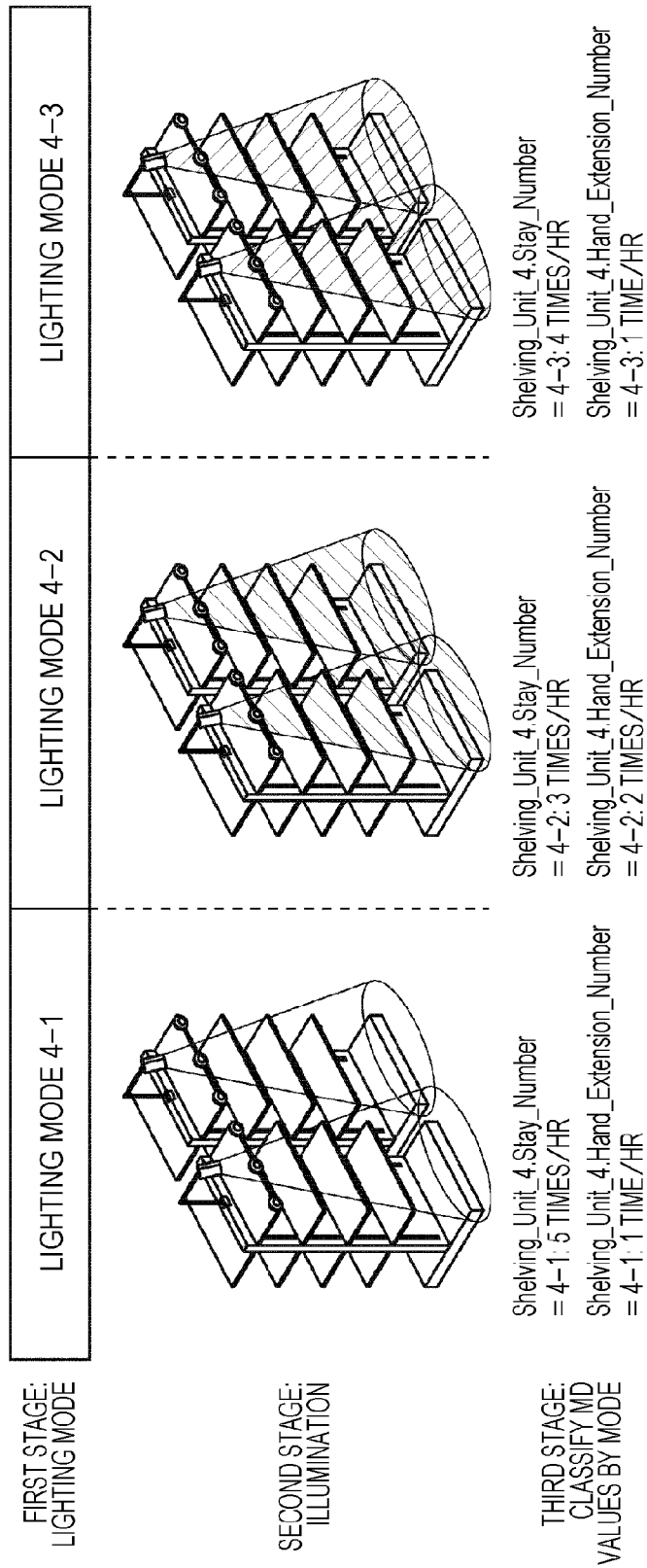

| SENSOR NUMBER | TYPE | OBSERVATION RANGE |
|---|---|---|
| 1 | PYROELECTRIC | (Xpy1, Ypy1), rad1 |
| 2 | PYROELECTRIC | (Xpy2, Ypy2), rad2 |
| 3 | PYROELECTRIC | (Xpy3, Ypy3), rad3 |
| ⋮ | ⋮ | ⋮ |
| 101 | RANGE MEASUREMENT | (Xlr1, Ylr1) TO (Xlr2, Ylr2) |
| 102 | RANGE MEASUREMENT | (Xlr3, Ylr3) TO (Xlr4, Ylr4) |
| 103 | RANGE MEASUREMENT | (Xlr5, Ylr5) TO (Xlr6, Ylr6) |

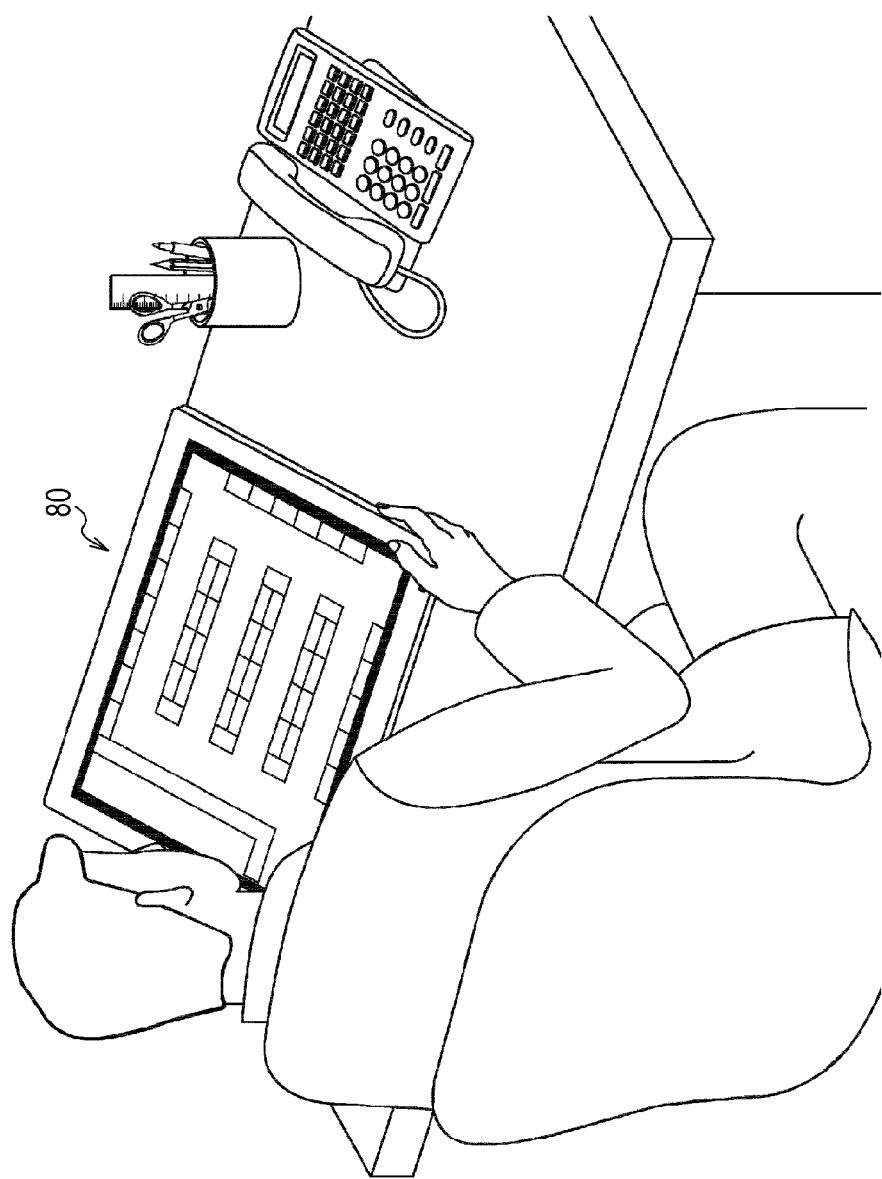

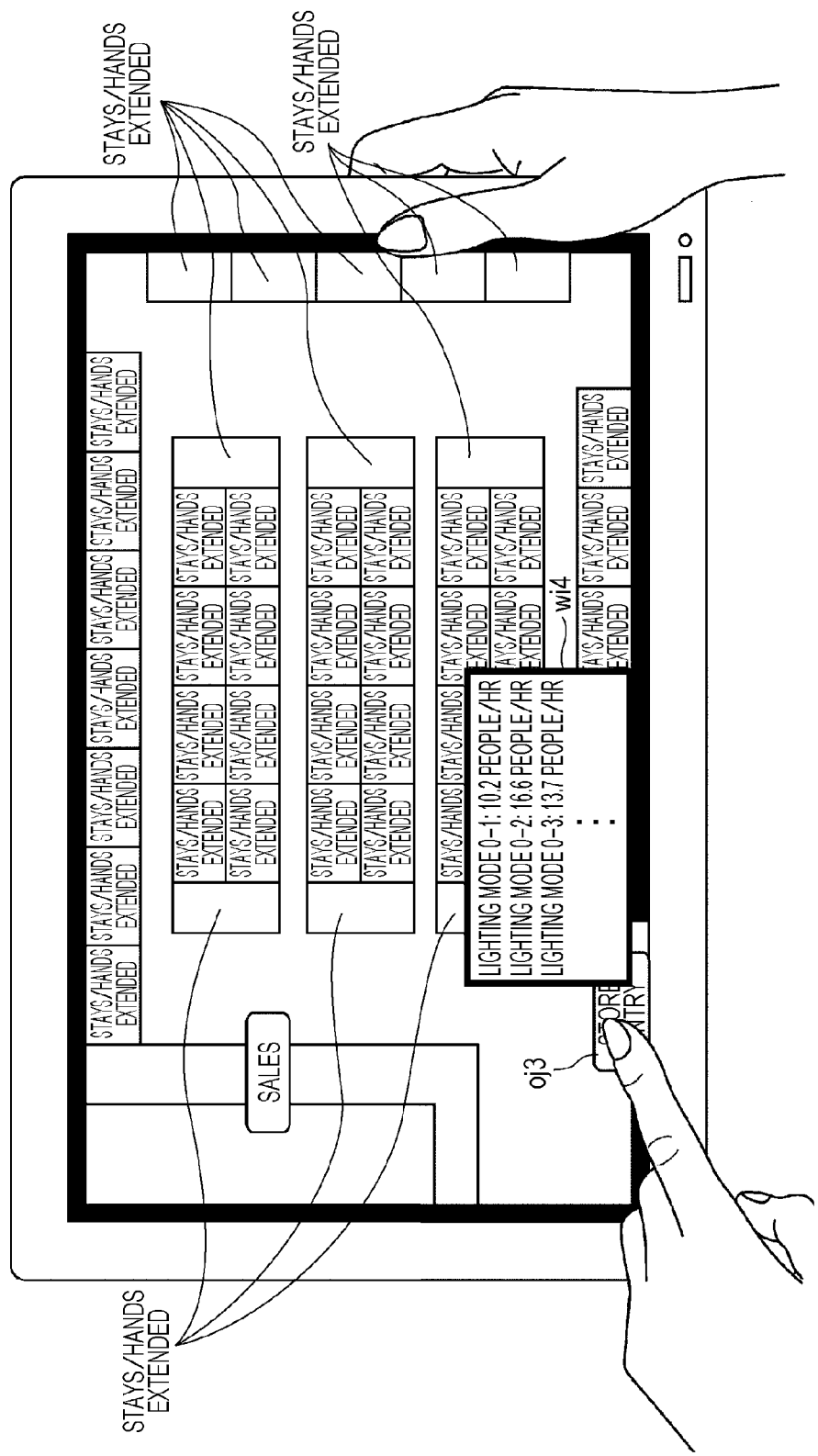

FIG. 29A

| STORE ID | REGION | SALES (¥/DAY) | STORE SIZE (m²) | CUSTOMER BASE (AVERAGE AGE GROUP) | LOCATION CONDITIONS |
|---|---|---|---|---|---|
| . . . | . . . | . . . | . . . | . . . | . . . |
| STORE A | PREFECTURE A | 108,649 | 70 | 30 | OFFICE DISTRICT |
| STORE B | PREFECTURE B | 157,230 | 80 | 40 | STUDENT DISTRICT |
| STORE C | PREFECTURE B | 90,613 | 50 | 30 | SHOPPING DISTRICT |
| STORE D | PREFECTURE C | 128,602 | 50 | 50 | RESIDENTIAL DISTRICT |
| STORE E | PREFECTURE C | 88,531 | 70 | 20 | STATION FRONT |
| . . . | . . . | . . . | . . . | . . . | . . . |

*THE STORE DATABASE INCLUDES THE ABOVE DATABASE WITH EACH DATABASE FOR SALES, LIGHTING CONTROL, AND OBSERVATION INFORMATION, IS CONNECTED TO A NETWORK, AND IS ABLE TO BE REFERENCED FROM OTHER STORES

FIG. 29B

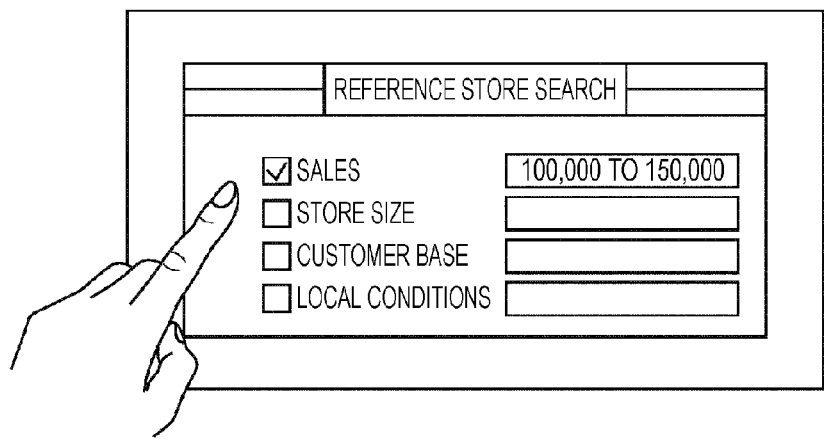

FIG. 29C

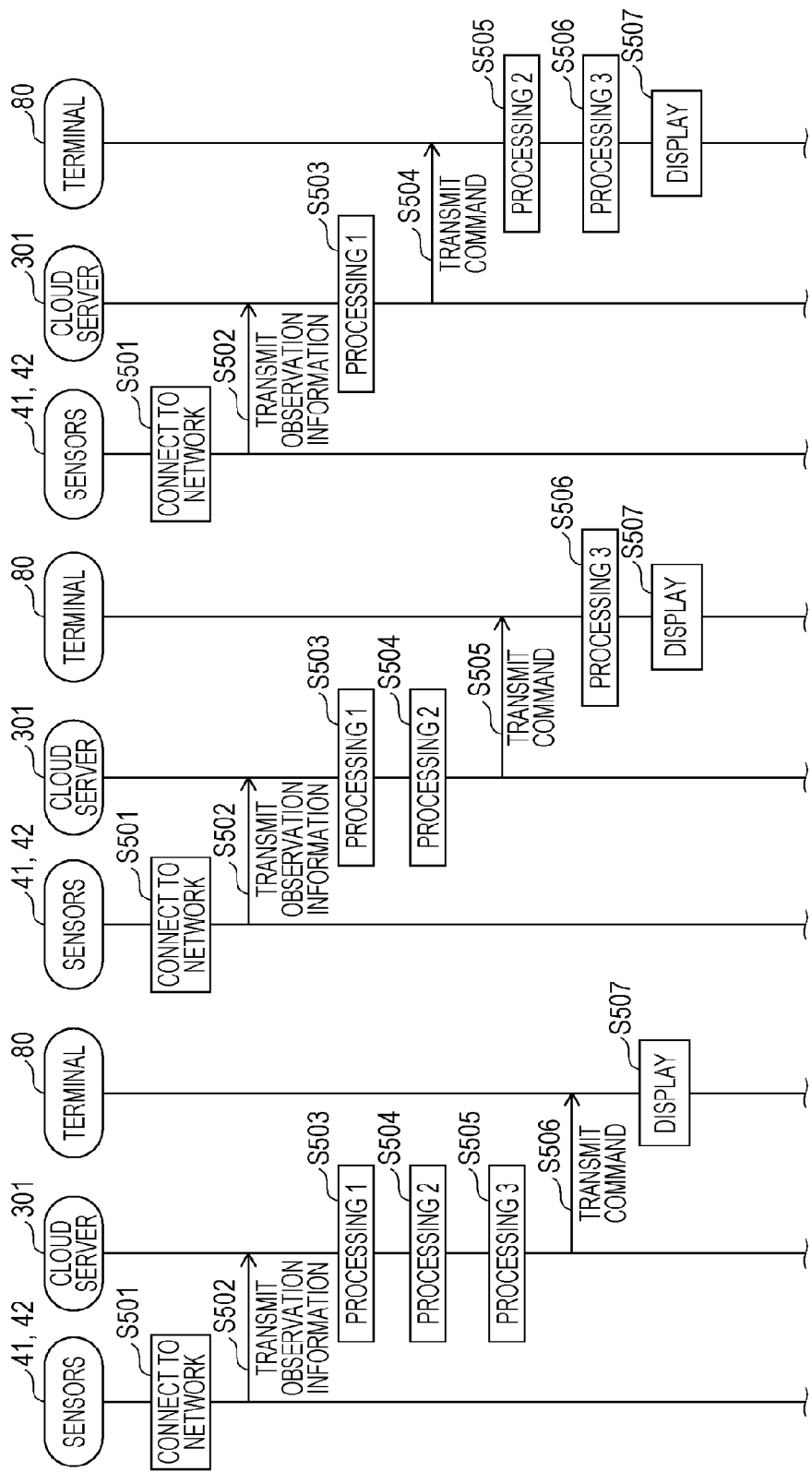

INFORMATION DISPLAY METHOD FOR STORE WORK RELATING TO LIGHTING CONTROL SYSTEM, AND LIGHTING CONTROL METHOD

CROSS REFERENCES TO RELATED APPLICATIONS

This Application claims priority to Japanese Patent Application No. 2014-002090, filed on Jan. 9, 2014, the contents of which are hereby incorporated by reference.

BACKGROUND

1. Technical Field

The present disclosure belongs to the technical field of control techniques for store lighting.

2. Description of the Related Art

Control techniques for store lighting are techniques for controlling lighting equipment that is provided in a plurality of sections in a store site, and lighting equipment that is integrally formed in product shelving units, via a wired circuit or a network or the like inside the store. There has been a tendency in recent years for such control techniques to be used to produce, in a store space, an atmosphere that encourages store visitors to purchase products, by controlling dimming and color temperature in a lighting light source.

Specifically, there are various lighting modes in lighting equipment, and individual lighting modes include color temperature settings regarding the degree of warmth/coldness to be used, brightness settings, and dimming settings regarding the RGB trichromatic mixture ratio to be used. By changing settings for a lighting mode, it becomes possible to vary the warmth and coldness of a light source, and also to vary the tint of the light source. The display showcase described in Japanese Unexamined Patent Application Publication No. 2010-75243 is an example of lighting equipment that is integrally formed in a product shelving unit.

SUMMARY

However, further improvement was required in the aforementioned Japanese Unexamined Patent Application Publication No. 2010-75243.

In one general aspect, the techniques disclosed here feature an information display method in a control system in which a lighting mode is selected from among a plurality of lighting modes, and lighting equipment is controlled at a lighting target area in accordance with the selected lighting mode. The method comprising: generating each of the merchandising values representing an index for evaluating a performance of at least one store; classifying each of the merchandising values in according with each of time periods; obtaining lighting mode information from the control system, the lighting mode information indicating the lighting mode selected in each of the time periods; and transmitting to the terminal device, each of the classified merchandising values and each pieces of the obtained lighting mode information corresponding to each of the classified merchandising values, in each of the time periods. These general and specific aspects may be implemented using a system, a method, and a computer program, and any combination of systems, methods, and computer programs.

According to the aforementioned aspect, it has been possible for further improvement to be realized.

BRIEF DESCRIPTION OF THE DRAWINGS

FIG. 6 is a timing chart depicting an example of temporal transition in the selection of lighting modes.

FIG. 7A is a drawing depicting an example of a data structure for a lighting control database.

FIG. 7B is a drawing depicting an example of lighting mode control information.

FIG. 8A is a drawing depicting an example of a data structure for a sales information database.

FIG. 8B is a drawing depicting the relationship between lighting modes in FIG. 8A and sales indicated by sales information.

FIG. 8C is a drawing depicting notation for merchandising value classification results.

FIG. 11A is a drawing depicting the external appearance of a product shelving unit.

FIG. 11B is a drawing depicting an example of a data structure for a display information table for a product shelving unit.

FIG. 11C is a drawing depicting an X-Z coordinate system that specifies the position of a product storage column of a product shelving unit.

FIG. 15 is a drawing depicting the difference between illumination in each lighting mode by direct lighting in a product shelving unit.

FIG. 19 is a drawing depicting an example of a situation in which a tablet terminal is used.

FIG. 24 is a drawing depicting a window that is displayed when an icon for an entrance is touched.

FIG. 29A is a drawing depicting an example of store feature information.

FIG. 29B is a drawing depicting an input example for store feature information.

FIG. 29C is a drawing depicting a search result for store feature information.

FIG. 37A is a drawing depicting a mode in which a plurality of processing is carried out in one batch by a cloud server.

FIG. 37B is a drawing depicting a sequence in which one item of processing from among the plurality of processing is executed at the information tablet terminal side.

FIG. 37C is a drawing depicting a sequence in which two items of processing from among the plurality of processing are executed at the tablet terminal side.

Figure 1:
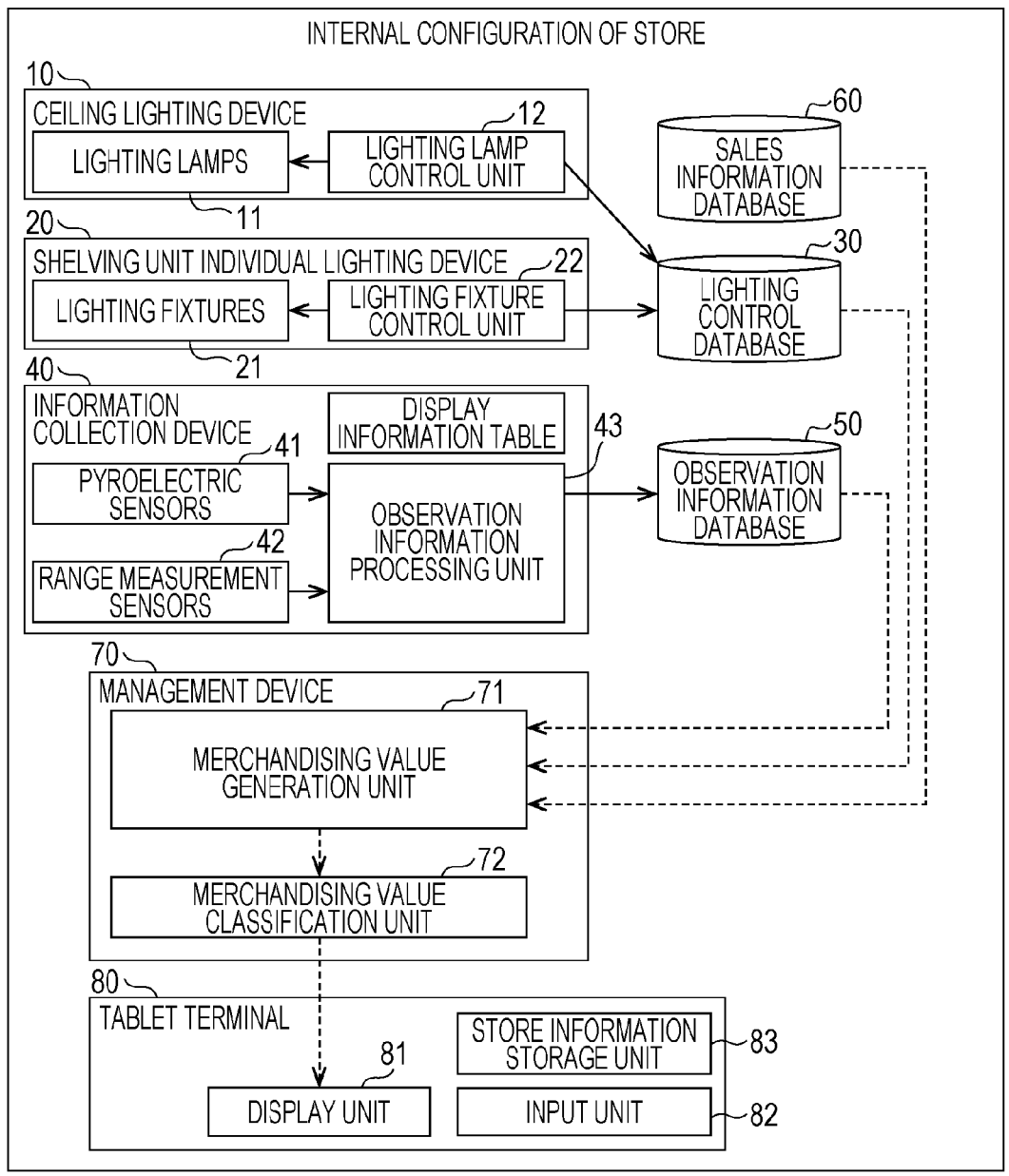
FIG. 1 is a drawing depicting the internal configuration of a store system.

DETAILED DESCRIPTION (Findings Forming the Basis for the Present Disclosure)

The inventors found that the following problems occur in the technique described in the aforementioned Japanese Unexamined Patent Application Publication No. 2010-75243.

Targets for lighting control include direct lighting and indirect lighting. The former is lighting for each product shelving unit, and the latter is ceiling lighting. The direct lighting and indirect lighting have independent control systems. The ceiling lighting is controlled by a programmable logic controller (PLC), and the product shelving unit lighting is controlled by a product shelving unit controller. The ceiling lighting changes the degree of dimming in accordance with influences due to the time period and external light. The product shelving unit lighting is that described in the aforementioned Japanese Unexamined Patent Application Publication No. 2010-75243, and turns on lighting and also changes the method for dimming in accordance with commands.

In a store as described above, the control system for ceiling lighting and the control system for shelving unit lighting are independent of each other, and dimming control and color temperature control are carried out asynchronously. Therefore, it is extremely difficult to ascertain whether or not the lighting effect of the ceiling lighting and the lighting effect of the shelving unit lighting have a synergistic effect, and whether or not the ceiling lighting and the shelving unit lighting combine well with each another. It is feasible to integrate the control system for ceiling lighting and the control system for shelving unit lighting but, with this, the independence of carrying out dimming in accordance with the time period and external light, and carrying out dimming in accordance with a command is lost.

It is also feasible to accumulate log information indicating the mode setting when the showcase device described in Japanese Unexamined Patent Application Publication No. 2010-75243 switches the lighting mode, in association with the sales in the store, in the form of a database. However, lighting in a store includes not only shelving unit lighting but also ceiling lighting. Since the ceiling lighting contributes to the sales, associating the sales amount with the mode setting for the shelving unit lighting in the form of the database leads to the contribution of the ceiling lighting to the sales amount being overlooked.

Therefore, there has been a problem in that the dimming control of each item of equipment has not been able to objectively evaluate the results had on store business while dimming is also carried out independently by the lighting of the entire store or the lighting of each product shelving unit.

Therefore, the inventors investigated the following improvement measures in order to solve the aforementioned problem.

(1. Basic Aspect)

A first aspect of the present disclosure is an information display method in a control system that controls lighting equipment of a lighting target area that is the entirety of at least one store or a portion of the store, in accordance with a lighting mode selected from among a plurality of lighting modes, in which the control system has a terminal device, a merchandising value that is generated in the store and represents an index for evaluating the performance of the store is classified according to the time period in which the merchandising value has been generated, and the terminal device associates and displays the classified merchandising value and lighting mode information that indicates the lighting mode selected in the time period in which the classified merchandising value has been generated.

According to the present aspect, by displaying lighting mode information in association with a merchandising value that represents an index for evaluating the performance of a store, the user is able to easily comprehend the causal relationship between lighting mode selection and store visitor behavior. Thus, the user is able to appropriately select a lighting mode in accordance with the characteristics of the ceiling lighting and the shelving unit lighting while the independence of the control system for the ceiling lighting and the control system for the store lighting is maintained.

In addition, since the user only analyzes the correlation between the merchandising values and the lighting modes in detail, not only commercial facilities such as convenience chain stores, large-scale mass retailers, and private stores but also various locations where commercial actions take place are included as target stores. Specifically, points of contact for corporations, public institutions, and transportation facilities are included. This is because commercial actions also occur at these points of contact. The description becomes undesirably complicated if the embodiments are described with respect to all of these subordinate concepts. Therefore, in the first embodiment hereinafter, a description will be given with a convenience chain store as the subject.

The selection of a lighting mode includes various selection methods. A selection method in which a random number is generated for a lighting mode to be randomly chosen, and a selection method that uses an algorithm determined from an ergonomics or environmental engineering standpoint are included. This is because the technical meaning of the basic aspect lies in a store in which merchandising values are classified by using lighting mode information that indicates a lighting mode selected by these selection methods. The description becomes undesirably complicated if the embodiments are described with respect to all of these subordinate concepts. Therefore, in the first embodiment hereinafter, a description will be given using a selection method in which a plurality of lighting modes are sequentially selected in accordance with a mode number.

A "lighting control system" broadly includes a computer system formed from a client computer and a server computer, a cloud network computer system having a form in which applications are loaded in a cloud server, and a computer system in which computers carry out peer-to-peer connection. A "terminal device" broadly includes a laptop computer, a notebook computer, a smart phone, a tablet terminal, and a register terminal, which are operated by a pointing device such as a mouse and a keyboard. The description becomes undesirably complicated if the embodiments are described with respect to all of these subordinate concepts. Therefore, in the first embodiment hereinafter, a description will be given using a tablet terminal as the terminal device.

(2. Temporal and Positional Relationships)

Subordinate concepts such as the following are possible with respect to the temporal and positional relationships between a merchandising value and a lighting mode in the basic aspect of Section 1. That is, the merchandising value may be a sales amount for an entire store or a partial area in the store, and lighting mode information associated with the merchandising value that is the sales amount may indicate a lighting mode used in lighting control for the entire store or a specific area in part of the store, in a time period that includes the point in time at which product sales have been totaled.

Since the lighting mode applied in the lighting of the entire store or a partial area can be used for merchandising value classification, it becomes possible to identify a lighting mode that brings about a commercial action or a preliminary action thereof, and it becomes possible to determine what kind of lighting mode ought to be selected in order to cause such actions to be carried out.

(3. Relationship Between a Preliminary Action and a Lighting Mode)

Subordinate concepts such as the following are possible with respect to the relationship between a preliminary action and a lighting mode in the aspect of Section 1.

That is, the merchandising value may be the number of store visitors who have entered the store or a partial area in the store, and the lighting mode information associated with the merchandising value that is the number of people who have entered may indicate a lighting mode used in lighting control for the entire store or a specific area in part of the store, in a time period that includes the point in time at which entry by a store visitor has been detected. Entry into the store from outside the store and the optimal lighting mode for a specific area in the store are presented, and therefore analysis of the relevancy between store visitor movements and lighting modes is facilitated, which can lead to an improvement in sales.

(4. Specific Type of Preliminary Action: Type 1)

A preliminary action and the handling thereof in the aspect of Section 1 can be expanded as follows. That is, the merchandising value may be the number of times a person has been detected extending a hand toward a product shelving unit installed in the store, and the lighting mode information associated with the merchandising value indicating the number of times a person has been detected extending a hand may indicate a lighting mode used in the lighting of a product shelving unit, in a time period that includes the point in time at which a store visitor has been detected extending a hand. The type of lighting mode that was selected when a hand was extended toward a product shelving unit is identified, and it therefore becomes possible to analyze the relevancy between the preliminary action of a hand being extended toward a product shelving unit and the lighting mode.

(5. Specific Type of Preliminary Action: Type 2)

A preliminary action and the handling thereof in the aspect of Section 1 can be expanded as follows. The merchandising value may be the number of people who have stayed for a fixed time or more in front of a product shelving unit installed in the store, and the mode information that is associated with the merchandising value indicating the number of people who have stayed may indicate a lighting mode used in the lighting of a product shelving unit, in a time period that includes the point in time at which it has been detected that a store visitor has stayed. It becomes possible to analyze which lighting modes keep store visitors in front of a product shelving unit, which can lead to an increase in the sales of a product.

The detection of a store visitor entering, staying, and extending a hand is carried out by sensors. The sensors may be infrared, ultrasonic, microwave, or acoustic-type sensors. Furthermore, the sensors may be image sensors or distance image sensors. Image sensors and distance image sensors detect a store visitor entering, staying, and extending a hand by using a background difference method. The background difference method is processing in which a background image that does not include a detection target is captured in advance, and the detection target is detected from the difference between the background image and an input image captured separately under the same conditions. In addition, the sensors may be sensors that detect a product being grasped, by way of a shoplifting prevention tag. The description becomes undesirably complicated if the embodiments are described with respect to all of these subordinate concepts. Thus, in the first embodiment hereinafter, a description will be given with a store visitor entering, staying, or extending a hand being detected by pyroelectric sensors and range measurement sensors.

(6. Merits of Direct Lighting and Indirect Lighting)

In the aspect of Section 2 and 3, it is possible for priorities such as the following to be set with regard to the relationship between direct lighting and indirect lighting. That is, the terminal device may display a layout image depicting the arrangement layout of a plurality of product shelving units, receive a designation operation that designates a location to be a target for the display of a merchandising value, and, in accordance with the designation operation, display lighting mode information indicating a lighting mode that has brought about a lighting effect with respect to the entire store, or lighting mode information indicating a lighting mode that has brought about a lighting effect with respect to a partial area, in association with the merchandising value. Since the designation of a location to be a target for the display of a merchandising value is received, and lighting mode information for merchandising value classification changes according to the designated location, it becomes easy to comprehend the relevancy between individual lighting locations in the store space and merchandising values. Thus, it is possible to appropriately determine whether or not the selection of a lighting mode in the lighting for an area or the entire store is suitable.

(7. Operation of Terminal Device)

Subordinate concepts such as the following are possible with respect to operation of the terminal device of the aspect of Sections 4 and 5. That is, the terminal device may display a layout image depicting the arrangement layout of a plurality of product shelving units, and receive a designation operation for any of the product shelving units, and, if there is a designation operation, the terminal device may display lighting mode information indicating a lighting mode that has brought about a lighting effect with respect to the designated product shelving unit, in association a merchandising value. In the case where any of the product shelving units depicted in the layout image have been designated, because the lighting mode that has been applied to the designated product shelving unit is used for merchandising value classification, it becomes possible to link the designation of the product shelving unit and the classification result, and interactivity is able to be increased.

(8. Target for Merchandising Value Collection)

In the aspect of Section 1 to 7, the following subordinate concepts are possible with respect to a store to be targeted for the collection of merchandising values.

That is, the terminal device may receive a search operation for a store to be targeted for merchandising value acquisition, merchandising values to be targeted for merchandising value classification may include a first merchandising value and a second merchandising value in the store specified in the search operation, and lighting mode information associated with the merchandising values in the merchandising value classification may include first lighting mode information and second lighting mode information indicating lighting modes used in the store specified in the search operation. A classification range according to a lighting mode is set to a store designated by the user, and therefore the effect produced by a lighting mode can be chosen from an arbitrary store. It thereby becomes possible to select a lighting mode that may lead to an improvement in sales.

(9. Increasing the Number of Merchandising Value Collection Targets)

In the aspect of Section 1 to 7, the following subordinate concepts are possible with respect to a store to be targeted for the collection of merchandising values. That is, merchandising values to be targeted for merchandising value classification may include a first merchandising value generated in a first store and a second merchandising value generated in a second store, and lighting mode information associated with the merchandising values in the merchandising value classification may include first lighting mode information indicating a lighting mode used in the first store, and second lighting mode information used in the second store. Since the classification range according to a lighting mode can be expanded to the merchandising values of a plurality of stores, the effects produced by lighting modes can be compared among stores. It thereby becomes possible to select a lighting mode that may lead to an improvement in sales.

(10. Acquisition Destination for Store Information)

In the aspect of Section 9, subordinate concepts such as the following are possible with respect to an acquisition destination for store information. That is, merchandising values and the first store and the second store that are acquisition targets for lighting mode information associated with the merchandising values may be determined by searching a store database that holds store information regarding a plurality of stores. By using a database of store information, it is possible to establish a way of selecting a lighting mode from a wide field, and it therefore becomes possible to increase sales by appropriately selecting lighting modes.

(11. Search for Store Information)

In the aspect of Section 10, subordinate concepts such as the following are possible with respect to the method for store information. That is, a search for store information may be carried out by receiving input of store features from the user and finding store information having the store features from a store database, and the store features may include any one of sales, store size, region, customer base, and location conditions. By receiving the input of store features, a lighting mode can be chosen from past successful cases of other stores, which can bring about an increase in sales due to the appropriate selection of a lighting mode.

(12. Other Basic Aspects)

The aforementioned implementation obstacles can be overcome by not only improving the information display method but also improving the lighting control method. A lighting control method in a control system that controls lighting equipment of a store may include classifying a merchandising value that indicates a commercial evaluation of store performance, determining a lighting mode based on classification results, and issuing a control command for carrying out lighting control in the determined lighting mode, the merchandising value may indicate the result of a commercial action in the store work and may indicate statistics of a preliminary action thereof, the store work may include lighting control in which each of a plurality of lighting modes is chosen and the lighting equipment of the store is controlled according to the individual lighting modes chosen, and the classification may be carried out by choosing, from among the plurality of lighting modes, a lighting mode that temporally and/or in terms of content relates to the merchandising value to be classified, and associating lighting mode information indicating the chosen lighting mode with the merchandising value as a classification index. In the merchandising value classification, because lighting mode information is associated with merchandising values, it is possible to estimate which lighting modes have brought about an increase in sales or which lighting modes have become opportunities for many preliminary actions, by referring to the results of actions indicated by the merchandising values or the statistics of preliminary actions. It thereby becomes possible to choose a lighting mode that improves sales results.

(13. Temporal and Positional Relationships)

In the basic aspect of Section 12, subordinate concepts such as the following are possible with respect to the temporal and positional relationships between a merchandising value and a lighting mode. That is, the merchandising value may be the sales amount for an entire store or a partial area in the store, and lighting mode information associated with the merchandising value that is the sales amount may indicate a lighting mode used in lighting control for the entire store or a specific area in part of the store, in a time period that includes the point in time at which product sales have been totaled.

Since the lighting mode applied in the lighting of the entire store or a partial area can be used for merchandising value classification, it becomes possible to identify a lighting mode that brings about a commercial action or a preliminary action thereof, and it becomes possible to determine what kind of lighting mode ought to be selected in order to cause such actions to be carried out.

(14. Relationship Between a Preliminary Action and a Lighting Mode)

In the aspect of Section 12, subordinate concepts such as the following are possible with respect to the relationship between a preliminary action and a lighting mode. That is, a merchandising value may be the number of store visitors who have entered a store or a partial area in the store, and the lighting mode information associated with the merchandising value that is the number of people who have entered may indicate a lighting mode used in lighting control for the entire store or a specific area in part of the store, in a time period that includes the point in time at which entry by a store visitor has been detected. Since entry into the store from outside the store and the optimal lighting mode for a specific area in the store are presented, and a command is issued in accordance with this, analysis of the relevancy between store visitor movements and lighting modes is facilitated, which can lead to an improvement in sales.

(15. Specific Type of Preliminary Action: Type 1)

In the aspect of Section 12, a preliminary action and the handling thereof can be expanded as follows. That is, the merchandising value may be the number of times a person has been detected extending a hand toward a product shelving unit installed in the store, and the lighting mode information associated with the merchandising value indicating the number of times a person has been detected extending a hand may indicate a lighting mode used in the lighting of a product shelving unit, in a time period that includes the point in time at which a store visitor has been detected extending a hand. The type of lighting mode that was selected when a hand was extended toward a product shelving unit is identified, and it therefore becomes possible to analyze the relevancy between the preliminary action of a hand being extended toward a product shelving unit and the lighting mode.

(16. Specific Type of Preliminary Action: Type 2)

In the aspect of Section 12, a preliminary action and the handling thereof can be expanded as follows. That is, the merchandising value may be the number of people who have stayed for a fixed time or more in front of a product shelving unit installed in a store, and the mode information that is associated with the merchandising value indicating the number of people who have stayed may indicate a lighting mode used in the lighting of the product shelving unit, in a time period that includes the point in time at which it has been detected that a store visitor has stayed. It becomes possible to analyze which lighting modes are able to keep store visitors in front of the product shelving unit, which can lead to an increase in the sales of a product by carrying out lighting control in accordance with the analysis.

(17. Merits of Direct Lighting and Indirect Lighting)

In the aspect of Section 13 and 14, it is possible for priorities such as the following to be set with regard to the relationship between direct lighting and indirect lighting. That is, the terminal device may display a layout image depicting the arrangement layout of a plurality of product shelving units, receive a designation operation that designates a location to be a target for the display of a merchandising value, and, in accordance with the designation operation, display lighting mode information indicating a lighting mode that has brought about a lighting effect with respect to the entire store, or lighting mode information indicating a lighting mode that has brought about a lighting effect with respect to the partial area, in association with the merchandising value. Since the designation of a location to be a target for the display of a merchandising value is received, and lighting mode information for merchandising value classification changes according to the designated location, it becomes easy to comprehend the relevancy between individual lighting locations in the store space and merchandising values. Thus, it is possible to appropriately determine whether or not the selection of a lighting mode in the lighting for an area or the entire store is suitable.

(18. Operation of Terminal Device)

In the aspect of Sections 15 and 16, subordinate concepts such as the following are possible with respect to operation of the terminal device.

That is, the terminal device may display a layout image depicting the arrangement layout of a plurality of product shelving units, and receive a designation operation for any of the product shelving units, and, if there is a designation operation, the terminal device may display lighting mode information indicating a lighting mode that has brought about a lighting effect with respect to the designated product shelving unit, in association a merchandising value. In the case where any of the product shelving units depicted in the layout image have been designated, because the lighting mode that has been applied to the designated product shelving unit is used for merchandising value classification, it becomes possible to link the designation of the product shelving unit and the classification result, and interactivity is able to be increased.

(19. Temporal Relationship Regarding the Issuing of a Command)

In the aspect of Section 12 to 18, subordinate concepts such as the following are possible with respect to the temporal relationship between a merchandising value and the selection of a lighting mode.

That is, it is desirable that the lighting control periodically repeats control for a first interval and control for a second interval, the control in the first interval is lighting control implemented by switching between each of a plurality of lighting modes, the control in the second interval is lighting control in which the lighting mode is fixed, merchandising values to be classified are a plurality of merchandising values that are generated when each of the plurality of lighting modes are selected in the first interval, and a command issued is a command that fixes the lighting mode in the second interval to a lighting mode that is determined according to the classification results for the merchandising values generated in the first interval. It becomes possible to select a lighting mode that leads to an increase in sales by selecting trial lighting modes for the first interval and fixing the lighting mode on the basis of that trial selection.

(20. Target for Merchandising Value Collection)

In the aspect of Section 12 to 19, the following subordinate concepts are possible with respect to a store to be targeted for the collection of merchandising values.

That is, a search operation for a store to be targeted for merchandising value acquisition may be received, merchandising values to be targeted for merchandising value classification may include a first merchandising value and a second merchandising value in the store specified in the search operation, and lighting mode information associated with the merchandising values in the merchandising value classification may include first lighting mode information and second lighting mode information indicating lighting modes used in the store specified in the search operation. The classification range according to a lighting mode is set to a store designated by the user, and therefore the effect produced by a lighting mode can be chosen from an arbitrary store. It thereby becomes possible to select a lighting mode that may lead to an improvement in sales.

(21. Increasing the Number of Merchandising Value Collection Targets)

In the aspect of Section 12 to 19, the following subordinate concepts are possible with respect to a store to be targeted for the collection of merchandising values. Specifically, merchandising values to be targeted for merchandising value classification may include a first merchandising value generated in a first store and a second merchandising value generated in a second store, and lighting mode information associated with the merchandising values in the merchandising value classification may include first lighting mode information indicating a lighting mode used in the first store, and second lighting mode information used in the second store. Since the classification range according to lighting modes can be expanded to the merchandising values of a plurality of stores, the effects produced by lighting modes can be compared among stores. It thereby becomes possible to select a lighting mode that may lead to an improvement in sales.

(22. Acquisition Destination for Store Information)

In the aspect of Section 21, subordinate concepts such as the following are possible with respect to the acquisition destination for store information. Specifically, the first store and the second store that are acquisition targets for merchandising values may be determined by searching a store database that holds store information regarding a plurality of stores. By using a database of store information, it is possible to establish a way of selecting a lighting mode from a wide field, and it therefore becomes possible to increase sales by appropriately selecting lighting modes.

(23. Search for Store Information)

In the aspect of Section 22, subordinate concepts such as the following are possible with respect to the method for store information. That is, a search for store information may be carried out by receiving input of store features from the user and finding store information having the store features from a store database, and the store features may include any one of sales, store size, region, customer base, and location conditions. By receiving input of store features, a lighting mode can be chosen from past successful cases of other stores, which can bring about an increase in sales due to the appropriate selection of a lighting mode.

First Embodiment

The present embodiment discloses an embodiment for a store system in which the selection of lighting modes in a convenience store is evaluated from the sales generated daily in the store and the actions of store visitors in the store, to produce a guide for the selection of a lighting mode.

FIG. 1 is depicts the internal configuration of the store system. As depicted in FIG. 1, the store system is configured from a ceiling lighting device 10, a shelving unit individual lighting device 20, a lighting control database storage 30 in which a lighting control database is stored, an information collection device 40 that collects observation information, an observation information database storage 50 in which a database for observation information is stored, a sales information database storage 60 in which a database for sales information is stored, a management device 70, and a tablet terminal 80 that is used by the staff of the store and is provided for inspecting databases.

The ceiling lighting device 10 implements ceiling lighting as indirect lighting, and is configured from lighting lamps 11 that are fluorescent lamp light sources and LED light sources, and a lighting lamp control unit 12 that carries out lighting control for the lighting lamps 11 by choosing any one of a plurality of lighting modes as a current mode. The lighting modes include a mode that designates a predetermined parameter to instruct color temperature control, and a mode that designates a predetermined value to instruct tone control.

Generally, lighting control is control with which loads are all turned on. In contrast, tone control refers to brightness being gradation-controlled while the states of the loads are altered from an off state to all being turned on. The tone control is carried out as follows, for example. An LED lighting fixture is provided with a white-color LED element, an electric bulb-color LED element, and a red-color LED element, and a control unit instructs a pulse width modulation (PWM) control circuit such that the white-color LED element, the electric bulb-color LED element, and the red-color LED element emit light at a predefined intensity. The PWM control circuit receives an instruction regarding the degree of coldness-warmth, and consequently carries out toning in accordance with that degree in such a way that a PWM pulse signal that causes a duty cycle to be varied is output, and a lighting color that corresponds to each lighting mode is achieved. Tone control is thereby carried out.

Color temperature control refers to control that realizes various color temperatures by controlling the balance of color temperature intensity between a light source color of a warm color system and a light source color of a cold color system. In other words, an LED module that is targeted for color temperature control includes an LED element of a warm light source color, and an LED element of a cool (cold) light source color, and controls a current supplied to these LED elements. Thus, the balance of color temperature intensity is controlled, and the color temperature is thereby varied.

The shelving unit individual lighting device 20 realizes spatial lighting as direct lighting, and is configured from a lighting fixture 21 that is configured from a fluorescent lamp light source and a plurality of LED light sources, and a lighting fixture control unit 22 that carries out lighting control for the lighting fixture 21 by choosing any one of a plurality of lighting modes as a current mode. The information collection device 40 includes pyroelectric sensors 41 that detect the approach/withdrawal of human bodies by using an infrared system, a range measurement sensor 42 that detects a hand being extended by a user in a fixed spatial region, and an observation information processing unit 43 that generates observation information that is the output from the sensors.

The management device 70 includes a merchandising value generation unit 71 that converts sales amounts in the sales information database storage 60 and observation information accumulated in the observation information database storage 50 into merchandising values (MD values), and a merchandising value classification unit 72 that classifies merchandising values by adding a lighting mode as a classification index to merchandising values that relate to the lighting mode temporally or in terms of content from among a plurality of merchandising values. The aforementioned is a description of the system configuration of a store. Next, room allocation in the site inside the store is described.

Figure 2:
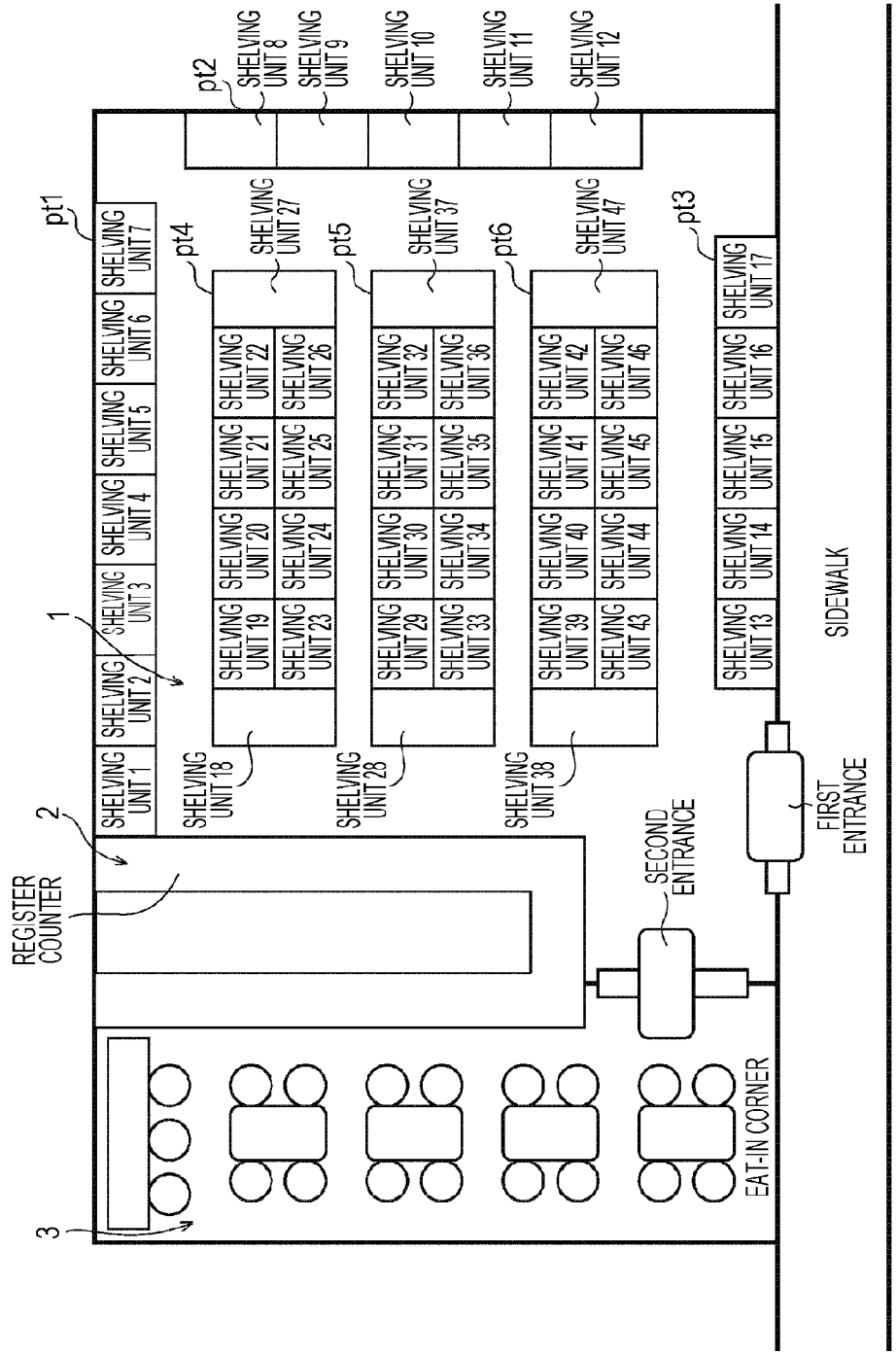
FIG. 2 is a drawing depicting a store internal map.

FIG. 2 depicts a store internal map. As depicted in FIG. 2, the store is configured from a sales floor 1, a counter 2, and an eat-in corner 3. In the sales floor 1, there are partitions pt1 to pt6 made up of a plurality of product shelving units, along the walls and in the center of the floor. At the counter 2, a long U-shaped table is arranged. In the eat-in corner 3, there are four tables for 4 people and one table for 3 people. There is a second entrance as an entrance/exit between the sales floor and the eat-in corner 3. The detection of a person at the first entrance is counted as entering the store. The detection of a person at the second entrance is detected as entry to the eat-in corner 3. In the store internal map in FIG. 2, shelving unit numbers are added to the individual product shelving units of the sales floor. Shelving unit numbers 1 to 47 in FIG. 2 are shelving unit numbers that are associated with an observation range, in internal storage of the information collection device 40. In the sales floor, the vicinity of the product shelving units to which these numbers 1 to 47 are associated is the observation range for store visitors.

The aforementioned completes the description regarding the room allocation in the site inside the store. Having described the internal configuration of the store, the description will next focus on the sensor installation in the store.

Figure 3:
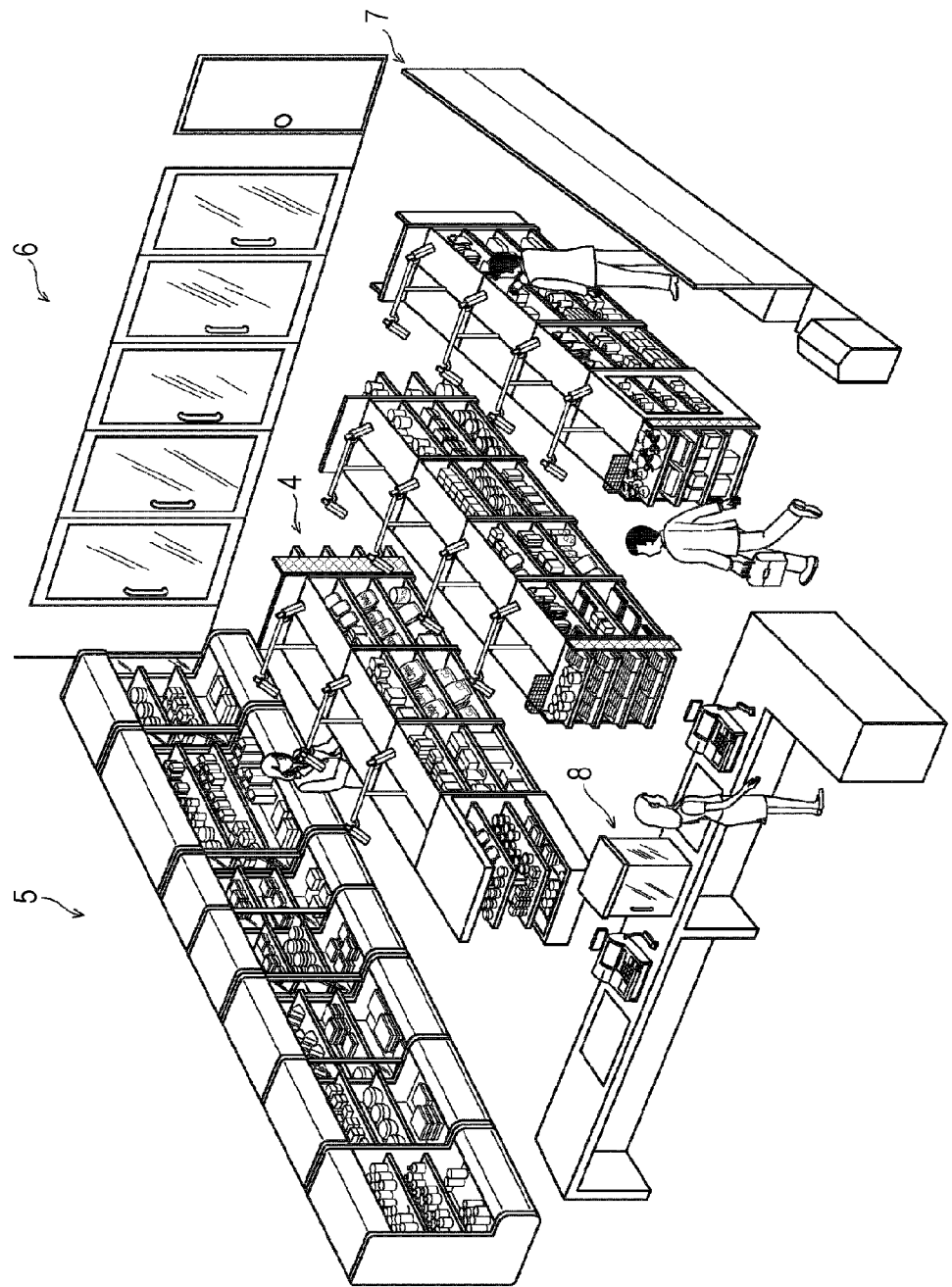
FIG. 3 is a drawing depicting an example of the internal configuration of a sales floor.

FIG. 3 depicts an example of the internal configuration of the sales floor 1. In the sales floor 1 of FIG. 3, there are five types of product shelving units, which are an ordinary-type product shelving unit 4, a low-temperature showcase-type product shelving unit 5, a refrigerator-type product shelving unit 6, a bookshelf-type product shelving unit 7, and a heat insulating-type product shelving unit 8. Although there are differences in terms of function and shape, these product shelving units are similar in that product shelves for displaying and storing products are provided therein in a plurality of levels in the vertical direction, and product storage columns are provided side-by-side in a plurality of lines in the horizontal direction in each of those product shelves.

The front and/or the rear of the ordinary-type product shelving unit 4 face aisles. In a store or the like, a plurality of product shelving units are arranged in lines in the longitudinal direction thereof. A product shelving unit is made up of pillar members, beam members connected at approximate right angles to the pillar members, and a plurality of shelving boards fixed by the beam members. Each of the shelving boards is a product shelf for displaying and storing products, and product storage columns are provided side-by-side in a plurality of lines in the horizontal direction in each of those product shelves.

The low-temperature showcase-type product shelving unit 5 is for displaying products such as rice balls, box lunches, salads, side dishes, processed goods, milk, and milk beverages, and is configured from a display cabinet that is open at the front. Product shelves and product storage columns are formed in this display cabinet. A heat-insulating wall having an approximately U-shaped cross section is attached to both sides in this display cabinet. Furthermore, a cooler and a duct are provided in a vertical manner on the rear surface of the display cabinet. A blower is located inside the duct, and air that is sucked in from a duct suction port at the lower edge of an opening is fed to the cooler. The cooling air from the cooler is discharged from a discharge port at the upper edge of the opening of the display cabinet, and is fed to products displayed in the product storage columns of each product shelf in the display cabinet. Thus, the temperature of the products in the display cabinet is maintained at a low temperature.

The refrigerator-type product shelving unit 6 is a built-in product storage that is built into the wall surface of the store, and is mainly used for storing frozen products such as ice cream and frozen food, and beverage products such as alcohol, coffee, tea, water, and juice. Product shelves and product storage columns are formed in this product storage. The front of the product storage is formed entirely as an open portion, and this open portion is covered by a single-swing door. The single-swing door is glass, and it is possible to see the beverage products in the front row in each product storage column. The product storage columns of each product shelf in the product storage extend in the depth direction, and a plurality of beverage products are stored side-by-side in a line in the depth direction so as to be taken out one at a time.

The bookshelf-type product shelving unit 7 is formed long in the lateral left-right direction, is a bookshelf supported by a pair of supports, and is used for displaying magazines. A display stand for books for sale is provided between the supports at the front side of the bookshelf, and a sample stand for vertically-placed sample books is provided at the rear surface side. A flat-stacking display stand on which books are stacked in a flat manner is provided under the display stand. The display stand, the sample stand, and the flat-stacking display stand constitute product shelves.

The heat insulating-type product shelving unit 8 is used for storing fried food, meat buns, and bean paste buns. Specifically, the heat insulating-type product shelving unit 8 includes a plurality of display cabinets and a warm air supply unit serving as an air-conditioning unit arranged below these display cabinets, and, side by side with the warm air supply unit, a cold insulating chamber arranged to the rear of the warm air supply unit, and a cooling unit arranged below the warm air supply unit. The aforementioned is a description of the product shelving units. Next, ceiling lighting that is indirect lighting for this plurality of product shelving units is described.

Control for the ceiling lighting can be sequenced by a program, and, for example, each of a plurality of lighting modes can be sequentially selected. Furthermore, a fixed lighting mode can also be set in the case where a condition has been established for selecting a lighting mode and that condition has been satisfied.

Figure 4:
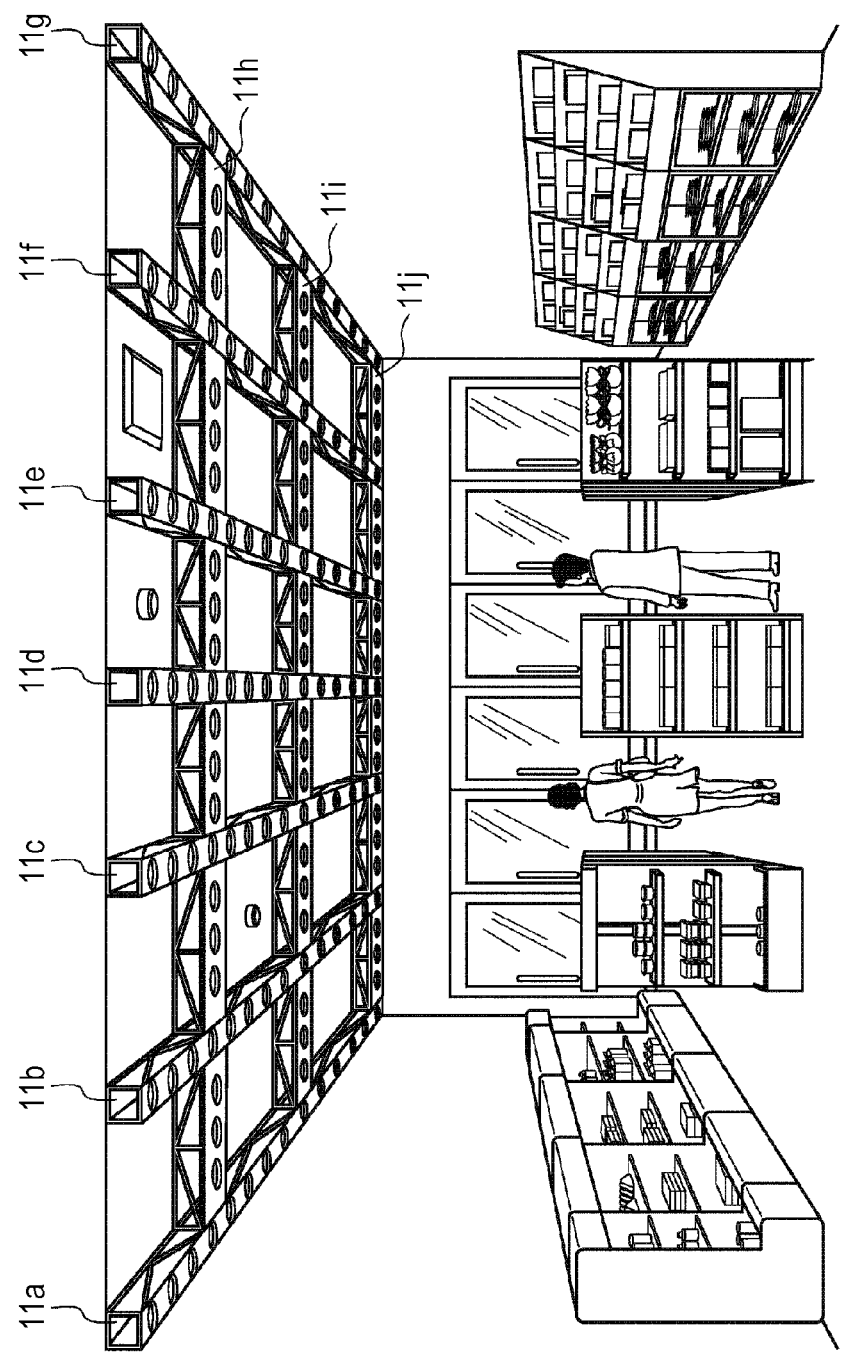
FIG. 4 is a drawing depicting ceiling lighting for the sales floor.

FIG. 4 depicts the ceiling lighting for the sales floor. In the ceiling lighting for the sales floor, there are seven rows of LED light source groups a to g for lighting that are arranged in rows in straight lines in the direction in which the aisles extend. Furthermore, there are 3 rows of LED light source groups h to j for lighting also in the horizontal direction orthogonal to the aisles. The LED light source groups are orientated diagonally downward in such a way as to illuminate the front of the product display shelving units and the aisles.

Figure 5:
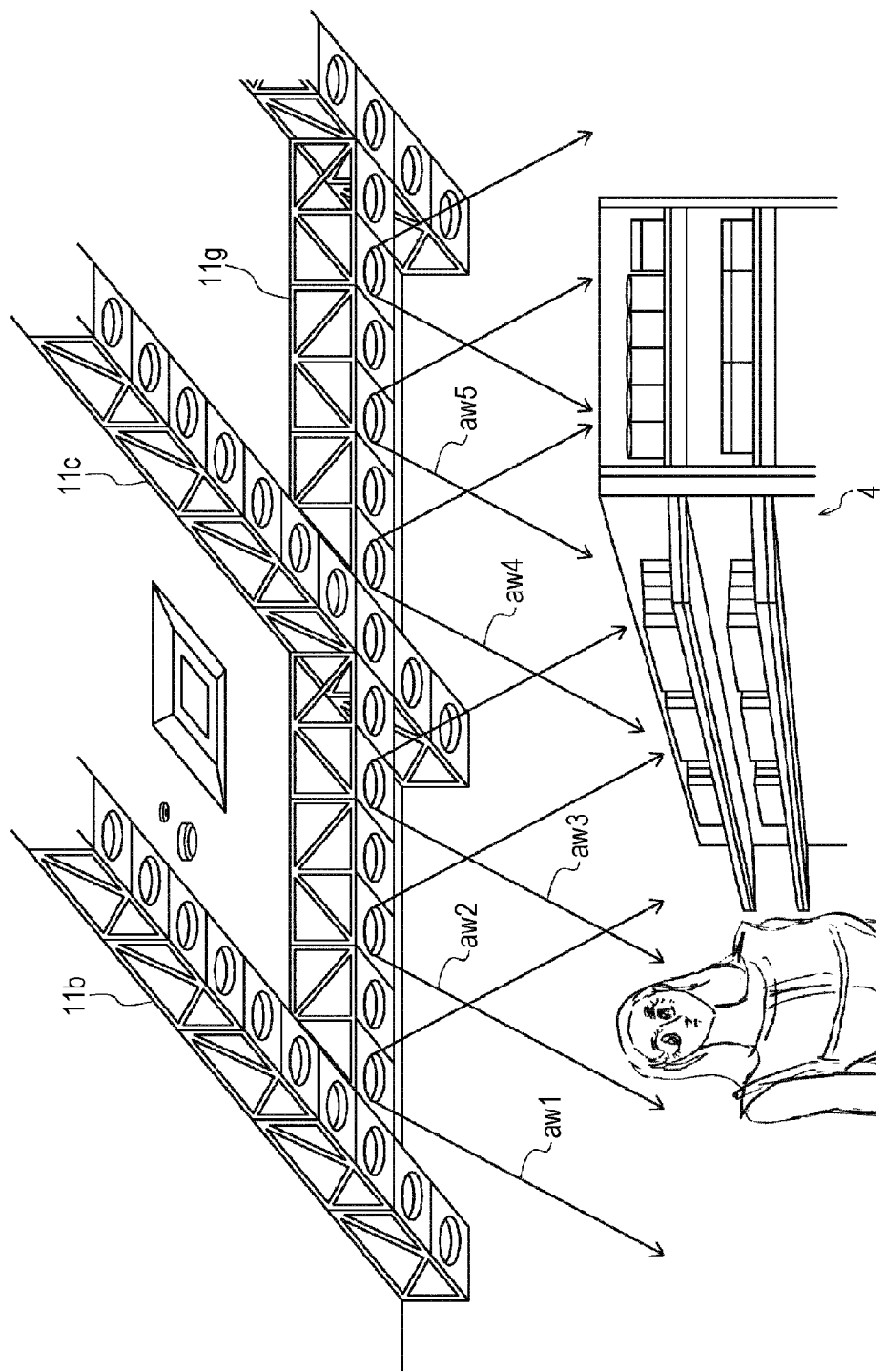
FIG. 5 is a drawing depicting illumination produced by indoor lights installed in a ceiling.

FIG. 5 depicts illumination produced by indoor lights installed in the ceiling. The arrows aw1, 2, 3, 4, 5, . . . schematically represent the illumination by these lighting lamps 11. By varying the lighting modes of the lighting lamps 11, the tone and the color temperature implemented by the lighting lamps 11 can be varied in a diverse manner.

FIG. 6 is a timing chart depicting an example of temporal transition in the selection of lighting modes. It should be noted that, in FIG. 6, although the shelving unit having shelving unit number 0 is representatively taken up and described, the same applies also to other shelving units or the selection of a lighting mode for the store. The first stage depicts a time axis. This time axis periodically repeats a variable mode interval in which it is possible for the lighting mode to be varied, and a fixed mode interval in which the mode is fixed. The second stage depicts the configuration of the variable mode intervals and the fixed mode intervals. Each of N number of lighting modes of lighting mode 0-1 to lighting mode 0-N are designated in the variable mode intervals. That is, the variable mode intervals are trial periods in which the selection of all of the lighting modes are tried with respect to the ceiling lighting, and the mode deemed to be the best in these variable mode intervals is used for as a fixed mode in the fixed mode interval. The third stage depicts the collection of merchandising values in time periods in which each of lighting mode 0-1 to lighting mode 0-N are set, and the fourth stage depicts the classification of collected merchandising values, the determining of a lighting mode on the basis of the classification result, and the issuing of a command on the basis of the determination result. As depicted in this third stage and fourth stage, the collection of merchandising values and the classifying of lighting modes are carried out in time units in which the lighting mode is switched.

The collection of merchandising values in the third stage, and the classification of merchandising values in the fourth stage are carried out in a pipeline manner. That is, the classification of merchandising values is carried out with respect to merchandising values collected in preceding time periods. The arrows aw11, 12, 13, and 14 in FIG. 6 schematically represent this pipeline-like processing. The merchandising values collected in time periods (referred to as time period 0-1 to time period 0-N) in which the lighting modes are set to lighting mode 0-1 to lighting mode 0-N, respectively, are supplied for classification in subsequent time periods, as indicated by the arrows pointing diagonally downward.

Specifically, the merchandising values collected in time period 0-1 are supplied for classification processing in time period 0-2. The merchandising values collected in time period 0-2 are supplied for classification processing in time period 0-3, and the merchandising values collected in time period 0-N−1 are supplied for classification processing in time period 0-N. When the classification of the merchandising values collected in time period 0-N by way of the pipeline has been completed, a lighting mode is determined on the basis of the classification result, and a command that instructs mode setting to the determined lighting mode (lighting mode X) is issued.

Here, for simplification purposes in FIG. 6, all of the merchandising values collected in the interval of time period 0-N are subjected to classification processing together in the interval of time period 0-N+1; however, for example, whenever one merchandising value (for example, one hand extension operation of an arbitrary customer) is collected, the classification processing for the merchandising value may be carried out parallel with collection processing for the next merchandising value.

The reference symbol iss1 in FIG. 6 schematically represents the issuing of a command for setting, to all lighting, a lighting mode X that has been determined after one pass through the modes. That is, when merchandising values of lighting mode 0-1 to lighting mode 0-N have been collected and classified, it is understood that the determining of a lighting mode on the basis of classification results, in lighting mode 0-1 after one pass through the selection of lighting mode 0-1 to lighting mode 0-N, and the issuing of a command that instructs the determined lighting mode to be fixed are carried out as indicated by this iss1.

In FIG. 6, variable mode intervals are realized by programming a selection sequence in which a plurality of lighting modes are sequentially selected. In contrast, the fixed mode intervals are periods in which one lighting mode (referred to as 0-X) is selected by setting the condition of "the highest merchandising value", and the lighting mode is fixed to this mode. A database for lighting mode control information constituting the origin for establishing this condition, and a sales information database will now be described.

FIG. 7A depicts an example of a data structure for a lighting control database. In FIG. 7A, each record has a configuration in which a "shelving unit number" and a "lighting mode" are associated with a "date and time". The records are sorted in order of date and time. The meaning here is as follows. "0" means lighting for the entire store, and "a numerical value of 1 or more" means a number of a specific shelving unit. The meaning of the lighting mode is as follows. The notation "XX" of "XX-YY" for a mode represents a number that uniquely identifies the ceiling or a product shelving unit. The lower order "YY" represents a number of an internal control parameter for lighting equipment. The date and time, represents the start time of the time period in which that lighting mode has been set. In the case where each of a plurality of lighting modes are periodically selected, the start times of the time periods in which each of those lighting modes is set are specified by this date and time.

FIG. 7B depicts an example of lighting mode control information. The lighting mode control information is information in which an identification number of a lighting mode is associated with control parameters for controlling lighting equipment. The column on the left side of the table in FIG. 7B depicts identification numbers of lighting modes, and the column on the right side depicts control parameters. The control parameters include a parameter (1) in which a setting for brightness (lumen) and a setting for color temperature (kelvins) are associated, and a parameter (2) in which brightness and an RGB mixture ratio are associated. For color temperature, warmth/coldness is expressed by a percentage. That is, 100% means the warmest color, and 0% represents the coldest color.

FIG. 8A depicts an example of a data structure for the sales information database. Sales information indicates the number of purchases that have occurred in a "sale", which constitutes a commercial action in a store. Each record in FIG. 8A is configured from a field for the date and time at which a sale occurred, and a field for the sales amount. In FIG. 8A, the records are sorted in order of date and time. In the records, the sales amount is associated with the date and time, and therefore, if the date and time are used, it becomes possible to search for how many sales there are in time periods in which each lighting mode has been set. Since it becomes possible to search for a sales amount with the date and time as a key, a sales amount can be classified as one merchandising value by using the lighting modes set in each time period. In the records, the date and time are associated with the sales, and therefore, if the date and time are used, it becomes possible to search for how many sales there are in time periods in which each lighting mode has been selected.

FIG. 8B is a graph in which the total sales amount for each hour of a plurality of time periods from 10:00 to 12:00 is expressed based on the temporal relationship with the lighting modes of FIG. 8A. FIG. 8B depicts the relationship between the lighting modes in FIGS. 7A and 7B and the sales indicated by the sales information database. The first stage is a graph in which the sales depicted in FIG. 8A from 9:00 to 13:00 are expressed as a frequency. The horizontal axis is a time axis, and the vertical axis indicates the total sales amount for each hour. The second stage depicts the setting of lighting modes in the time axis of FIG. 8A. Sales are different in the time period in which the lighting mode 0-2 has been set and the time period in which the lighting mode 0-4 has been set, and merchandising values that indicate the results of the commercial action referred to as a sale can therefore be used to evaluate each of the lighting modes 0-2 and 0-4. Classification results for the merchandising values based on this evaluation are carried out by adding, as a classification index, lighting mode information that indicates the lighting mode selected when there has been a commercial action or a preliminary action therefor, in a store. The notation for adding a classification index will now be described.

FIG. 8C depicts the notation (referred to as MD classification notation) for merchandising value classification results. "Shop_Place.Action_Type" on the left side of the equal sign in FIG. 8C indicates the location where a merchandising value has been collected, and the type of action targeted for collection. "Lighting_Mode.MD_Value" on the right side indicates the classification result. "Lighting_Mode" before the "." symbol is a classification index, and "MD_Value" after the "." symbol is the sales amount per one hour.

Figure 9:
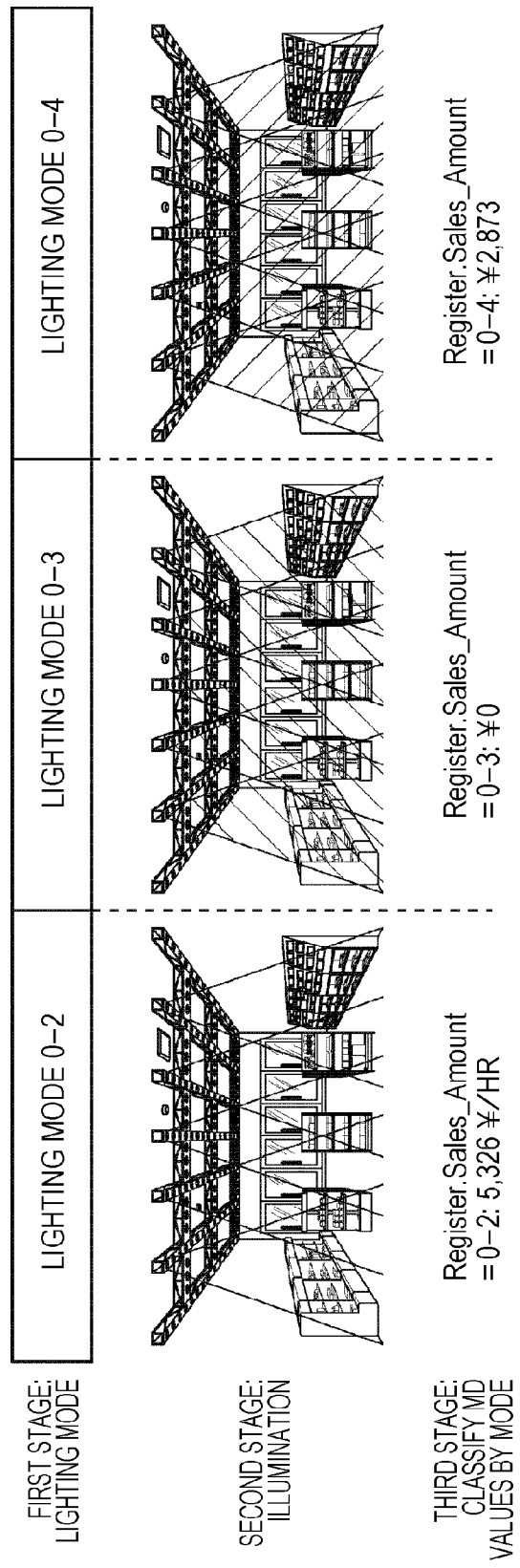
FIG. 9 is a drawing depicting an example of the transition of illumination according to each lighting mode.

FIG. 9 depicts an example of the transition of illumination according to each lighting mode. The first stage is a plurality of lighting modes on a time axis, and the second stage depicts the illumination according to each lighting mode. The differences in the hatching patterns in FIG. 9 indicate that the tone and temperature color of the store space are different in each lighting mode. The third stage depicts merchandising value classification in the lighting modes. The classification results of "Register.Sales_Amount=Lighting_Mode_0-1: 5,236 Y/hr and Lighting_Mode_0-4: 2,873 Y/hr" are given according to the aforementioned MD classification notation, and the specific numerical values of the third stage correspond to FIG. 8B. As depicted in FIG. 9, the indirect lighting of the store varies in accordance with the selection of the lighting mode, and it is clear that the sales in the time periods when each lighting mode is selected are associated with lighting mode information in the form of the merchandising values.

As described above, merchandising values per one hour have a lighting mode that is an index added thereto, and are arranged separated by commas. If the classification results are output, it is possible to compare which lighting mode settings are effective from the viewpoint of the sales amount. The aforementioned refers to the classification of merchandising values indicating a commercial action.

Merchandising values for not only the result of a direct commercial action such as the sales amounts but also preliminary actions such as entering the store and staying are also targeted for classification. A method for observing preliminary actions is described next. This observation is carried out by using a pyroelectric sensor.

Figure 10:
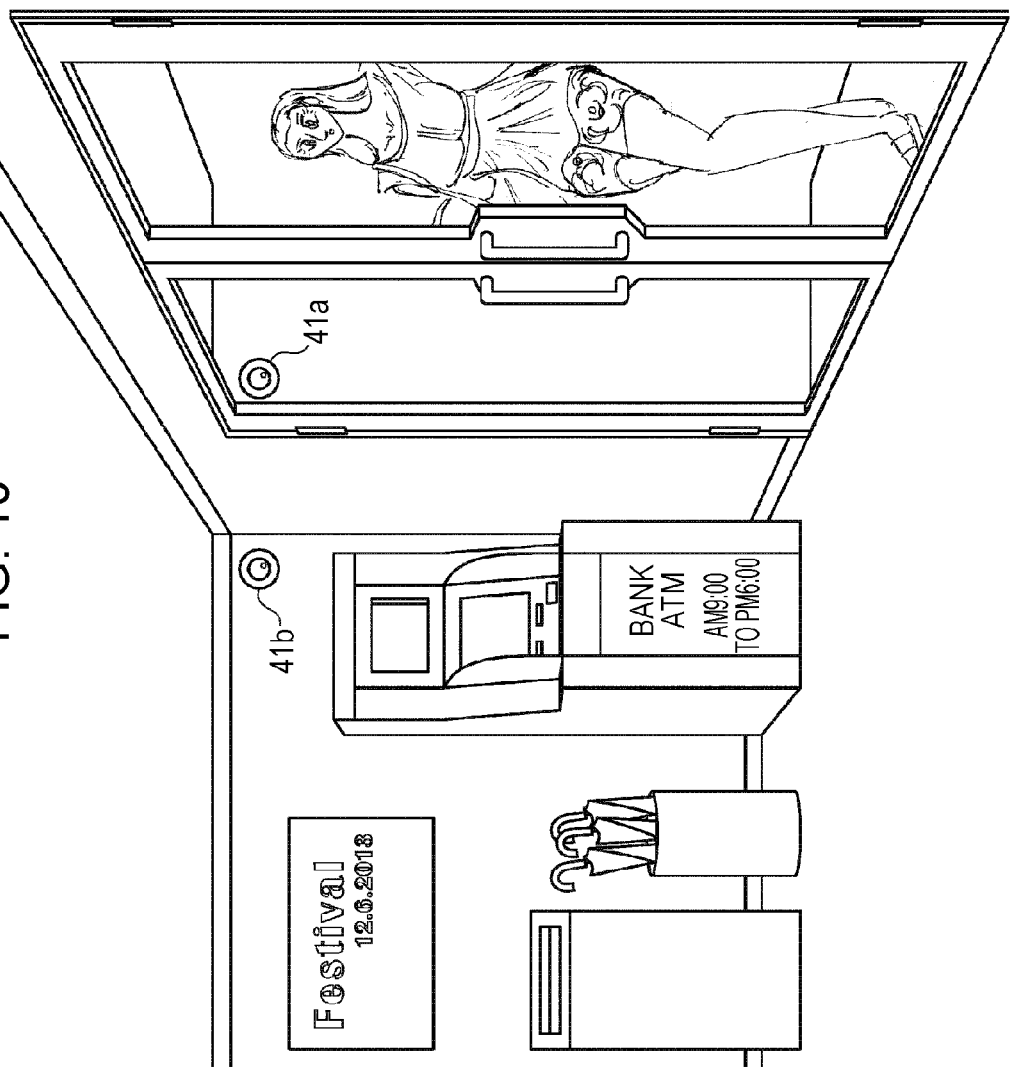
FIG. 10 is a drawing depicting the entrance of a store.

FIG. 10 depicts the entrance of a store. Pyroelectric sensors 41a and 41b are located on a wall surface at the sidewalk side of the entrance and on a wall surface at the indoor side of the entrance. When this pair of pyroelectric sensors 41a and 41b detect a store visitor in the order of pyroelectric sensor 41a→pyroelectric sensor 41b, this is counted as a store visitor entering the sales floor. On the other hand, when a store visitor is detected in the order of pyroelectric sensor 41b→pyroelectric sensor 41a, this is counted as a store visitor leaving. Here, the pyroelectric sensors will now be described. A pyroelectric sensor is an infrared non-contact sensor that causes electric charge to be polarized in accordance with the amount of detected heat of infrared rays incident to an infrared ray incident section, and detects the magnitude of this polarized charge by way of a voltage signal. A pyroelectric sensor uses the temperature change when a detection object moves to thereby detect the detection object, and therefore, when the detection object is stationary, the temperature does not change and the pyroelectric sensor cannot detect the detection object. Therefore, a chopper is often provided in front of the infrared ray incident section, incident infrared rays are intermittently blocked by this chopper to create changes in the amount of incident heat and, thus, the detection accuracy when the detection object is in a stationary state is increased. FIG. 10 depicts a situation in which the entry of a store visitor is detected by the pyroelectric sensors 41.

The reason why the pyroelectric sensors 41 are provided at a first entrance, which is the entrance/exit to and from the sidewalk, and the number of store visitors is counted is in order to estimate how many store visitors have stepped into the store and come into contact with the atmosphere inside the store, to estimate the proportion of people who have made purchases among these store visitors, and to count the number of people who have entered the store per unit time.

The reason why the pyroelectric sensors 41 are provided at the second entrance and entry to the eat-in corner is counted is because it is desirable for the preliminary actions of purchased products being eaten and drunk to be observed.

Entry to the eat-in corner is evaluated as being the effect of a purchase product being made to look delicious by the lighting in the store, and as a significant result of the selection of the lighting mode. The selection of the lighting mode is able to be evaluated in greater detail by counting the preliminary action of entry to the eat-in corner separately from entry to the sales floor. In this way, the number of people who have entered the store and the number of people who have entered the eat-in corner are identified as merchandising values.

The sensors are attached not only at the entrances but also to the product shelving units. The sensors in front of these product shelving units are for turning on the shelving unit individual lighting device 20 in accordance with the detection of the approach of a store visitor. Next, the detection of a preliminary action in the vicinity of a product shelving unit is described.

FIG. 11A depicts the external appearance of the product shelving unit 4. On the shelves of the uppermost level of the product shelving units in FIG. 11A, pyroelectric sensors 41c and 41d are located in the center of the side surface facing the aisle. Furthermore, range measurement sensors 42a and 42b and range measurement sensors 42c and 42d are located at both ends of the side surfaces facing the aisle. In addition, lighting fixtures 21a and 21b for each shelving unit are located on the top level of the product shelving units. The lighting fixtures 21a and 21b turn on when the approach of a store visitor is detected by these pyroelectric sensors 41c and 41d. These pyroelectric sensors 41c and 41d and the range measurement sensors 42c and 42d provided in the product shelving units are for detecting a store visitor staying and a store visitor extending a hand. "Staying" refers to the detection of the approach of a store visitor by the pyroelectric sensors 41 provided in one product shelving unit continuing for a fixed time or more (for example, 5 seconds or more). Therefore, when the pyroelectric sensors 41c and 41d provided in the product shelving units have detected a store visitor, measurement by a timer is started, and if the aforementioned fixed time is clocked, a timeout occurs and a detection result of a store visitor having stayed is issued.

The lighting fixtures 21 turns on due to the approach of a store visitor toward a product shelving unit, as control in response to the store visitor staying. The triangular pyramids tr11 and tr12 in FIG. 11A represent the turning on of the lighting fixtures 21a and 21b due to the approach of the store visitor toward the product shelving units. It is possible for this turning on of the lighting fixtures 21a and 21b to also be sequenced by a program. For example, each of the plurality of lighting modes can be sequentially selected. Furthermore, a fixed lighting mode can also be set in the case where a condition has been established for selecting a lighting mode and that condition has been satisfied.

The aforementioned is a description of the pyroelectric sensors 41 provided in the product shelving units. Next, the range measurement sensors 42 provided in the product shelving units are described.

It should be noted that if the sensing range (measurable distance and viewing angle) of the range measurement sensors 42 is not sufficient for the size of the front-side plane of a product shelving unit, a plurality of range measurement sensors may be positioned on the product shelving unit.

The range measurement sensors are phase-type range measurement sensors, and have therein a light-projecting element and a mirror that reflects a beam emitted by the light-projecting element. Beam scanning is carried out by rotational movement of this mirror. The extension of a hand refers to the range measurement sensors 42 provided at the sides of the product shelving units detecting an object. If a store visitor extends a hand at a product shelving unit where the sensing range is formed, the position detected by the sensors is expressed by an angle θ and a radial length r of a coordinate system in which the center of the circle of rotation of the rotational movement is the starting point. It is possible to estimate that a product storage column which is included in a product shelving unit into which a store visitor has extended a hand, and which has an occupying range (x1, z1) to (x2, z2) in an X-Z coordinate system where the height direction of the product shelving unit is taken as the Z axis direction and the width direction is taken as the X axis direction that includes a hand extension position (r, θ) detected by the sensors is a product storage column into which a store visitor has extended a hand. It is thought that a product stored in that product storage column toward which a store visitor has extended a hand is a product that the store visitor had been trying to take. In this way, products that are targets for the extension of a hand can be estimated from the position detected by the range measurement sensors 42.

The occupying range in the X-Z coordinate system in which the height direction of a product shelving unit is taken as the Z axis direction and the width direction is taken as the X axis direction is managed with the display information table of FIG. 11B. FIG. 11B depicts an example of a data structure for a display information table for a product shelving unit. In the data structure, a product ID, a shelving unit number, and an occupying range constitute individual records. This occupying range indicates the occupying range of a product storage column in a product shelving unit by using coordinates values (x1, z1) to (x2, z2) in the X-Z coordinate system in which the height direction of a product shelving unit is taken as the Z axis direction and the width direction is taken as the X axis direction. FIG. 11C depicts the X-Z coordinate system.

Figure 12A:
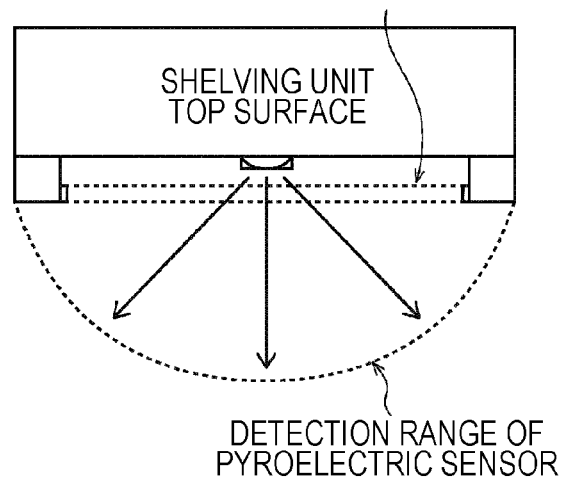
FIG. 12A is a drawing depicting the detection range of a pyroelectric sensor and a range measurement sensor in an X-Y coordinate system that specifies a store internal map.

FIG. 12A is a drawing serving as an example of a countermeasure for when the front-side plane of a product shelving unit is not able to be sufficiently covered in the sensing range of one range measurement sensor 42, in which the pair of range measurement sensors 42a and 42b and the pair of range measurement sensors 42c and 42d are provided at both sides of product shelving units, and the range measurement sensors 42 are provided as required also in the height direction such that a blind spot in the sensing range is covered by two or more of the range measurement sensors 42. FIG. 12A depicts the detection range of the range measurement sensors 42 in an X-Y coordinate system that specifies a store internal map. Since the pyroelectric sensors 41c and 41d are located in the center at the front of the product shelving units, the detection range of the pyroelectric sensors 41 is a semicircular range at the front of the product shelving units. In contrast, the detection range of the range measurement sensors 42a and 42b is a linear range parallel to the front of the product shelving units.

Figure 12B:
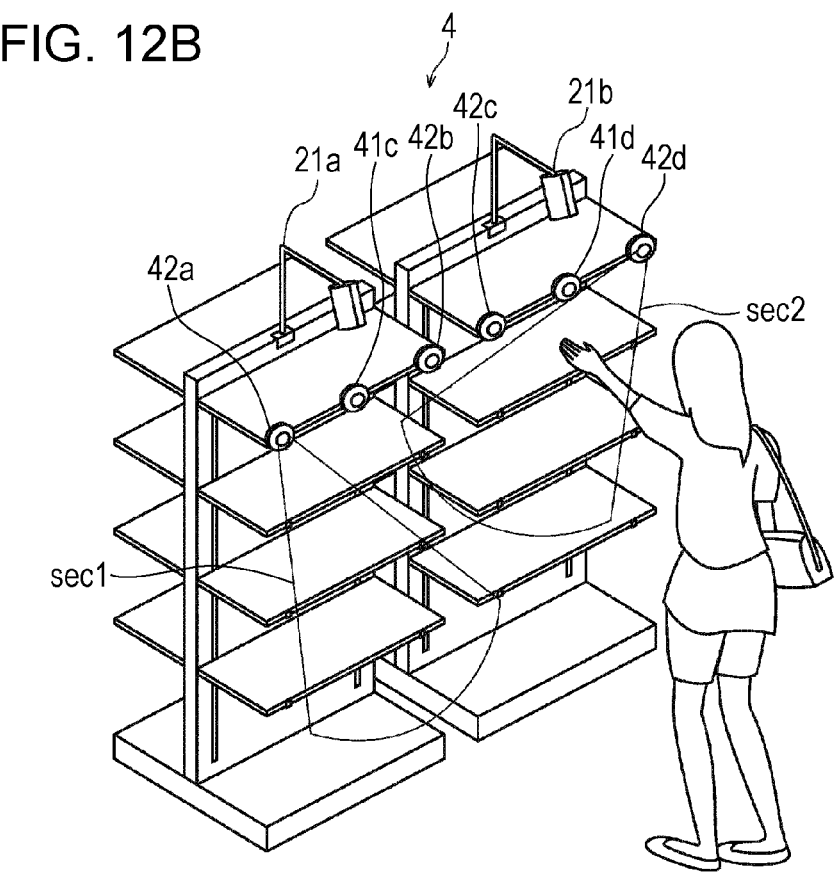
FIG. 12B is a drawing schematically depicting sensing ranges of range measurement sensors.

Fan shapes sec1 and sec2 in FIG. 12B schematically depict the sensing ranges of the range measurement sensors 42a and 42d.

It is not only the product shelving units depicted in FIG. 12A and FIG. 12B that have the pyroelectric sensors 41 and the pairs of range measurement sensors 42 but also the low-temperature showcase-type product shelving units (product shelving unit 5). The product shelving units have lighting for each shelf and the products on each shelf are illuminated.

Figure 13:
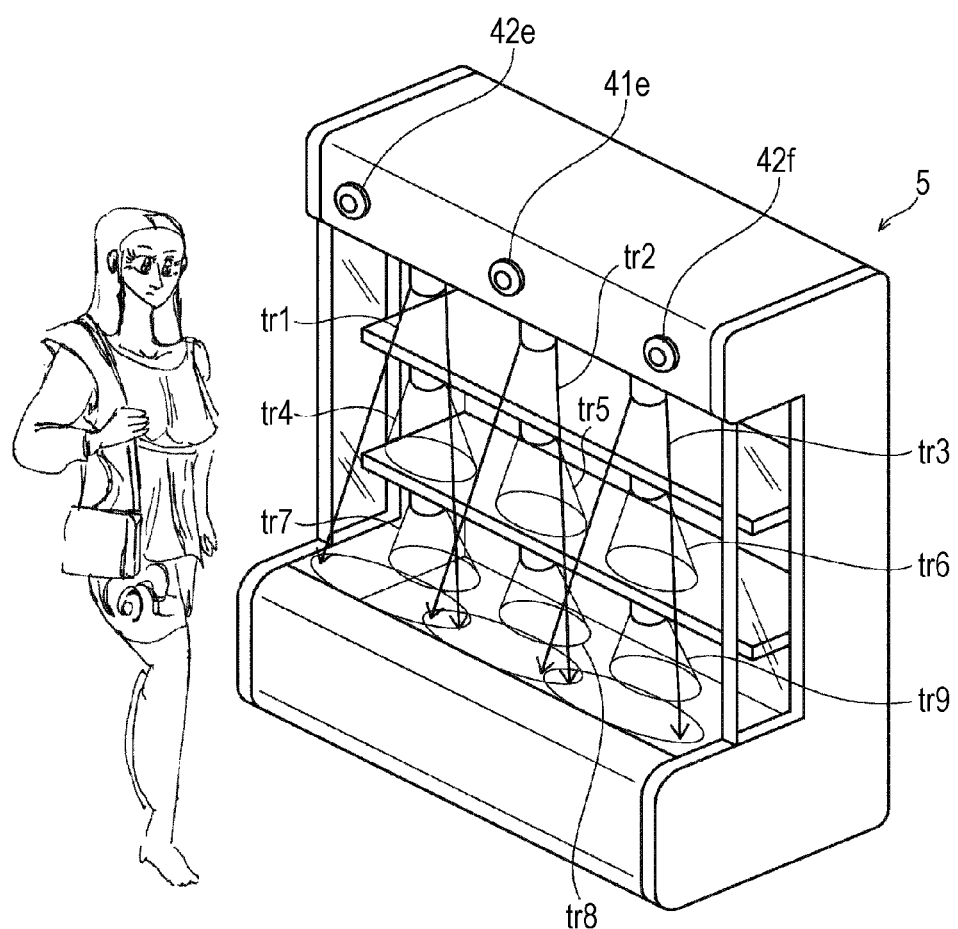
FIG. 13 is a drawing depicting an example of individual lighting by a low-temperature showcase-type product shelving unit.

FIG. 13 depicts an example of individual lighting by the low-temperature showcase-type product shelving unit 5. In this product shelving unit, lighting specific to the product shelving unit and lighting for each shelf are located inside the shelving unit, separate from the ceiling lighting, and products placed in the storage columns are illuminated by the lighting specific to the product shelving unit and the lighting for each shelf. The appeal of a product can be brought out by turning on the LED light source specific to the product shelving unit and the lighting for each shelf in accordance with detection of the approach of a visitor by the pyroelectric sensors 41 and the detection of the extension of a hand by the range measurement sensors 42. The cones tr1, tr2, tr3, tr4, . . . in FIG. 13 represent the ranges illuminated by the lighting of each shelf.

Observation information of the pyroelectric sensors 41 and the range measurement sensors 42 provided at the entrances and in these product shelving units is accumulated in the observation information database. The observation information is information that indicates the behavior of store visitors observed by the pyroelectric sensors 41, the range measurement sensors 42, and a monitoring camera. The behavior of a visitor measured with one item of observation information constitutes a preliminary action that is antecedent to a commercial action, and includes behavior that has lead directly to a purchase and behavior that has not lead to a purchase but has the possibility of leading to a purchase in the future.

Figures 14A, 14B:
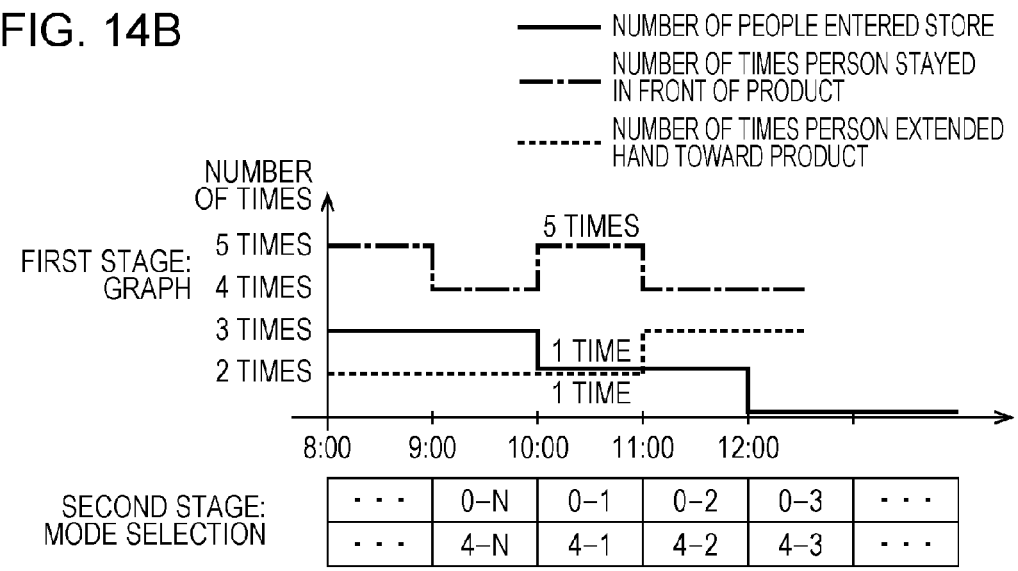
FIG. 14A is a drawing depicting an example of a data structure for an observation information database.
FIG. 14B is a drawing in which the number of people who have entered the store, the number of times a person has stayed, and the number of times a person has extended a hand, which are indicated in the observation information database of FIG. 14A, are associated with a lighting mode in each product shelving unit.

FIG. 14A depicts an example of a data structure for the observation information database. Each record of the database is configured with the "location number", the "number of people detected", and the "number of hand extensions detected" being indicated in association with the "date and time". In FIG. 14A, the records are sorted in ascending order of date and time. As exemplified by several of the records, the record of 10:38:31 on 11/12 indicates that a person was detected at an entrance but a hand extension was not detected. In this record, the number of people detected and the number of hand extensions detected are associated with the date and time, and therefore, if these dates and times are used, it becomes possible to search for the number of people detected and the number of hand extensions detected in time periods in which each lighting mode has been set. Since it becomes possible to search the number of people detected and the number of hand extensions detected with the date and time as a key, a sales amount can be classified as one merchandising value by using the lighting modes set in each time period.

The conversion principle for converting the number of people detected and the number of hand extensions detected depicted in FIG. 14A into merchandising values will now be described. Since the number of hand extensions detected is detected by range measurement sensors 42 installed in a product shelving unit, this detected number is converted as it is into the merchandising value of "a hand being extended toward a product shelving unit".

However, with regard to the number of people detected, there is that which is detected by the pyroelectric sensors 41 installed at the first entrance, that which is detected by the pyroelectric sensors 41 installed at the second entrance, and that which is detected by the pyroelectric sensors 41 installed in the product shelving units.

The number of people detected by the pyroelectric sensors 41 installed at the first entrance is converted into the merchandising values of "the number of people who have entered the store" and "the number of people who have left the store".

The number of people detected by the pyroelectric sensors 41 installed at the second entrance is converted into the merchandising value of "the number of people who have entered" the eat-in corner or "the number of people who have left" the eat-in corner.

The number of people detected at a product shelving unit is converted into the merchandising value of "the number of people who have stayed" at the product shelving unit. The description becomes complicated if the number of people who have entered the store, the number of people who have left the store, the number of people who have entered the eat-in corner, the number of people who have left the eat-in corner, and the number of people who have stayed at a product shelving unit are all described, and therefore the number of people detected that is targeted for merchandising value classification is described focusing on the two items of the number of people who have entered the store and the number of people who have stayed at a product shelving unit.

FIG. 14B is a drawing in which the number of people who have entered the store, the number of times a person has stayed, and the number of times a person has extended a hand, which are indicated in the observation information database of FIG. 14A, are associated with a lighting mode in each product shelving unit. The first stage depicts a graph in which the vertical axis is the frequency of the number of store entries, the number of times a person has stayed, and the number of times a person has extended a hand, and the horizontal axis is a time axis, and the second stage depicts lighting mode selection in each time period of the time axis. The number of store entries, the number of times a person has stayed, and the number of times a person has extended a hand are expressed by different types of lines in the first stage. When looking at the time period of 10:00, it has been counted that a person has been detected at the product shelving unit 4 five times, and that a person has entered the first entrance and a person has entered the second entrance once. Since the number of store entries, the number of times a person has stayed, and the number of times a person has extended a hand vary in the time periods on the time axis, a correlation between the lighting mode selection and the merchandising values can be detected. The second stage depicts the lighting mode selection in each time period from 8:00 to 12:00. When the merchandising values of the number of people detected and the number of hand extensions detected are classified based on the temporal relationship between the lighting mode selection and the merchandising values in FIG. 14B, and that classification result is written according to the MD classification notation, the following are produced. First_Entrance.Entry_Number=Lighting_Mode_0-1: 1 time/hr Second_Entrance.Entry_Number=Lighting_Mode_0-1: 1 time/hr Shelving_Unit_4.Stay_Number=Lighting_Mode_4-1: 5 times/hr Shelving_Unit_4.Hand_Extension_Number=Lighting_Mode_4-1: 1 time/hr These indicate that classification is carried out by a lighting mode such as lighting mode 0-1 being associated as an index with a merchandising value such as one time per one hour as the number of store entries for the first entrance. The aforementioned is a description of the relationship between merchandising values that indicate preliminary actions, and lighting modes.

FIG. 15 depicts the difference between illumination in each lighting mode by direct lighting in a product shelving unit. The first stage depicts the lighting mode selection in each time period in a time axis. The lighting modes selected here are the same as the lighting modes in FIG. 14B. The second stage depicts illumination by the lighting fixtures 21 provided in the product shelving units. The differences in the hatching pattern in the triangular pyramids in FIG. 15 indicate differences in the tone and the temperature color produced by the lighting fixtures 21 provided in the shelving units. The third stage expresses classification results for merchandising values according to lighting modes, in accordance with the aforementioned MD classification notation.

The temporal and positional relationships that specify classification according to merchandising values will now be described. First, to begin, the temporal relationship will be described. Since the ceiling lighting and shelving unit individual lighting periodically vary in each fixed time period, commercial actions that constitute product sales, and preliminary actions such as entry into the store, entry into an area, staying in front of a shelving unit, and extending a hand toward a shelving unit are temporally related to the selected lighting mode, in a time period that includes the point in time at which that action occurred. Next, the positional relationship will be described. Since there is indirect lighting and direct lighting in the store space, it is necessary to determine the merits of classification on the basis of these spatial relationships. Spatial relationship refers to, when there is direct lighting at a position where a preliminary action has occurred, the lighting mode selected by that direct lighting having a positional relationship, and when there is no direct lighting, the lighting mode of the indirect lighting having a positional relationship. There is no direct lighting for a commercial action such as a sale or a preliminary action such as entering the sales floor. This is because direct lighting is not provided at the register or the first entrance. Thus, the lighting mode that has been used for indirect lighting is used for classification with regard to a sale action and entering the store. The detected numbers indicated in the observation information are totaled, and the number detected per unit time is calculated when divided by the time length. By associating this number detected per unit time with lighting mode information that indicates the lighting mode at the time when detection was performed, the merchandising values for preliminary actions such as entering the store, staying, and extending a hand can be classified using the lighting mode.

The aforementioned completes the description regarding the lighting equipment, the pyroelectric sensors, and the range measurement sensors. With the lighting equipment, the pyroelectric sensors, and the range measurement sensors having been described, the description will next focus on the configuration of the various kinds of databases in the system.

Figure 16:
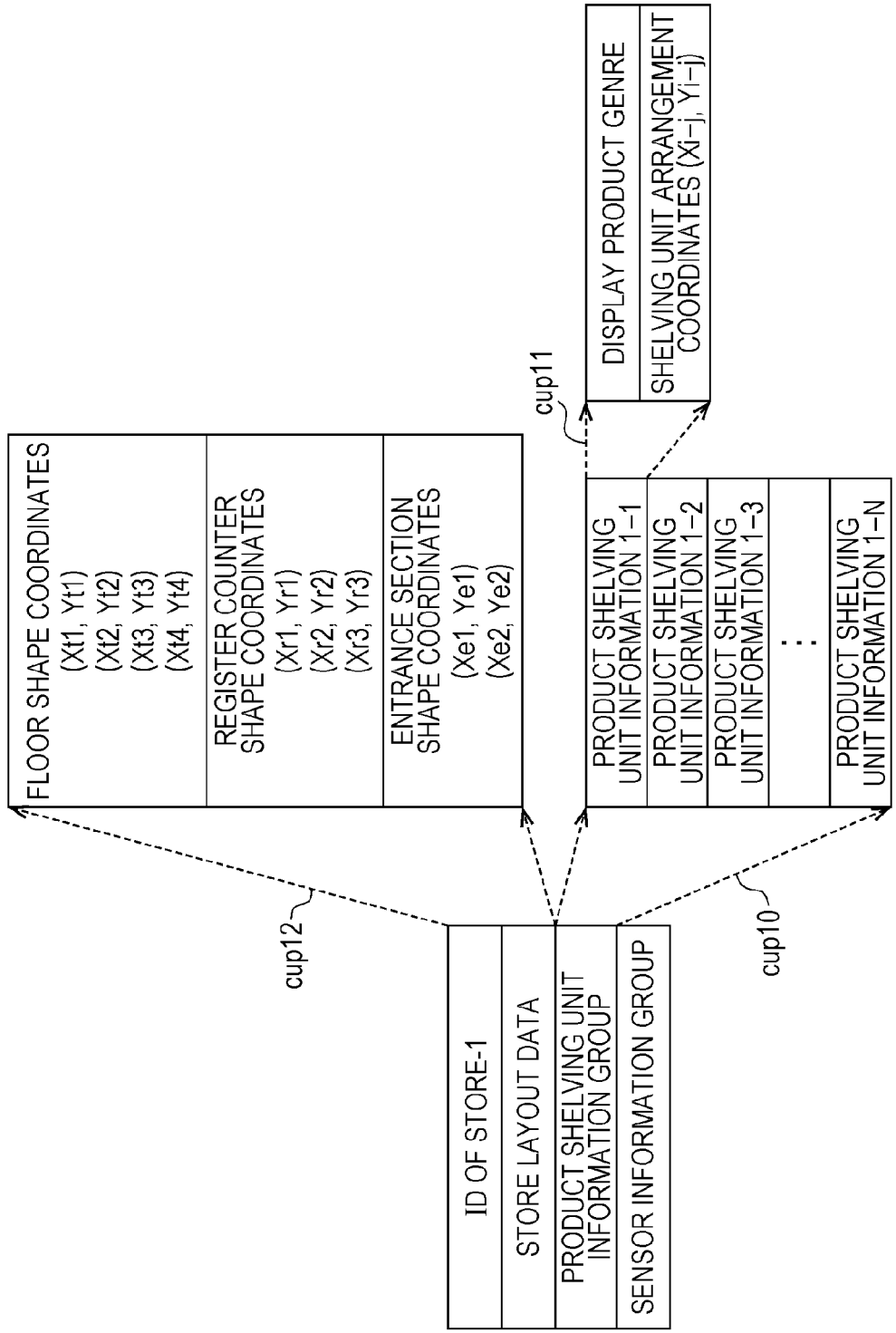
FIG. 16 is a drawing depicting an example of a data structure for store information.

FIG. 16 is a drawing depicting an example of a data structure for store information. As depicted in FIG. 16, the store information is configured from "store ID", "store layout data", "product shelving unit information group", and "sensor information group". The leadout lines cup10 are a close-up of the configuration of the product shelving unit information group. As indicated by the leadout lines cup10, the product shelving unit information is configured from a plurality of product shelving unit information belonging to one store. The numerical values of 1-1, 1-2, and 1-3 in FIG. 16 indicate that the product shelving unit information relates to number 1, 2, and 3 product shelving units in the store for which the identifier is 1. The leadout lines cup11 are a close-up of the internal configuration of a single item of product shelving unit information. As indicated by the leadout lines cup11, the product shelving unit information is configured from "display product genre" that indicates the genre of products displayed in the product shelving unit, and "shelving unit arrangement coordinates" that indicate coordinates where a shelving unit icon is to be arranged.

The leadout lines cup12 of FIG. 16 are a close-up of the configuration of store layout data. As depicted by the leadout lines cup12, the store layout data is configured from "floor shape coordinates" that indicate the shape of the store floor, "register counter shape coordinates" that indicate the shape of the register counter in the store floor, and "entrance section shape coordinates" that indicate the shape of the entrance section. The coordinates (Xi–j, Yi–j) in FIG. 16 indicate an example of "product shelving unit coordinates" where one product shelving unit icon is to be arranged in a screen coordinate system. The coordinates (Xt1, Yt1), (Xt2, Yt2), (Xt3, Yt3), and (Xt4, Yt4) are an example of entrance section shape coordinates, and indicate where the four corners of the floor shape are in the screen coordinate system. The coordinates (Xr1, Yr1), (Xr2, Yr2), (Xr3, Yr3), . . . are an example of register counter shape coordinates, and indicate where in the floor is occupied by the register counter in the screen coordinate system. The coordinates (Xe1, Ye1), (Xe2, Ye2), (Xe3, Ye3), . . . are an example of entrance section shape coordinates, and indicate where in the floor is occupied by the entrance section in the screen coordinate system.

Figure 17A:
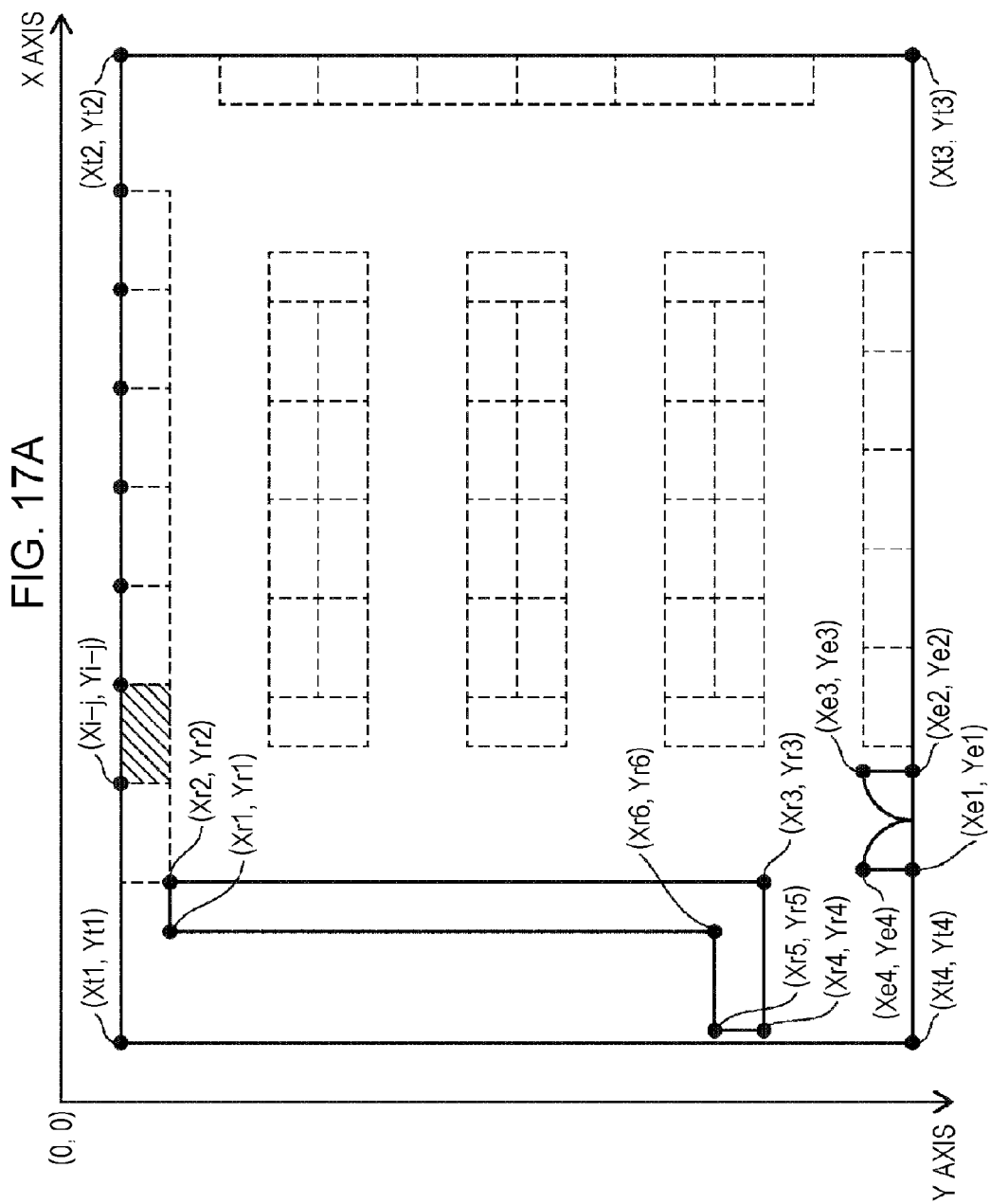
FIG. 17A is a drawing in which (Xi-j, Yi-j) that are shelving unit arrangement coordinates, (Xt1, Yt1), (Xt2, Yt2), (Xt3, Yt3), . . . that are floor shape coordinates, and (Xr1, Yr1), (Xr2, Yr2), (Xr3, Yr3), . . . that are register counter shape coordinates are plotted in a screen coordinate system.
Figure 17B:
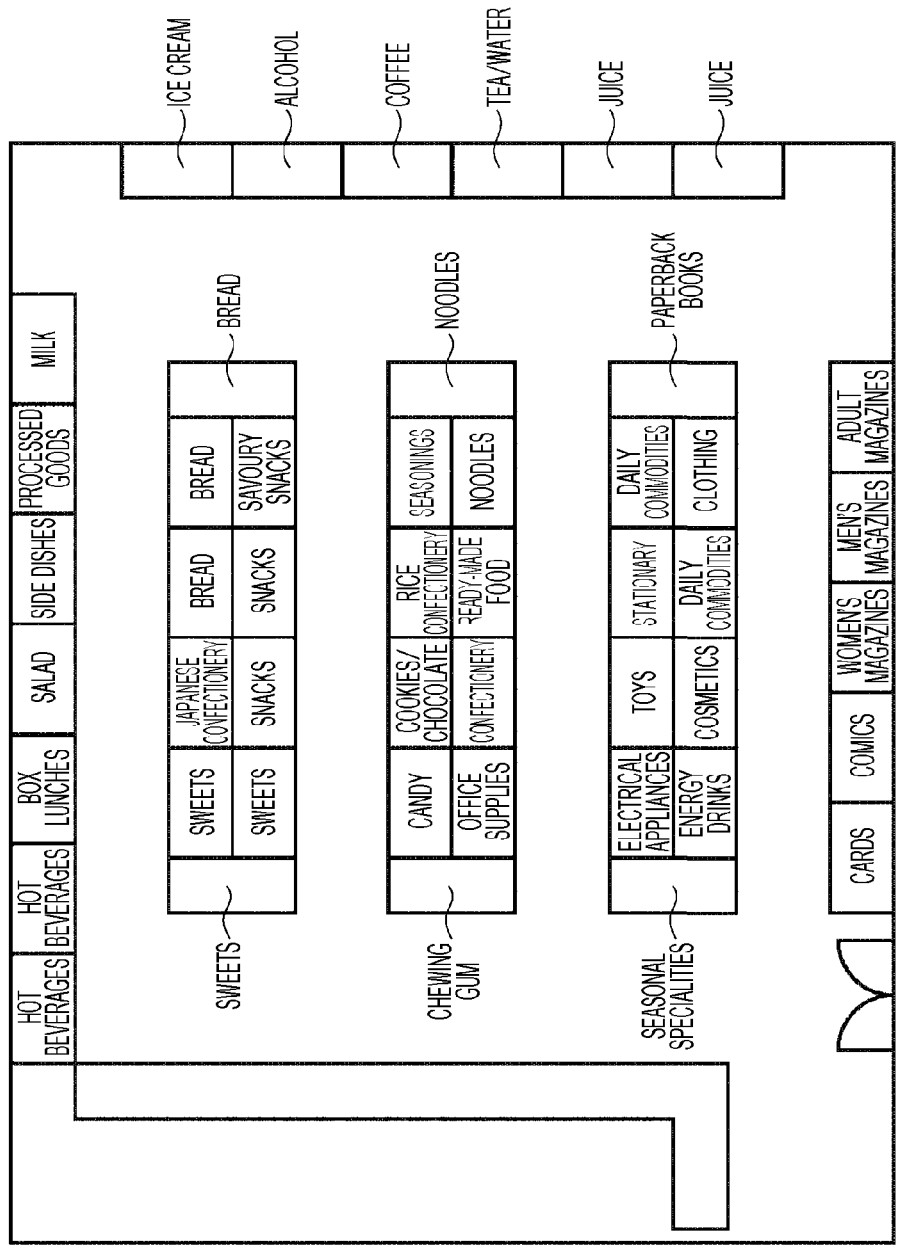
FIG. 17B is a drawing depicting an example of a store screen created according to shelving unit arrangement coordinates for product shelving units, floor shape coordinates, and entrance section shape coordinates.

Next, a plan layout in the store site will be described. The layout specific to the store is indicated in the store information in the tablet terminal 80. FIG. 17A is a drawing in which (Xi–j, Yi–j) that are shelving unit arrangement coordinates, (Xt1, Yt1), (Xt2, Yt2), (Xt3, Yt3), . . . that are floor shape coordinates, and (Xr1, Yr1), (Xr2, Yr2), (Xr3, Yr3), . . . that are register counter shape coordinates are plotted in the screen coordinate system. The horizontal direction in FIG. 17A represents the X axis, and the vertical direction represents the Y axis. In the coordinate system of the screen, if (Xt1, Yt1), (Xt2, Yt2), (Xt3, Yt3), and (Xt4, Yt4) are joined by a line, the overall shape of the floor is drawn in the screen coordinate system. If (Xr1, Yr1), (Xr2, Yr2), (Xr3, Yr3), . . . are joined by a line, the register counter is drawn, and if (Xe1, Ye1), (Xe2, Ye2), (Xe3, Ye3), . . . are joined by a line, the entrance section is drawn. Product shelving unit icons are then arranged in such a way that the upper left becomes (Xi–j, Yi–j). FIG. 17B depicts an example of a store screen created according to the shelving unit arrangement coordinates for product shelving units, the floor shape coordinates, and the entrance section shape coordinates.

Figures 18A, 18B:
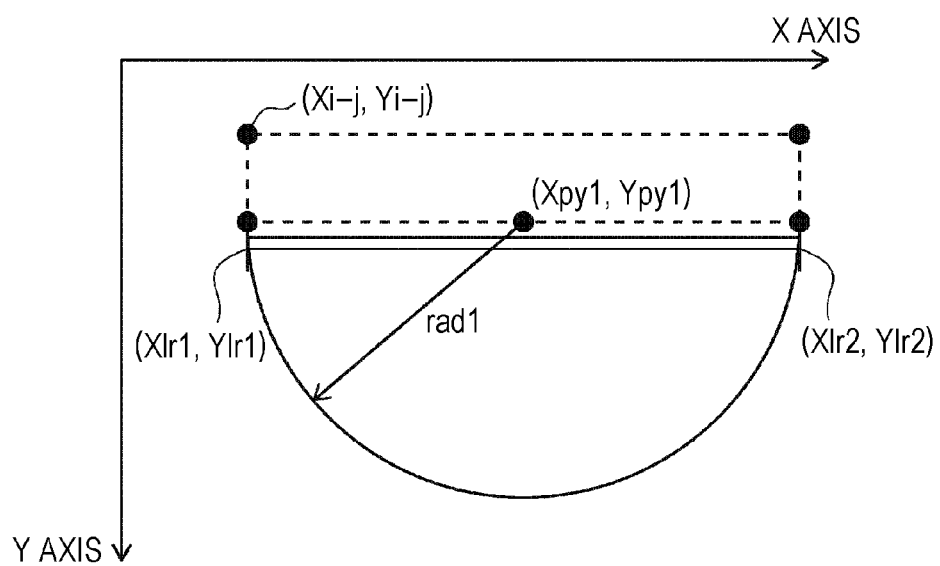
FIG. 18A depicts an example of a data structure for a sensor information group.
FIG. 18B is a drawing in which the sensing range of a pyroelectric sensor and the sensing range of a range measurement sensor are plotted in a screen coordinate system.

The observation information processing unit 43 specifies the observation ranges of the pyroelectric sensors 41 and the range measurement sensors 42 in accordance with the X-Y coordinate system in the site internal product shelving unit layout. The observation ranges of the pyroelectric sensors 41 and the range measurement sensors 42 provided in the entrances and these product shelving units are integrally managed in a sensor information group such as that in FIG. 18A. FIG. 18A depicts an example of a data structure for the sensor information group. A record in FIG. 18A is made up of "sensor number", "type", and "observation range". The coordinates (Xpy1, Ypy1) in FIG. 18A represent the central coordinates of the observation range of the pyroelectric sensors 41 in the coordinate system of the layout image. Furthermore, rad1 represents the radial distance from the central coordinates to an observation position. The coordinates (Xlr1, Ylr1) to (X1r2, Y1r2) represent the start point and endpoint of a linear range that is the sensing range of a range measurement sensor.

FIG. 18B is a drawing in which the sensing range of a pyroelectric sensor and the sensing range of range measurement sensors are plotted at (Xi–j, Yi–j) that are shelving unit arrangement coordinates, in the screen coordinate system. The detection ranges of the pyroelectric sensors 41 and the range measurement sensors 42 are specified in the X-Y coordinate system in accordance with the sensor information.

The aforementioned completes the description regarding sensing ranges by the pyroelectric sensors 41 and the range measurement sensors 42. Having described the sensor installation, the description will next focus on the screen images.

FIG. 19 is a drawing depicting an example of a situation in which the tablet terminal 80 is used. In the tablet terminal 80 in FIG. 19, touching the screen means selecting an icon and pressing a button. By receiving a touch operation in the screen, any of the product shelving unit icons in the store screen are set to a selected state, and various buttons in the store screen can be pressed. The tablet terminal 80 is possessed by a user such as a staff member of a franchise chain head office or an owner of a store in the aforementioned situation, and is provided to be used by that user.

Figure 20:
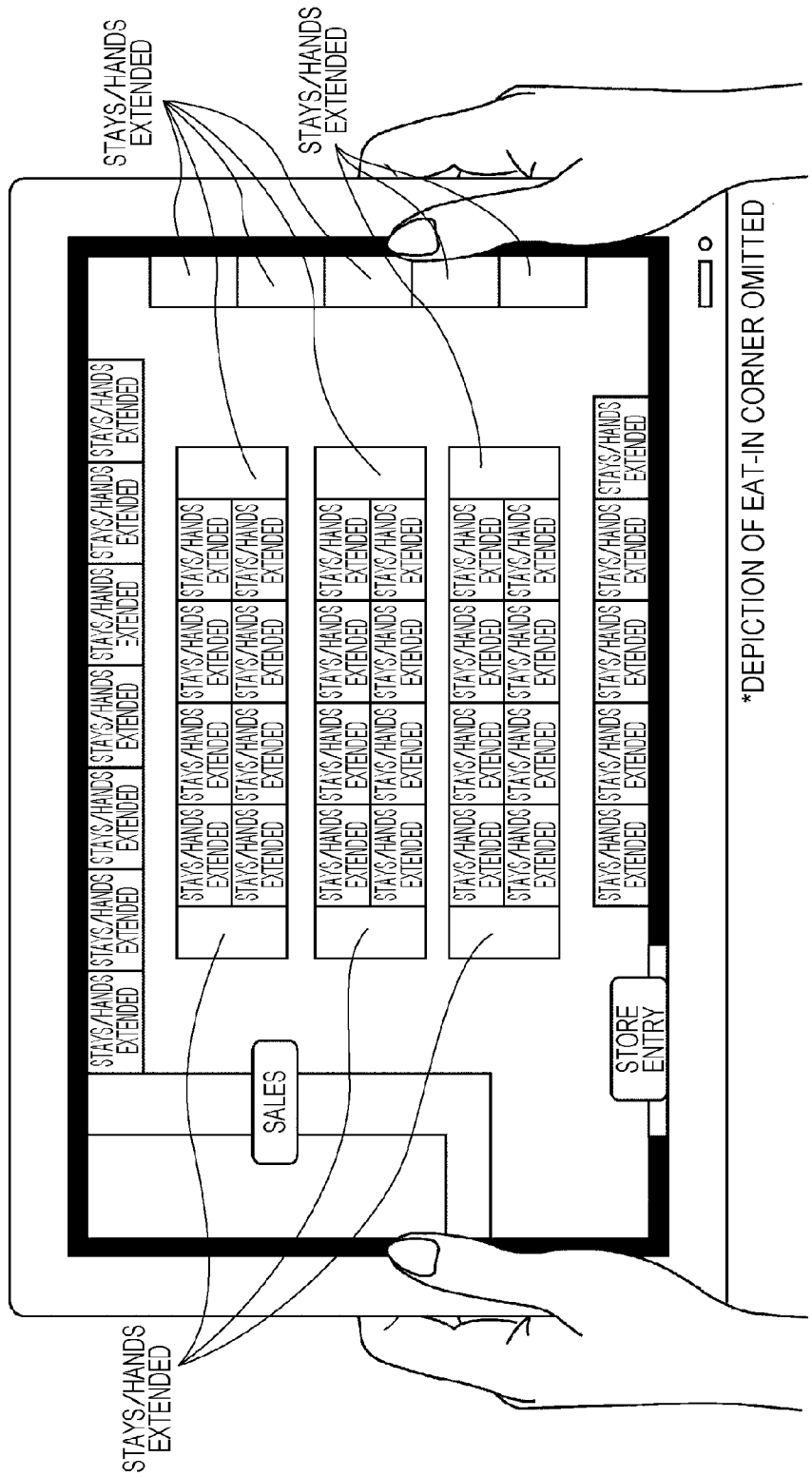
FIG. 20 is a drawing depicting an example of a top screen for content displayed by the tablet terminal.

FIG. 20 depicts an example of a top screen. The top screen is configured by arranging indicators such as displayable merchandising values at the register, entrances, and product shelving units. The top screen in FIG. 20 uses widgets that indicate the type of displayable merchandising value to depict the layout of the shelving units, the register, and the entrances of the store. In the product shelving units, it is possible to display the two types of merchandising values of stays/hands extended, and the character string of "stays/hands extended" is therefore displayed. If FIG. 20 and the map are contrasted, there are differences in that only the sales floor is depicted in FIG. 20, and character strings indicating the display of "stays/hands extended" have been added to the individual product shelving units. Furthermore, there is also a difference in that the character string of "sales" has been added to the register of the counter.

If the screen is touched by the user, it is determined whether that touch position is included in the occupying region of any of a product shelving unit, the register, or the entrance, in the product shelving unit layout of the store information. If so determined, observation information in which the product shelving unit, the register, or the entrance that has been touched is an observation location is read out from among the observation information accumulated in the observation information database. Since lighting mode information is associated as an index with the observation information here due to the merchandising value classification, observation information in which the touch position is the observation location is read out with the lighting mode information added thereto as an index.

Figure 21:
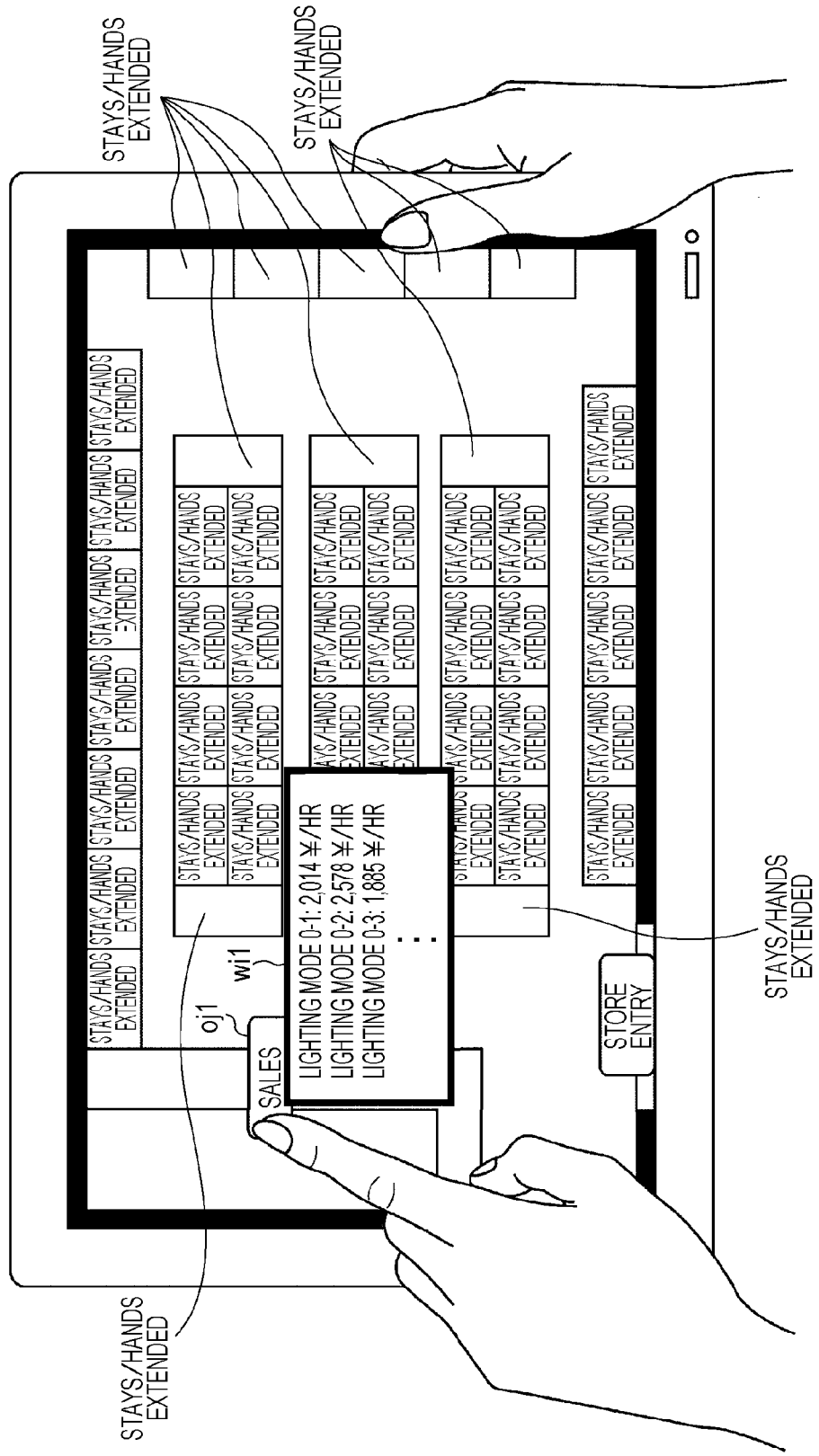
FIG. 21 is a drawing depicting a display example when "sales" in the register counter is touched.

FIG. 21 is a drawing depicting a display example when "sales" in a register counter icon oj1 is touched. In FIG. 21, a window wi1 is displayed in the touched position. This window depicts sales amounts per unit time when all modes have been set to each of 0-1, 0-2, and 0-3. According to FIG. 21, it is clear that sales are the highest when all lighting modes are set to 0-2, and then 0-1, and then 0-3.

Figure 22:
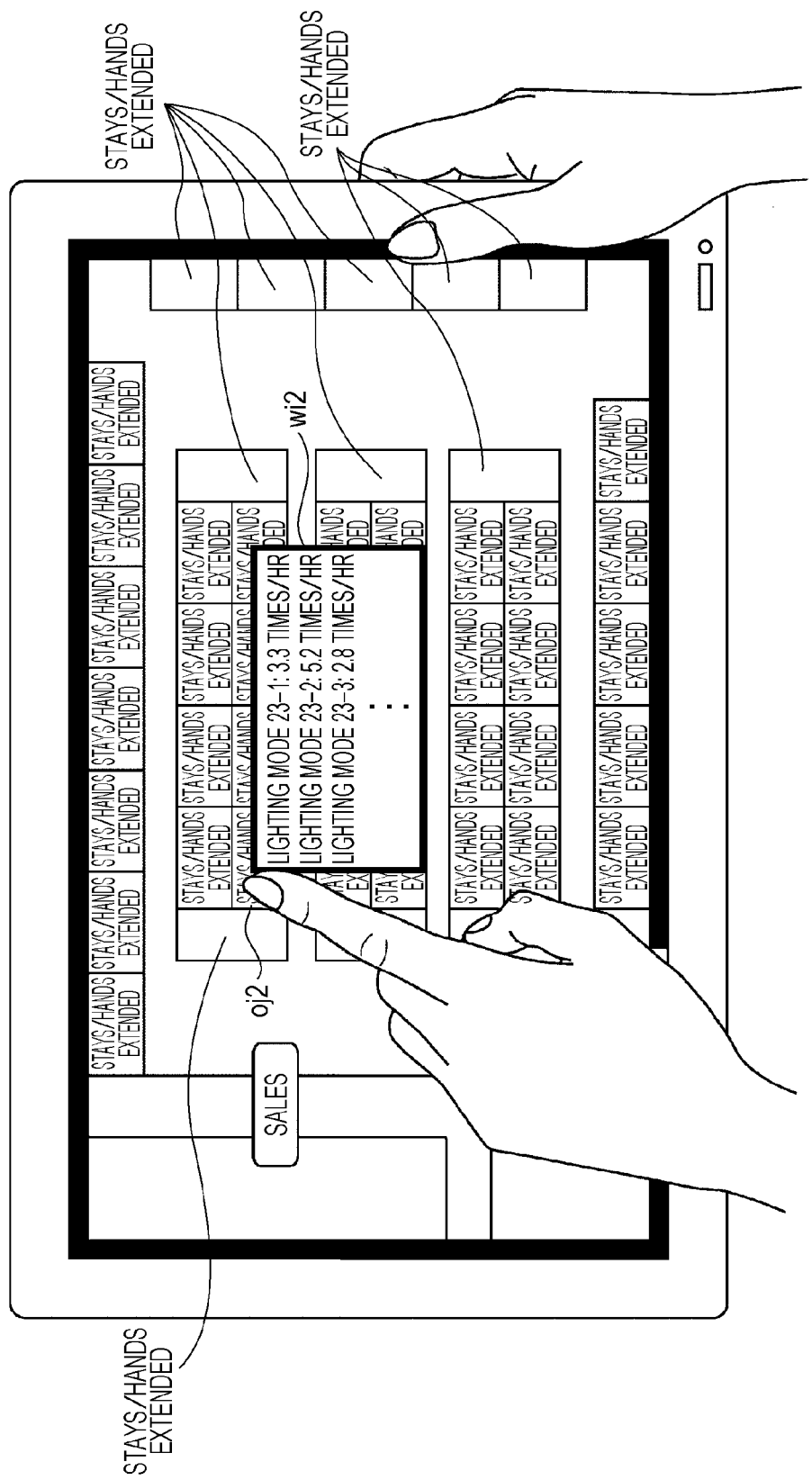
FIG. 22 is a drawing depicting a window that is displayed when "stays" in an icon for a shelving unit is touched.

FIG. 22 depicts a window wi2 that is displayed when "stays" in an icon oj2 for shelving unit 23 is touched. This window wi2 depicts the number of times a person has stayed. In FIG. 22, it is clear that the number of times a person has stayed is the highest when lighting mode 23-2 is selected, and then when lighting mode 23-1 is selected.

Figure 23:
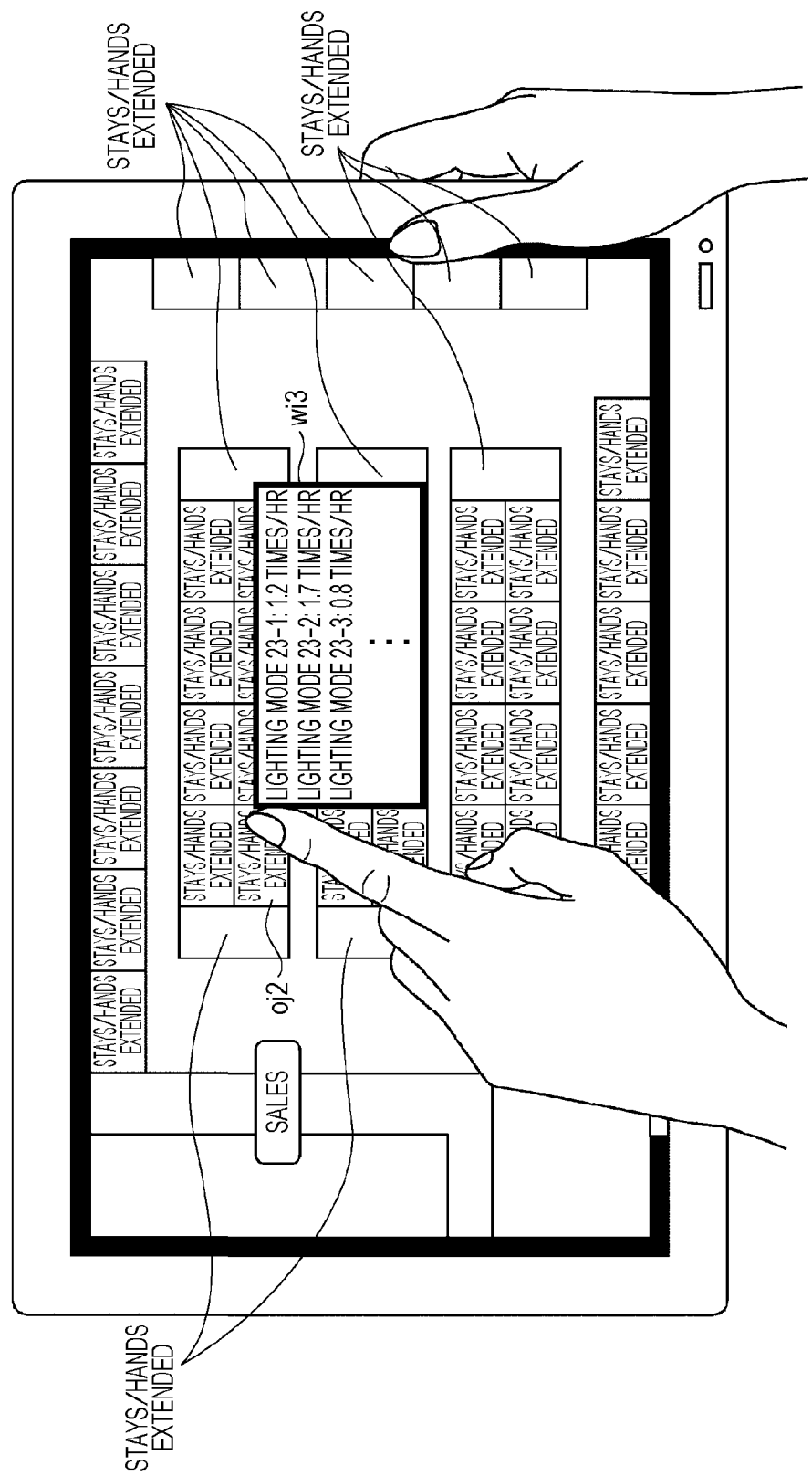
FIG. 23 is a drawing depicting a window that is displayed when "hands extended" in the icon for the shelving unit is touched.

FIG. 23 depicts a window wi3 that is displayed when "hands extended" in the icon oj2 for the shelving unit 23 is touched. This tooltip depicts the number of times a person has extended a hand. In FIG. 23, it is clear that the number of times a person has extended a hand is the highest when the lighting mode for the product shelving unit 23 is 23-2, and then when the lighting mode is 23-1.

FIG. 24 depicts a window wi4 that is displayed when an entrance icon oj3 is touched. This window wi4 depicts the number of people who have entered the sales floor. In FIG. 24, it is clear that the number of people who have entered the store is the highest when the lighting mode for the ceiling lighting is set to 0-2, and then when the lighting mode is set to 0-3. The aforementioned completes the description regarding the GUI. Having provided a display example, the description will next focus on the processing procedure.

The processing content of constituent elements of the ceiling lighting device 10, the shelving unit individual lighting device 20, the information collection device 40, the management device 70 and the tablet terminal 80 described up to here can be generalized as processing procedures for hardware resources, corresponding to various external events and internal parameters of devices. The flowcharts of FIG. 25A to FIG. 27 depict such generalized processing procedures.

Figure 25B:
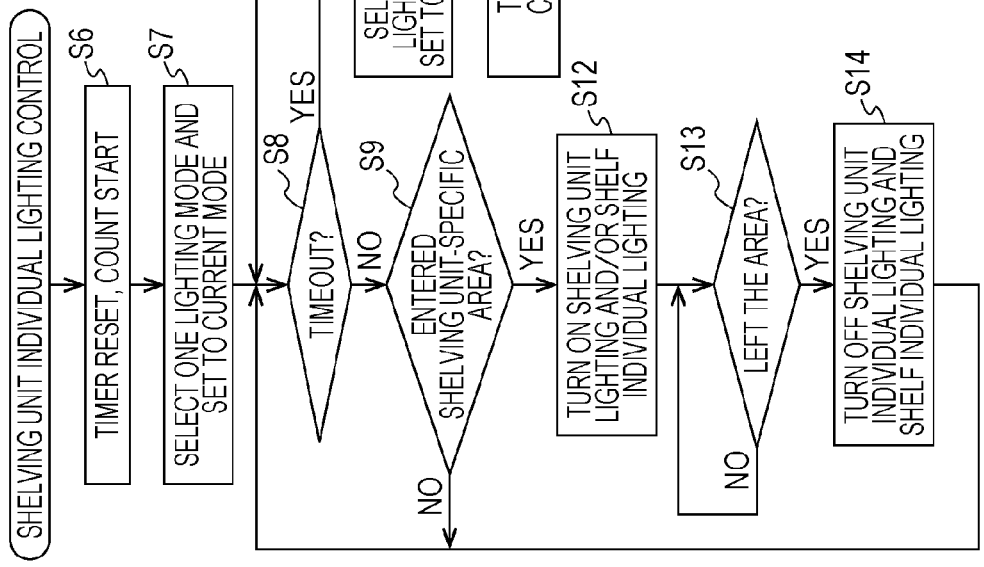
FIG. 25B is a flowchart depicting a processing procedure for product shelving unit individual lighting.
Figure 25A:
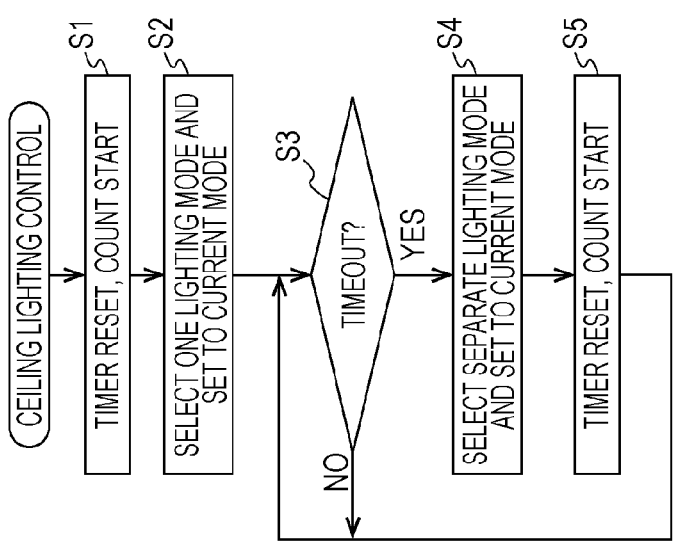
FIG. 25A is a flowchart depicting a processing procedure for ceiling lighting control.

FIG. 25A is a flowchart depicting a processing procedure for ceiling lighting control. In step S1, a timer is reset and a counter is started, and in step S2, one lighting mode is set to the current mode. Thereafter, processing transfers to the loop of step S3. Step S3 is a determination as to whether or not a timeout has occurred. If a timeout has occurred, "yes" is determined in step S3 and a separate lighting mode is selected as the current mode (step S4), the timer is reset and the counter is started (step S5), and processing returns to step S3.

FIG. 25B is a flowchart depicting a procedure for product shelving unit individual lighting. When this flowchart is started, in step S6, the timer is reset and the counter is started, and thereafter, in step S7, one lighting mode is selected as the current mode. Thereafter, processing transfers to the loop of steps S8 and S9. In this loop, step S8 is a determination as to whether or not the timer has timed out. Step S9 is a determination as to whether or not entry to a product shelving unit-specific area has been detected. If a timeout has occurred, "yes" is determined in step S8, a separate lighting mode is selected as the current mode in step S10, and in step S11, the timer is reset and the counter is started.

If entry to a product shelving unit-specific area has been detected, "yes" is determined in step S9, the product shelving unit lighting and/or shelf individual lighting is turned on in step S12, and processing transfers to the loop of S13.

Step S13 is a determination as to whether or not a person has left the area. If the person has left the area, the product shelving unit and shelf individual lighting is turned off in step S14. By carrying out the above control for all lighting and the control for shelving unit individual lighting, the lighting modes for all lighting and shelving unit lighting are switched in each fixed interval as in FIG. 6.

It should be noted that although FIG. 25B depicts a flowchart relating to a lighting control method based on responses to human detection sensors, lighting control may be carried out with only count values produced by a timer as in FIG. 25A.

Figure 26:
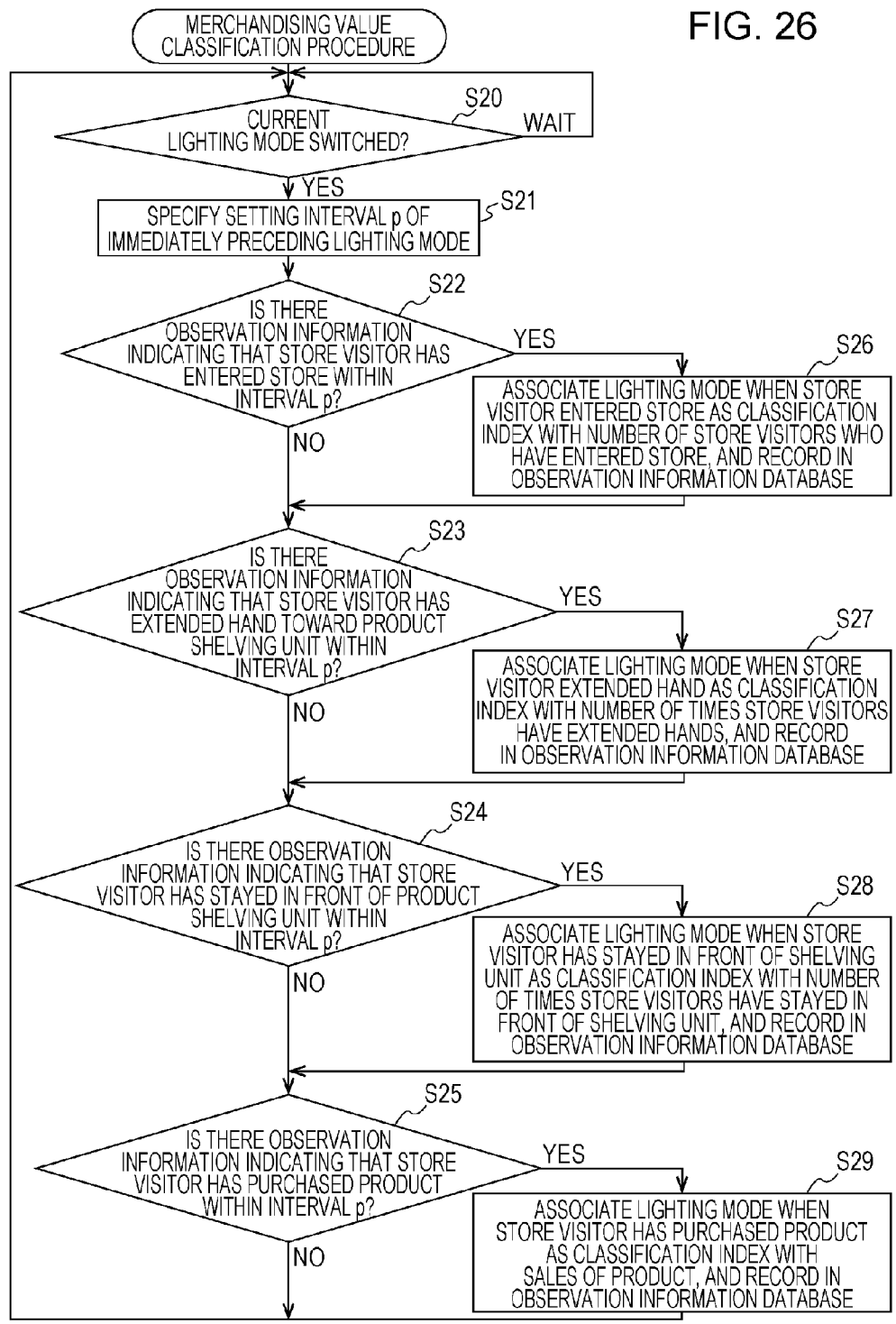
FIG. 26 is a flowchart depicting a processing procedure for merchandising value classification.

FIG. 26 is a flowchart depicting a processing procedure for merchandising value classification. In this flowchart, in step S20, it is determined whether or not the current lighting mode has been switched, and if so, step S21 to step S25 are executed.

After the setting interval for the immediately preceding lighting mode is specified as interval p in step S21, it is determined whether a store visitor has entered the store in interval p (step S22), whether a store visitor has extended a hand toward a product shelving unit in interval p (step S23), whether a visitor has stayed in front of a product shelving unit in interval p (step S24), and whether a visitor has purchased a product in interval p (step S25).

If "yes" is determined in step S22, in step S26, lighting mode information is written in a database in association, as an index, with the number of people who have entered the store, which is observation information.

If "yes" is determined in step S23, in step S27, lighting mode information that indicates the lighting mode when the store visitor extended a hand is added as a classification index to the number of times a store visitor has extended a hand and is written in the observation information database.

If "yes" is determined in step S24, in step S28, lighting mode information that indicates the lighting mode when the store visitor stayed is added as a classification index to the number of times a store visitor has stayed and is written in the database.

Step S25 is a determination as to whether or not a store visitor has purchased a product. If "yes" is determined, in step S29, lighting mode information that indicates the lighting mode when the store visitor purchased the product is added as a classification index to the store visitor sales amount and is written in the database.

By repeatedly carrying out the aforementioned processing, the merchandising values for when a person has entered the store, when a person has extended a hand toward a product shelving unit, when a person has stayed in front of a product shelving unit, and a person has purchased a product are written in the database together with lighting mode information of the point in time at which the action occurred.

Figure 27:
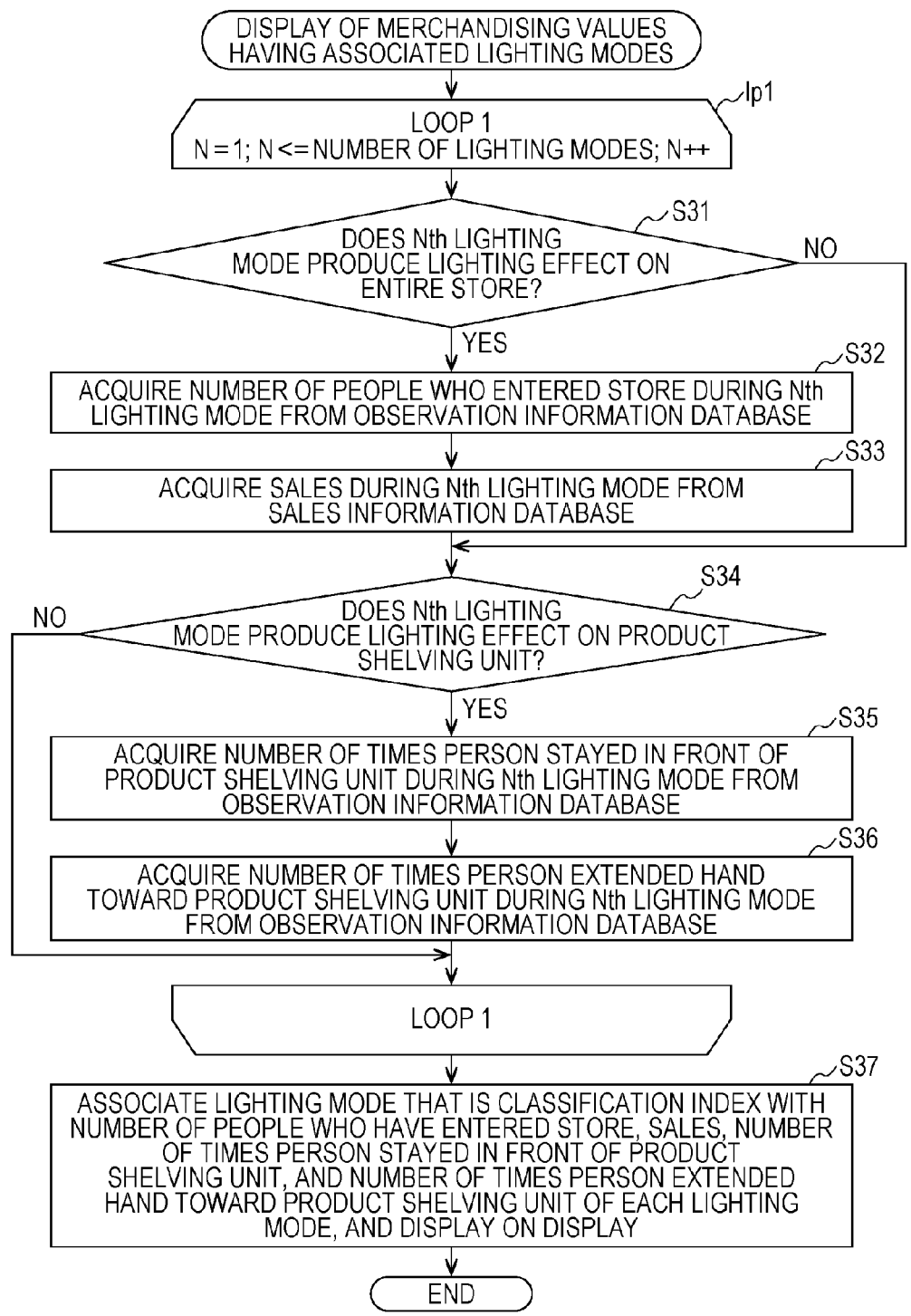
FIG. 27 is a flowchart depicting a display procedure for a merchandising value associated with a lighting mode.

FIG. 27 is a flowchart depicting a display procedure for a merchandising value associated with a lighting mode. After loop 1 has been executed for all lighting modes, the number of people who have entered the store, the sales amount, the number of times a person has stayed, and the number of times a person has extended a hand for each mode are associated and displayed. Loop 1 is a loop in which the processing of steps S31 to S36 are executed until the condition of "N=1; N<=number of modes; N++" is satisfied. With regard to the condition, a variable N is initialized at 1, the steps S31 to S36 are executed, and thereafter the processing of incrementing the variable N is repeated until the condition that N≥the number of modes is satisfied. Step S31 is a determination step in which it is determined whether or not the Nth lighting mode produces a lighting effect on the entire store. If "no" is determined, step S32 and step S33 are skipped. If "yes" is determined, the number of people who entered the store during the Nth mode is acquired from the observation information database (step S32), and the Nth sales are acquired from the sales information database (step S33). Step S34 is a determination as to whether or not the Nth lighting mode produces a lighting effect on a product shelving unit. If "no" is determined, step S35 and step S36 are skipped. If "yes" is determined in step S34, the number of times a person has stayed at a product shelving unit during the Nth lighting mode is acquired from the database (step S35), and the Nth number of times a person has extended a hand is acquired from the observation information database (step S36). After step S31 to step S36 have been executed for all lighting modes, processing transfers to step S37. In step S37, lighting mode information that is a classification index is added to the number of store visitors, the sales, the number of people who have stayed, and the number of times a person has extended a hand of each lighting mode and is displayed on the display.

According to the present embodiment as described above, lighting mode information is added to merchandising values and displayed, and since these merchandising values evaluate and indicate, from a commercial standpoint, the behavior adopted by store visitors inside a store, by displaying the merchandising values with the lighting mode information added thereto, it becomes possible to comprehend the causal relationship between lighting mode selection and store visitor behavior. A guide as to how mode selection should be implemented is produced, and the lighting mode can therefore be selected appropriately in accordance with the characteristics of the ceiling lighting and the shelving unit lighting while the independence of the control system for the ceiling lighting and the control system for the store lighting is maintained.

Second Embodiment

Figure 28:
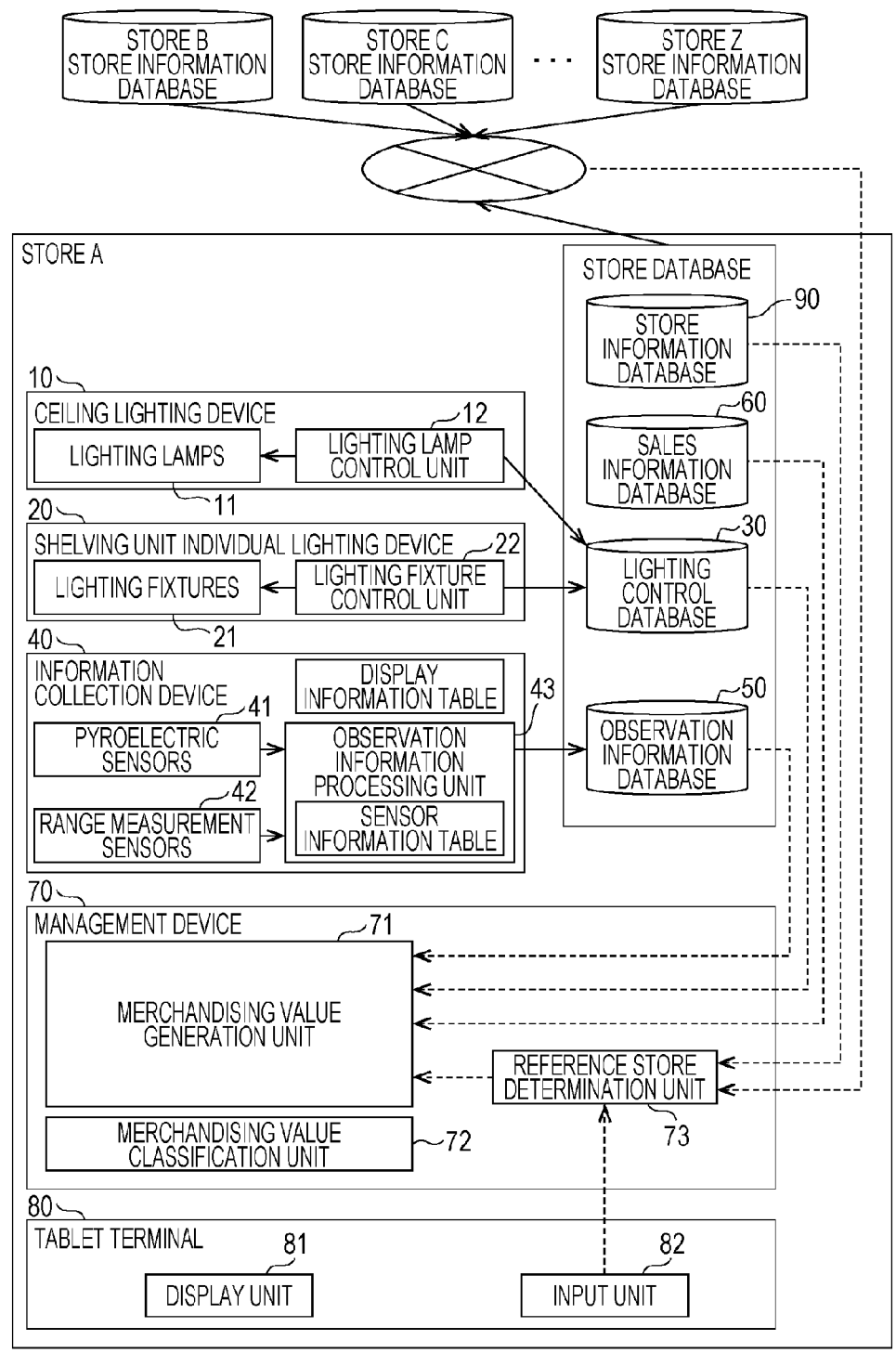
FIG. 28 is a configuration diagram depicting the configuration of a store system according to a second embodiment.

In the internal configuration in FIG. 1, the store information is specific to a store, and is therefore stored in the shelving unit individual lighting device 20. In contrast, in the present embodiment, store information regarding each store is accumulated in a store information database. FIG. 28 is a configuration diagram depicting the configuration of a store system according to the second embodiment. In the second embodiment, databases (store A database, store B database, . . . store Z database) of store information in a plurality of stores are present in a network, and the tablet terminal 80 of each store is able to access the store information of each store.

Next, improvements to the store information and the GUI are described. In the second embodiment, the following store feature information is present in the store information. FIG. 29A depicts an example of the store feature information. A record in FIG. 29A is made up of the fields of "store ID", "region" that indicates the prefecture, "sales" in yen units, "store size", "customer base" indicated by average age group, and "location conditions". In the store database of FIG. 29A, records are sorted in accordance with the store ID.

Since the feature information is added to store information, a search screen for carrying out a search by the feature information is displayed in the GUI of the tablet terminal 80. FIG. 29B depicts an input example thereof. Items of feature information such as the region, sales, store size, customer base, and location conditions are arranged side-by-side, and any of the items can be checked with a check box. It is possible to input text such as numerical values or characters by using the text boxes on the right side.

FIG. 29C depicts a search result. In this way, if store information found by a search exists, it is possible to carry out classification in which merchandising values in another store are associated with lighting mode information selected in that other store, and classification in which merchandising values in the own store are associated with lighting mode information selected in that other store. When a search operation for a store that is targeted for merchandising value acquisition is received by this kind of search screen designation, lighting modes used in that store and merchandising values are acquired, and merchandising value classification is executed according to the flowchart of FIG. 26 for the lighting modes and the merchandising values. Thus, lighting mode information can be associated with merchandising values in an arbitrary store determined by the user and displayed.

Figure 30:
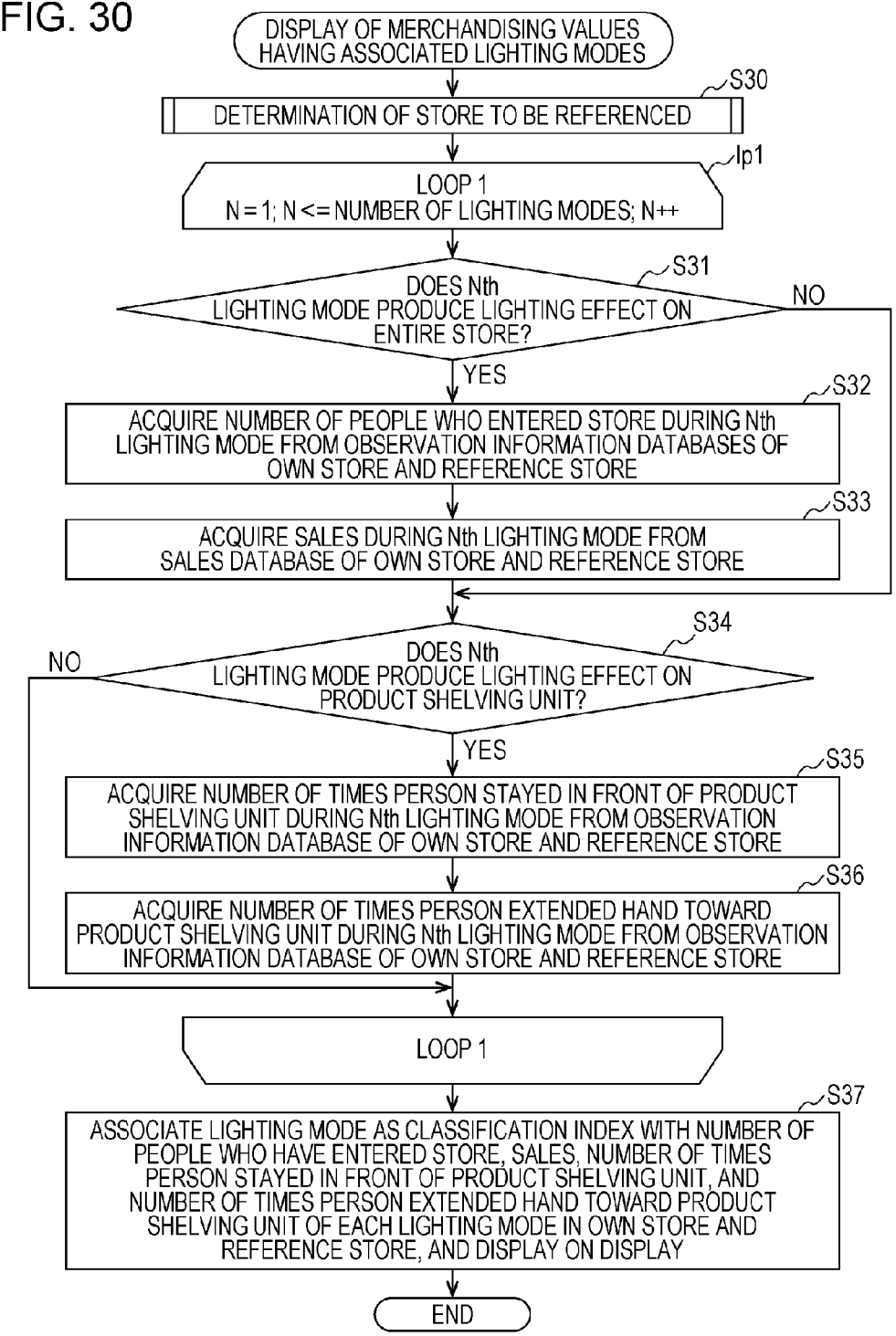
FIG. 30 is a flowchart depicting a display procedure for merchandising value classification results in the second embodiment.

The processing procedure in the second embodiment will now be described. FIG. 30 is a flowchart depicting a display procedure for classification results in the second embodiment.

This flowchart is different with that in the first embodiment in that loop 1 is executed after the store information for which observation information is to be referenced is determined in step S30. Owing to this difference, in loop 1, a search is carried out for the reference destination store determined in step S30.

Since the merchandising values and lighting mode information of the other store are targeted for classification, in the flowchart of FIG. 30, a partial alteration is added to the merchandising value classification procedure in FIG. 27. The alteration is that the acquisition destinations for observation information and sales in step S32, step S33, step S35, step S36, and step S37 in FIG. 27 are the own store and the observation information database and the sales information database of the reference store, and that the acquisition destinations for observation information and sales are expanded to other stores found in a search. Likewise, the acquisition destination for lighting mode information in the loop lp1 is expanded to other stores found in a search. Since the sales, behavior statistics, and lighting modes of other stores are taken into consideration, comprehensive merchandising value classification that is not restricted to the limits of a store becomes possible.

Figure 31:
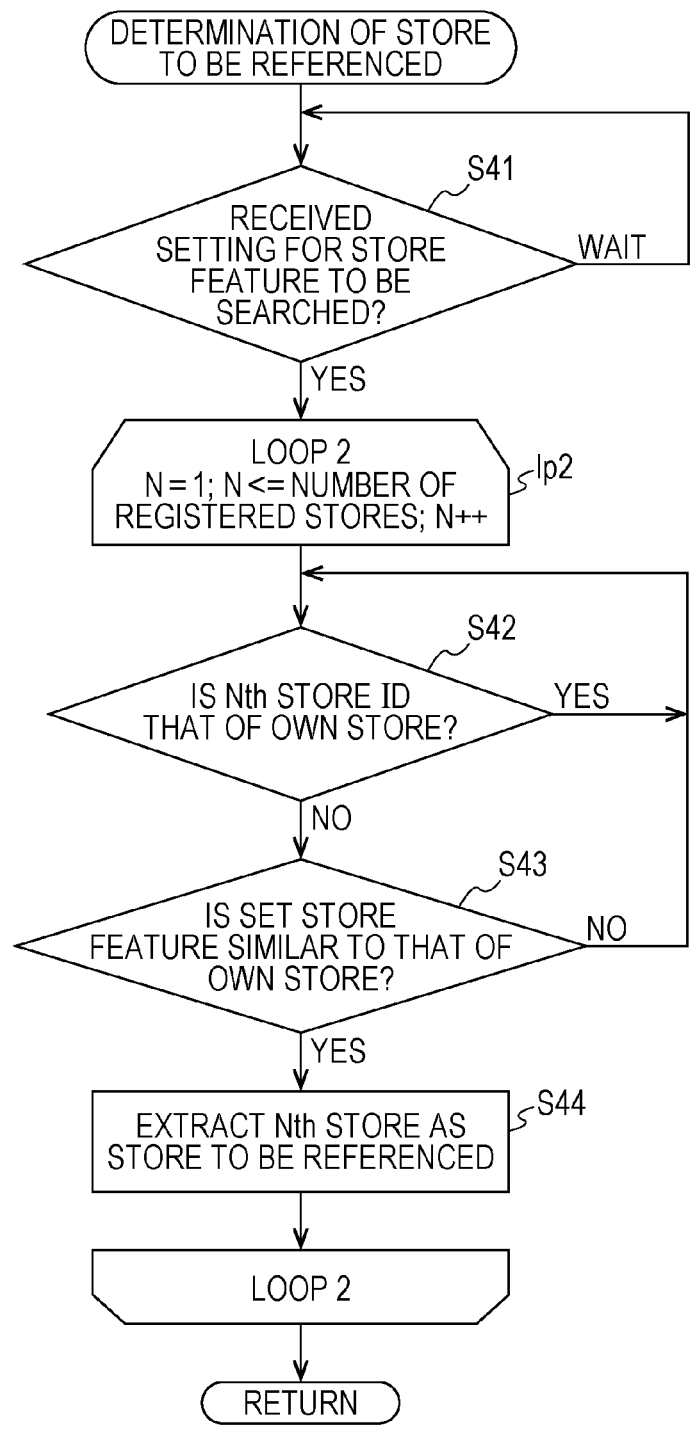
FIG. 31 is a flowchart depicting a determination procedure for a store to be referenced.

FIG. 31 is a flowchart depicting a determination procedure for a store to be referenced. In this determination procedure, the features of a store to be referenced are received in step S41, and loop 2 is executed. Loop 2 is a repeating loop structure for each of a plurality of stores.

With regard to the control condition for loop 2, a variable N is initialized at 1, the steps S42 to S44 are executed, and thereafter control that increments the variable N is repeated until the condition that N≥the number of registered stores is satisfied. Step S42 is a determination as to whether or not the variable N store number is the own store. If "no" is determined, processing transfers to step S43. Step S43 is a determination as to whether or not the set features are similar to the features of the Nth store. If they are not similar, processing moves to the next store. If "yes" is determined in step S43, in step S44, the Nth store is extracted as the store to be referenced.

According to the present embodiment as described above, since the classification range according to lighting modes can be expanded to the merchandising values of a plurality of stores, the effects produced by lighting modes can be compared among stores. It thereby becomes possible to select a lighting mode that may lead to an improvement in sales.

Third Embodiment

Figure 32:
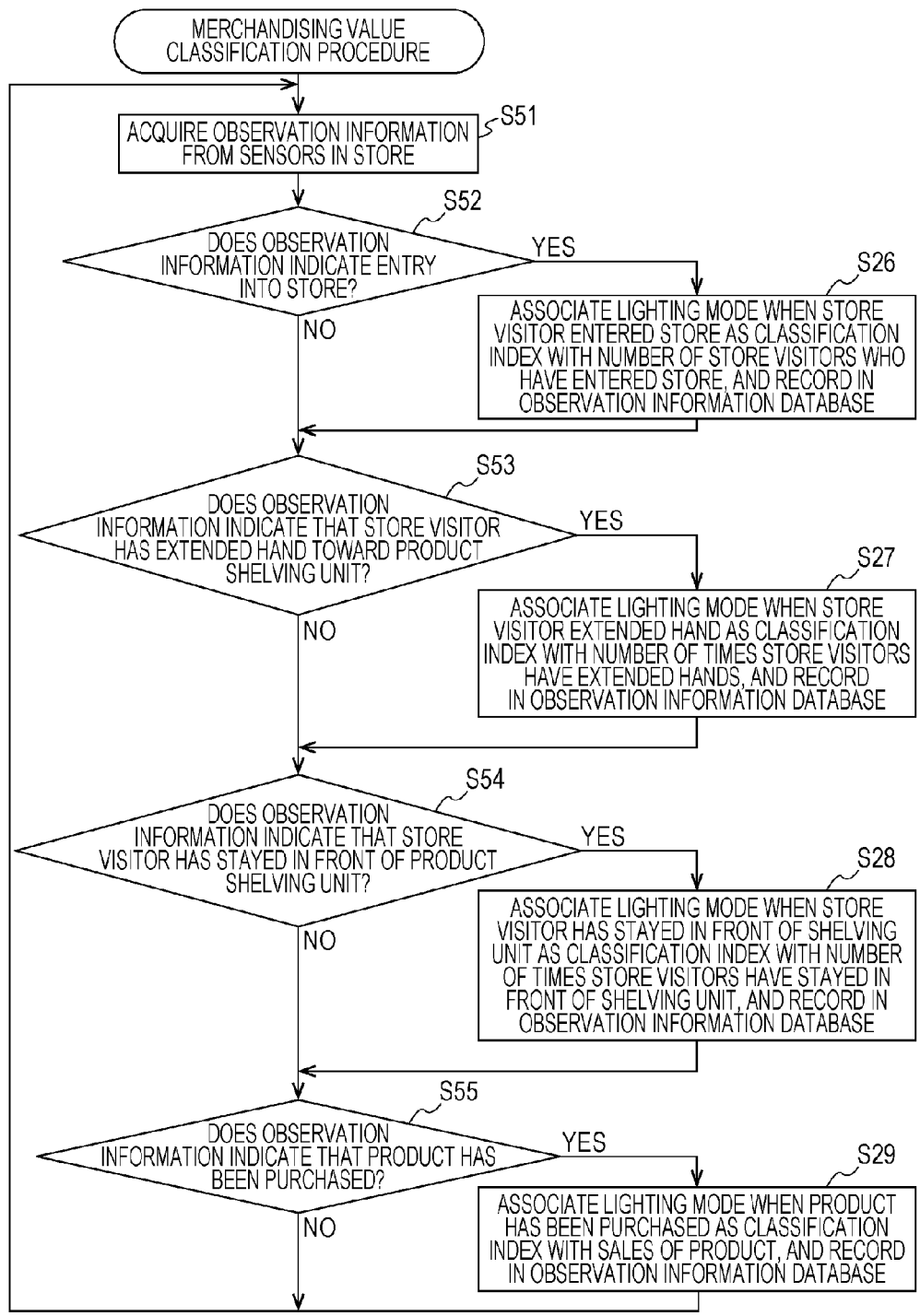
FIG. 32 is a flowchart depicting a processing procedure for merchandising value classification.

In the first embodiment, when entry to a store, a product sale, a store visitor staying, or a store visitor extending a hand in front of a product shelving unit is detected, the lighting mode that was selected in the time period that includes that detection time was the basis for the merchandising value classification. In contrast, in the present embodiment, when a product sale, a store visitor staying, or a store visitor extending a hand is detected, lighting mode information indicating the lighting mode selected at that detection time is associated as a classification index. Due to the association of the detection time, the flowchart changes as in FIG. 32. FIG. 32 is a flowchart depicting a processing procedure for a merchandising value classification procedure. In the flowchart of FIG. 32, the steps of step S20 to step S25 are replaced by step S51 to step S55. In step S51, observation information is acquired from sensors, in step S52, it is determined whether or not the observation information indicates entry to the store, and, in step S53, it is determined whether or not the observation information indicates that a store visitor has extended a hand toward a product shelving unit. Step S54 is a determination as to whether the observation information indicates that a store visitor has stayed in front of a product shelving unit, and step S55 is a determination as to whether the observation information indicates the purchase of a product. If "yes" is determined in step S52 to step S55, the corresponding step from among step S26 to S29 is executed.

According to the present embodiment as described above, lighting mode information of the point in time of a product sale, a store visitor staying, and a store visitor extending a hand is associated with merchandising values, and therefore, the association between lighting modes and merchandising values can be realized with a high degree of time accuracy even if the selection period for the lighting mode is short and the tone control and the color temperature control are varied between second units and minute units.

Fourth Embodiment

The fourth embodiment is an embodiment for handling the big data implementation of observation information and sales information. In order to handle this big data implementation, in the present embodiment, observation information and sales information are distributed and stored in cloud network storage, and an application for merchandising value generation and an application for merchandising value classification are activated by a cloud server.

In the cloud server, a hypervisor loads and activates instances of operating systems in accordance with network load and user access, and can therefore respond to scalability even if the scale of the observation information and the sales information becomes very large and there is a very high number of users who desire access.

Figure 33A:
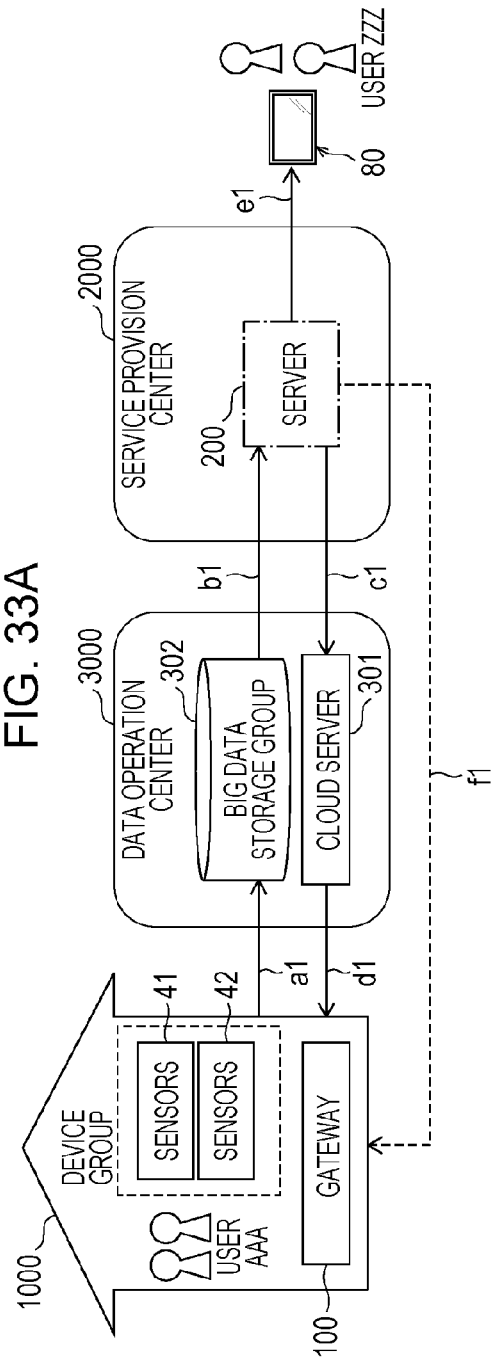
FIG. 33A is a drawing depicting a computer system for realizing the provision of merchandising information.

FIG. 33A depicts a computer system (MD value classification system) for realizing a merchandising value classification service. The computer system realizes an MD service for household electric appliances. The MD value classification system is configured from a group of a plurality of devices 1000 (including a home gateway 100 and sensors 41, 42, . . . ), a data operation center 3000 (including a cloud server 301 and a big data storage group 302), a service provision center 2000 (including a server 200), and an information terminal device 80.

The device group 1000 constitutes a store internal network, is configured from an assembly of devices installed in the store, and includes the home gateway 100 and the sensors 41, 42, . . . .

The service provision center 2000 is a point of contact for persons receiving the provision of services by the service provision center, receives access requests in which a URL is designated, and manages data directly linked to the store work of the user. This data management may include user registration. As user registration, the registration of a user is received from a user when a store is newly opened, and the user for whom the user registration is carried out is managed as a member for an MD value classification service. This user registration includes the registration of store information that is targeted for MD, and member registration in order for the user to become a member for the MD value classification service. The service provision center 2000 manages the store information that is registered in this way, and the user registration information that is input in the member registration. The server 200 is one of the computers that make up this service provision center 2000. The server 200 is drawn with a dashed line because there are cases where the service provision center 2000 does not possess the server 200. For example, the server 200 is not required in cases such as when the cloud server 301 carries out all of the data management.

Figure 33C:
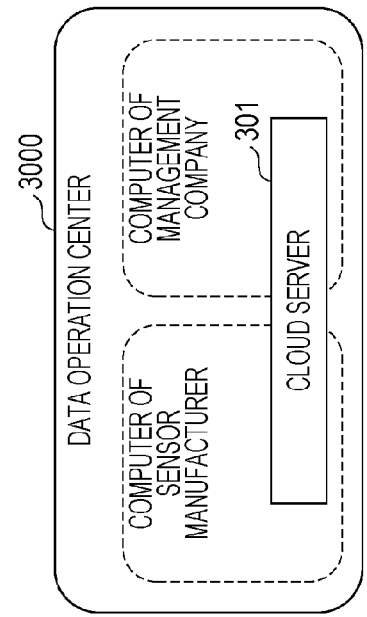
FIG. 33C is a drawing depicting an example in which computers of both or either one of a sensor manufacturer and another management company correspond to a data operation center.
Figure 33B:
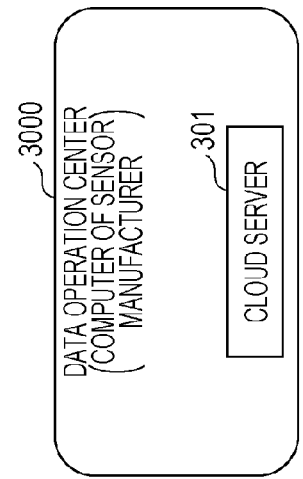
FIG. 33B is a drawing depicting a configuration in which computers of a sensor manufacturer corresponds to a data operation center.

The data operation center 3000 is the main entity that carries out work behind the scenes for the service provision center. The data operation center 3000 is not restricted to a company that carries out only data management and the management of the cloud server 301 and so forth. For example, if the sensor manufacturer that develops and manufactures the sensors 41 and 42 also carries out data management and the management of the cloud server 301 and so forth, the computers of the sensor manufacturer correspond to the data operation center 3000 (see FIG. 33B). Furthermore, the data operation center 3000 is not restricted to one company. For example, if the sensor manufacturer and another management company are carrying out data management and the operation of the cloud server 301 on a joint or shared basis, the computers of both or either one of the sensor manufacturer and the other management company correspond to the data operation center 3000 (see FIG. 33C). An example of the other management company is a security company or a power company.

The cloud server 301 is a virtual server that exists within the data operation center 3000 and is able to equally access both an in-house intranet installed in a data center operation company and the outside Internet, and manages big data in cooperation with various devices via the Internet.

The big data storage group 302 is made up of a plurality of storages in which big data is distributed and stored. The big data in the present embodiment is observation information and sales information that indicate what kind of behavior visitors have shown at each product shelving unit of each store.

Next, the flow of information in the aforementioned service is described. First, the sensors 41 and 42 of the device group 1000 generate an observation information log each time visitor behavior is detected, and accumulate generated observation information logs in the big data storage group 302 of the data operation center 3000 via the cloud server 301 (see arrow a1). The observation information logs here are logs that indicate visitor behavior around the periphery of product shelving units installed in a store. There are cases where the observation information logs are provided directly to the cloud server 301 from a plurality of household electric appliances 101 themselves via the Internet. Furthermore, there are also cases where the observation information logs are accumulated in the home gateway 100, and are provided to the cloud server 301 from the home gateway 100.

Next, the cloud server 301 of the data operation center 3000 provides the accumulated observation information logs to the service provision center 2000 in fixed units. For the units used in this provision, units with which it is possible for the data center operation company to organize and provide the accumulated information to the service provision center 2000, and units requested by the service provision center 2000 are feasible. Although fixed units have been mentioned, the units do not have to be fixed, and there are cases where the amount of information provided varies according to the situation.

The observation information logs are also saved in the server 200 of the service provision center 2000 as required, via a storage of the cloud server 301 (see arrow b1). Then, in the service provision center 2000, the observation information logs are organized into information that conforms with the service to be provided to the user, and are provided to the user. For the users who are the receivers of the organized information, both a user AAA who uses the plurality of household electric appliances 101 and an external user ZZZ are assumed. For the method for providing the service to the users, provision routes such as those indicated by arrows f1 and e1 also exist.

Furthermore, for the method for providing the service to the users, there are also provision routes such as those indicated by arrows c1 and d1, that is, providing the service to the users by once again going through the cloud server 301 of the data operation center 3000. The cloud server 301 of the data operation center 3000 has a function to organize the observation information logs so as to conform with the service to be provided to the users. There are also cases where information obtained by the organizing function is provided to the service provision center 2000.

Figure 34:
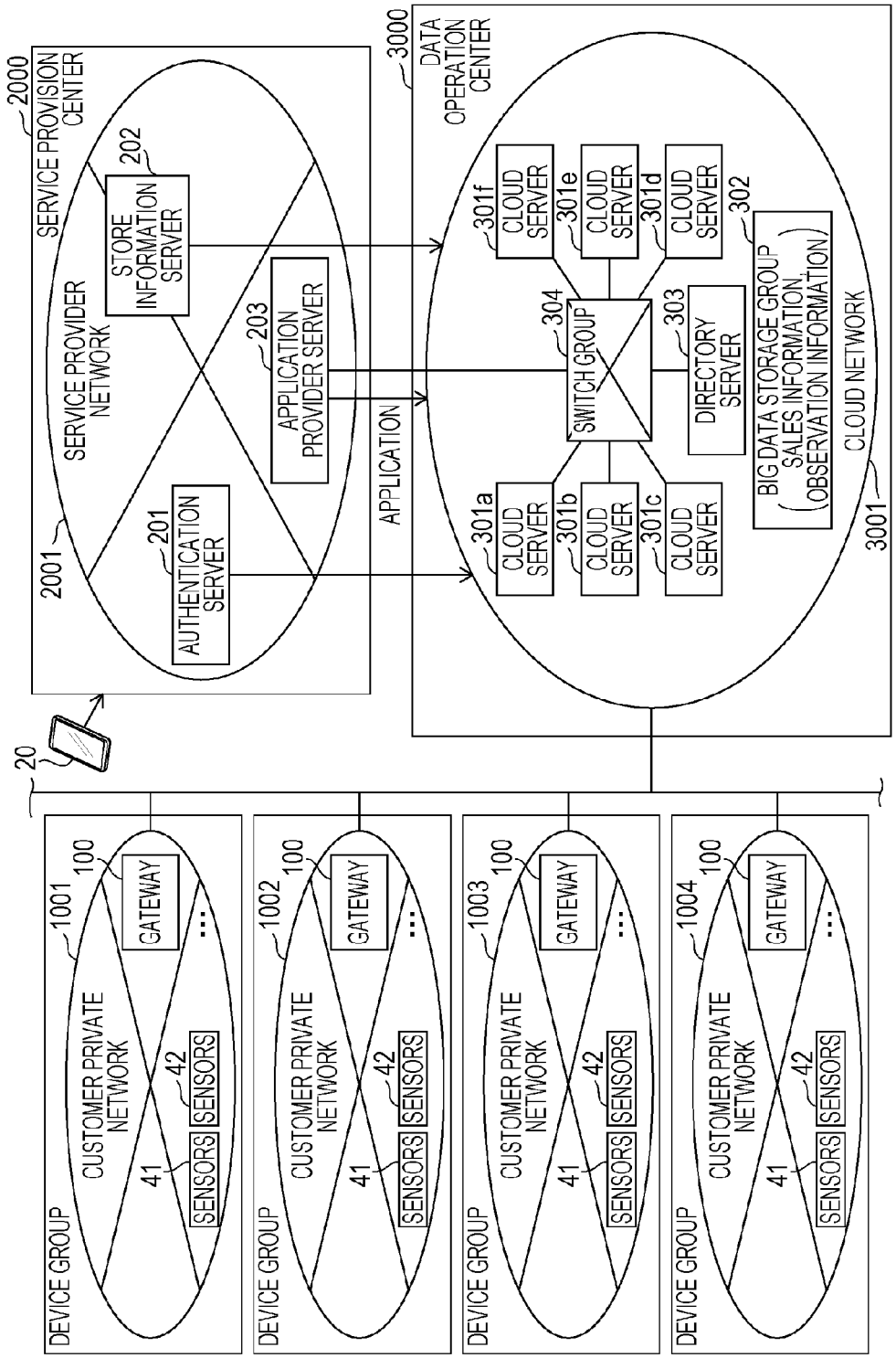
FIG. 34 is a drawing depicting the network configuration of an MD value classification system.

FIG. 34 is a drawing depicting the network configuration of the MD value classification system. In FIG. 34, customer private networks 1001, 1002, 1003, and 1004 are drawn as device groups. Furthermore, in FIG. 34, a cloud network 3001 is drawn as the specific form of the data operation center 3000 depicted in FIG. 33, and a service provider network 2001 is drawn as the specific form of the service provision center 2000.

The constituent features belonging to the customer private networks 1001, 1002, . . . 1004 that are device groups 1000 have reference numerals in the 100s that are dependent upon the reference numerals in the 1000s added thereto, and are distinguished from the constituent features of the other networks.

The constituent features belonging to the service provision center 2000 and the service provider network 2001 have reference numerals in the 200s that are dependent upon the reference numerals in the 2000s added thereto, and are distinguished from the constituent features of the other networks, and the constituent features belonging to the data operation center 3000 and the cloud network 3001 have reference numerals in the 300s that are dependent upon the reference numerals in the 3000s added thereto, and are distinguished from the constituent features of the other networks.

The customer private networks 1001 to 1004 are private networks that constitute device groups installed inside stores for customers of the information profession service. From among these, the customer private network 1001 is configured from a home gateway 100 and sensors 41, 42, . . . .

The service provider network 2001 is an intranet in the service provision center, and includes an authentication server 201 that authenticates user validity when a user login operation is received, a store information server 202 that manages store information of each store, and an application provider server 203 that provides an application required for the provision of a service.

The cloud network 3001 is a virtual local area network (VLAN) that is handled in an integral manner with the service provider network in the data provision center by using integrated Elastic Cloud Computing (iEC2) architecture or the like, and is configured from: cloud servers 301*a*, *b*, *c*, *d*, *e*, and *f*; a big data storage group 302; a directory server 303 that manages the location of an instance in the cloud network, and the location of a switch that connects with a cloud server, in association with the combination of the IP address and the MAC address of a processing request-source node, and the IP address and the MAC address of a processing request-destination node; and a switch group 304 for interconnecting the cloud servers. The above is a description of the network configuration. Next, the internal configuration of the cloud servers, which form the core of the cloud network, is described.

Figure 35B:
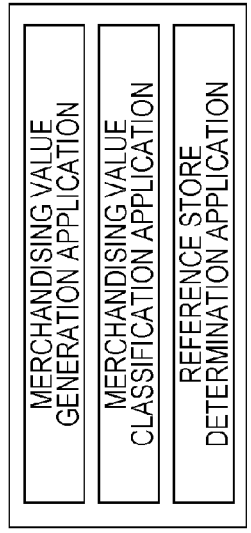
FIG. 35B is a drawing depicting the internal configuration of an application.
Figure 35C:
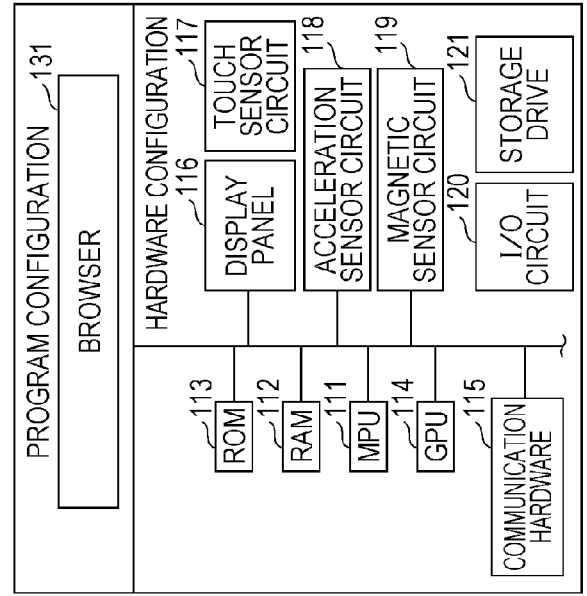
FIG. 35C is a drawing depicting the internal configuration of a tablet terminal.
Figure 35A:
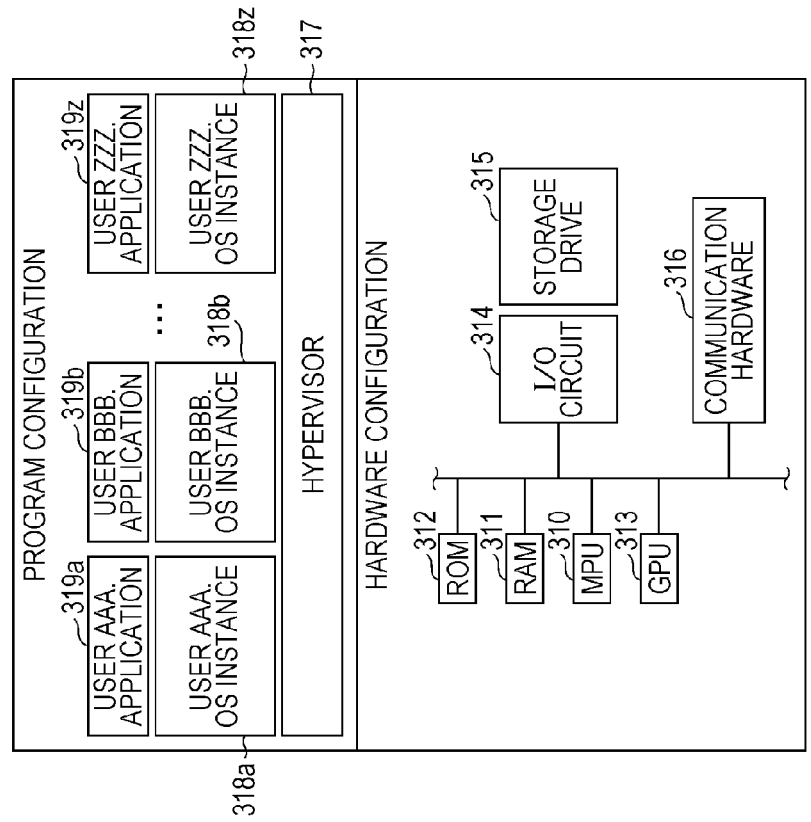
FIG. 35A is a drawing depicting the internal configuration of a cloud server.

FIG. 35A depicts the internal configuration of a cloud server. The hardware configuration of the cloud server includes a microprocessor unit (MPU) 310, a random-access memory (RAM) 311, a read-only memory (ROM) 312, a graphic processor unit (GPU) 313, an I/O circuit 314, a storage drive 315, and communication hardware 316.

The program configuration of the cloud server includes a hypervisor 317 that monitors operating systems (OS), generates OS instances in accordance with requests from terminals, and manages the states of the OS instances; OS instances 318a, b, . . . , and z of each user generated for each logged-in user by the hypervisor 317 (user AAA.OS instance, user BBB.OS instance, . . . , and user ZZZ.OS instance in FIG. 35A); and applications 319a, b, . . . , and z that are activated by an OS instance and the states of which are managed (user AAA application, user BBB application, . . . , and user ZZZ application in FIG. 35A).

A user OS instance is an instance of a library program that carries out processing for middleware. Examples of an instance of the library program are: an instance of a graphic rendering engine that draws a GUI such as a window and a menu in accordance with an API call from an application; an instance of an event module that monitors operations with respect to the GUI and, if there is an operation, outputs an event indicating the content of that operation; an instance of a network file system for acquiring various files from a network drive and a local drive; an instance of a kernel that activates applications and manages the states of the applications; and an instance of a protocol stack that executes various protocols for connecting servers. As described above, it is clear that, in the cloud network, the function of a library program that carries out processing for middleware is provided from the cloud server 301 not the tablet terminal 80.

FIG. 35B depicts the internal configuration of the applications 319. As depicted in FIG. 35B, the applications 319 are configured from an application that corresponds to the merchandising value generation unit 71, an application that corresponds to the merchandising value classification unit 72, and an application that corresponds to a store information determination unit 73.

FIG. 35C depicts the hardware configuration of the tablet terminal 80. With regard to the hardware configuration of an information terminal device, when compared with the hardware configuration of a cloud server configured from a microprocessor unit (MPU) 111, a random-access memory (RAM) 112, a read-only memory (ROM) 113, a graphic processor unit (GPU) 114, communication hardware 115, a display panel 116, a touch sensor circuit 117, an acceleration sensor circuit 118, a magnetic sensor circuit 119, an I/O circuit 120, and a storage drive 121, the hardware configuration of the tablet terminal 80 is different in that the display panel 116, the touch sensor circuit 117, the acceleration sensor circuit 118, and the magnetic sensor circuit 119 are provided in order to construct an operation environment for the user. In the touch sensor circuit 117 in the aforementioned hardware configuration, a touch operation by the user is optically or electrically detected. One example of this detection is surface-type electrostatic capacitive detection. A surface-type electrostatic capacitance system has a structure in which a transparent electrode film (conductive layer) is laid on a glass substrate therein, and a protective cover is arranged on the surface. A voltage is applied to electrodes in four corners of the glass substrate and a uniform low-voltage electric field is generated over the entirety of the panel, variation in electrostatic capacitance when a finger touches the surface is measured in the four corners of the panel, and the coordinates of the finger are specified. It is thereby possible to detect the coordinates of a touch operation.

Furthermore, compared with the program configuration of the cloud server, there is a difference in that, in the program configuration of the tablet terminal 80, there is no hierarchy acting as an operating system, and there is only a browser program 131. This browser program realizes the processing performed by the display unit 81 and the input unit 82 of the tablet terminal 80. The program configuration of the tablet terminal 80 consists of only a browser because it is presumed that all of the applications that carry out processing in relation to MD value classification will be loaded into cloud servers. Furthermore, various processing for which applications are utilized are carried out by a user OS instance at the cloud server side, and it is sufficient as long as the tablet terminal 80 inspects the processing results of that user OS instance. Thus, the browser of the tablet terminal 80 transmits screen creation request events and screen update request events to an application on a cloud server, and carries out control for when screens corresponding to those requests are received from the application on the cloud server and are displayed.

FIG. 36A to FIG. 36D are variations of an application and a user OS instance being loaded to either the service provision center 2000 or the data operation center 3000. FIG. 36A to FIG. 36D depict four cloud service models.

FIG. 36A to FIG. 36D have the following three points in common. Firstly, the applications 319 and the user OS instances 318 exist on a cloud server of the data operation center 3000, secondly, as depicted by arrow 321, observation information logs are transmitted from the device group 1000 to the data center cloud server 301, and thirdly, as depicted by arrow 322, the data center cloud server 301 provides information to the tablet terminal 80.

(Service Model 1: Type where a Company Itself Serves as a Data Center)

Figure 36A:
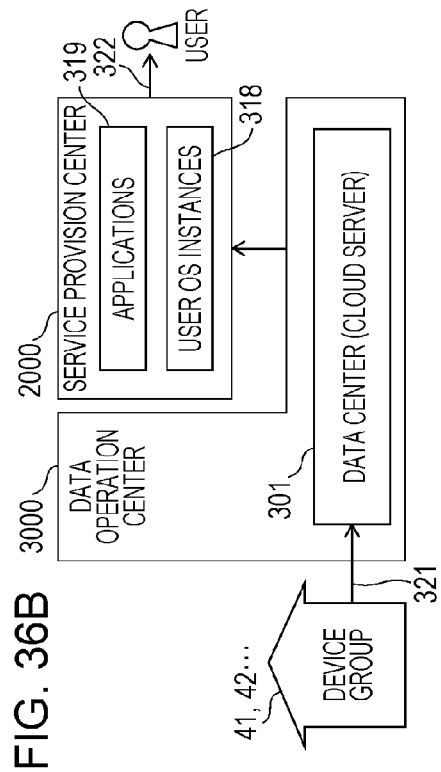
FIG. 36A is a drawing depicting service model 1 (type where a company itself serves as a data center).

FIG. 36A depicts service model 1 (type where a company itself serves as a data center). This model is a model in which the service provision center 2000 acquires information from the device group 1000, and provides a service to a user. In this model, the service provision center 2000 has the functions of a data center operation company. In other words, the service provider possesses the cloud server 301 that manages big data. Accordingly, there is no data center operation company.

In this model, a data center of the service provision center 2000 operates and manages the cloud server 301. Furthermore, the service provision center 2000 manages the user OS instances 318 and the applications 319. The service provision center 2000 uses the user OS instances 318 and the applications 319 managed by the service provision center 2000 to provide services 322 to the user.

(Service Model 2: IaaS-Utilizing Type)

Figure 36C:
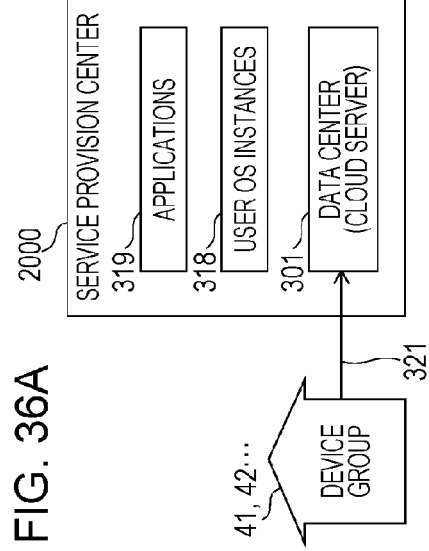
FIG. 36C is a drawing depicting service model 3 (PaaS-utilizing type).
Figure 36B:
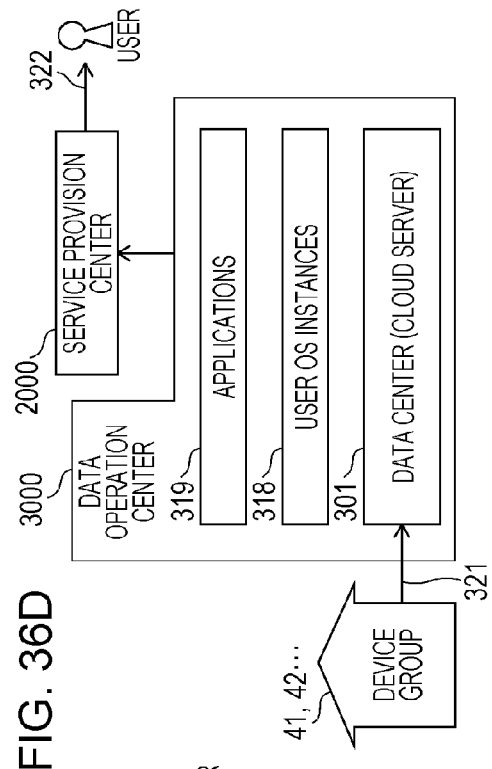
FIG. 36B is a drawing depicting service model 2 (IaaS-utilizing type).

FIG. 36B depicts service model 2 (IaaS-utilizing type). IaaS here is an abbreviation for infrastructure as a service, and is a cloud service provision model in which an infrastructure for constructing and running a computer system is itself provided as a service via the Internet.

In this model, a data center operation company operates and manages a data center 301 (this corresponds to the cloud server 301). Furthermore, the service provision center 2000 manages the user OS instances 318 and the applications 319. The service provision center 2000 uses the user OS instances 318 and the applications 319 managed by the service provision center 2000 to provide services 322 to the user.

(Service Model 3: PaaS-Utilizing Type)

FIG. 36C depicts service model 3 (PaaS-utilizing type). PaaS here is an abbreviation for platform as a service, and is a cloud service provision model in which a platform that is a foundation for constructing and running software is provided as a service via the Internet.

In this model, the data operation center 3000 manages the user OS instances 318, and operates and manages a data center 301 (corresponds to the cloud server 301). Furthermore, the service provision center 2000 manages the applications 319. The service provision center 2000 uses the user OS instances 318 managed by the data center operation company and the applications 319 managed by the service provision center 2000 to provide services 322 to the user.

(Service Model 4: SaaS-Utilizing Type)

Figure 36D:
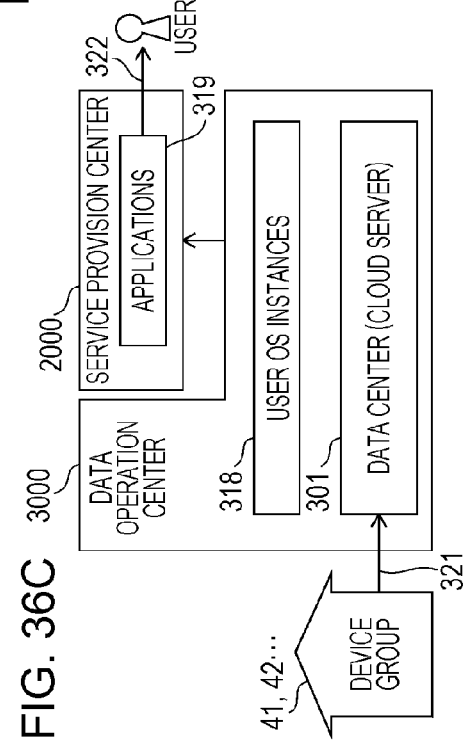
FIG. 36D is a drawing depicting service model 4 (SaaS-utilizing type).

FIG. 36D depicts service model 4 (SaaS-utilizing type). SaaS here is an abbreviation for software as a service, and is a cloud service provision model that has a function with which it is possible for, for example, a company/individual (user) that does not possess a data center (cloud server) to use an application provided by a platform provider that does possess a data center (cloud server), via a network such as the Internet.

In this model, the data operation center 3000 manages the applications 319, manages the user OS instances 318, and operates and manages a data center 301 (corresponds to the cloud server 301). Furthermore, the service provision center 2000 uses the user OS instances 318 and the applications 319 managed by the data operation center 3000 to provide services 322 to the user.

The main entity for providing services is the service provision center 2000 in all of the aforementioned models. Furthermore, for example, it is possible for the development of an OS, an application, or a database for big data and so forth to be carried out by the service provider or the data center operation company itself, or to be outsourced to a third party.

Next, the communication sequence when the collection of observation information logs and provision are carried out via a cloud server is described.

FIG. 37A is a basic representation of the communication sequence between the cloud server 301 and the tablet terminal 80. In FIG. 37A, sensors 41 and 42 that are devices connect to a network (S501), and transmit observation information logs to the cloud server 301 for processing 1 to 3 to be carried out in one batch by the cloud server 301. This processing 1 (step S503), processing 2 (step S504), and processing 3 (step S505) are the plurality of procedures indicated in the first embodiment extracted and shown as three items of processing. Specifically, the collection of sales information and observation information is processing 1, the classification of merchandising values by association of the determination of a reference store and lighting modes with merchandising values is processing 2, and the display of classified merchandising values is processing 3.

Command transmission (step S506) represents the processing result of these items of processing 1 to 3. In the tablet terminal 80, display is carried out in accordance with the transmitted command (step S507). FIG. 37B is a variation of FIG. 37A, and depicts a sequence in which processing 3 from among processing 1 to 3 carried out by the cloud server 301 is executed at the tablet terminal 80 side. FIG. 37C is yet another variation of FIG. 37A, and depicts a sequence in which processing 2 and 3 from among processing 1 to 3 carried out by the cloud server 301 are executed at the tablet terminal 80 side.

According to the present embodiment as described above, an application that corresponds to the merchandising value generation unit 71, an application that corresponds to the merchandising value classification unit 72, and an application that corresponds to the store information determination unit 73 are loaded in a cloud server, and the classification of merchandising values by adding lighting mode information to merchandising values, and the generation of a store image in which the classification result is depicted are carried out on the cloud server, and it is therefore possible to realize the provision of merchandising information having high scalability.

It should be noted that, in the fourth embodiment, it is desirable for a private corporate network, a service provider network, and a cloud network to each be configured by using a packet switching network. It is desirable for the cloud network to be configured by using a virtual stub that is identified by a common VLAN tag, in a virtual private network (VPN) constructed using a layer-3 protocol such as multiprotocol label switching (MPLS). In a customer's private network, it is desirable for a network node that functions as a router or a switch to be capable of layer-3 communication in which MPLS (L3MPLS) is used, and to be capable of layer-2 communication in which Ethernet and virtual private LAN services (VPLS) are used.

Furthermore, it is desirable for an autoscaler to be implemented for the cloud server indicated in the fourth embodiment. An autoscaler carries out performance monitoring, scaling management, and instance management. In performance monitoring, the performance data of a series of user OS instances is collected, system performance is calculated based on a performance metric calculated based on the collected performance data, and a metric indicating the average number of requests completed each second and the response time and so forth is generated. In scaling management, it is evaluated whether or not resources in the cloud network are to be adjusted in response to an elastic request or an inelastic request. In instance management, connection is made to a series of server OS instances via a secure plane connection in the data link layer, and server OS instances generated in the cloud network are managed. In addition, it is desirable for a load distribution device to be implemented for the cloud network of the fourth embodiment. A load distribution device connects to a series of user OS instances via a secure plane connection in the data link layer, and distributes work between an internal server and/or the series of user OS instances. This distribution may include methods such as weighted round-robin, shortest connection, and fastest processing.

In the fourth embodiment, the number of times a store visitor has stayed, the number of times a store visitor has extended a hand, and the number of sales that are accumulated daily for each product shelving unit in a large number of stores are managed, and consequently the amount of data therefor becomes very large. However, because the aforementioned autoscaler and load distribution device vary the number of generated user OS instances in accordance with the requests from the tablet terminal 80, it is possible to respond to information provision requests from the tablet terminal 80 in a prompt manner even when the number of times a store visitor has stayed, the number of times a store visitor has extended a hand, and the number of sales that are accumulated daily from a large number of stores come to a very large amount of data.

<Remarks>

Heretofore, at the time of filing the present application, the best embodiments known by the applicant have been described; however, further improvements and modifications may be added with regard to the technical topics indicated hereinafter. It is to be noted that whether the present disclosure is carried out as indicated in the embodiments, and whether or not these improvements/modifications are carried out are both optional and are dependent upon the view of the person carrying out the present disclosure.

<Link with POS Terminal Network>

In the embodiments, sales information is made into a database. However, with regard to existing stores, not to mention stores to be newly opened in the future, product sales are managed in a POS terminal network, and the latest sales figures are acquired from the POS terminal network. Thus, the latest sales figures may be acquired from the POS terminal network, and these may be targeted for classification as merchandising values. Consequently, the POS (point of sale) terminal network is a network in which register devices equipped with a code scanner are configured as terminals. The POS terminals transmit, to a franchise chain center, the registration of input/output funds and the type and number of products when there has been a sale.

The number of purchased products is acquired from the POS terminal network, and processing to convert the number of purchases for each product shelving unit into sales information is carried out. The sales information obtained by the conversion is than targeted for classification as merchandising values.

When calculating the merchandising values, information regarding purchased products is acquired from the POS terminal network, and this is converted into the number of purchases for each product shelving unit to obtain the number of purchases, and therefore the display of graphics for the number of purchases can be performed based on the actual number of purchases. It is possible to avoid unnecessary actions such as double management of the number of purchases by the POS terminal network and the system, and system efficiency can be increased.

<Specific Configuration of the Lighting Lamp Control Unit 12>

The lighting lamp control unit 12 may be configured from a programmable logic controller (PLC) and an operation display, and color temperature control and tone control may be executed by sending dimming analog signals from the PLC to an LED constant-current power source to thereby vary the current applied to the lighting lamps 11 provided in the ceiling. Furthermore, tone control may be executed by constant-current driving the LED light sources that make up the ceiling lighting.

<Variations According to Time Period and Season>

It is common for color temperature and illuminance to be varied in accordance with the time period of the business hours of the store. With regard to lighting variations that correspond to the time period, the color temperature and the illuminance are set to 75% when people are going to work, and the color temperature and the luminance are varied within the range of 60% to 90% in the afternoon. When people are leaving work, the color temperature and the luminance are set to 100% to promote activity, and at night the color temperature and the luminance are reduced within the range from 100% to 50% to produce a feeling of relaxation. With regard to lighting variations that correspond to the season, in the summer season, the white color setting is the main variation implemented in the lighting variations that correspond to the time period, and during the night in the winter season, the warm white color is the main variation.

The lighting mode expected to have the greatest commercial effect may be selected by varying the lighting mode selection in each time period in week units and month units, collecting merchandising values together with this, and using lighting mode information to store the collected merchandising values. In addition, the lighting mode may involve spotlight control in which the direction of light is moved. Light mapping control such as projecting some form of pattern may also be involved.

<Targets for Tone Control>

Colors that are targeted for tone control may be colors that are named according to a function (functional colors). Each of a plurality of lighting modes for merchandising value classification may instruct the setting of functional colors to lighting equipment. Such functional colors include a daytime white color, an electric bulb color, a sepia color, a beautifying light color that causes the color of skin to appear beautiful, and a color-enhancing light color that causes groceries to appear fresh and delicious.

<Display Store Image in which Color Conversion Based on Lighting Mode has been Carried Out>

A store image in which color conversion based on a lighting mode has been carried out may be displayed in association with a classification result for merchandising values. In this color conversion, the luminance and color differences of all pixels in the store image are converted by tone control and temperature color control in the lighting mode. The way in which the store space changes due to the tone control and the temperature color control in the lighting mode, and the type of change that the aforementioned change brings about in sales and store visitor behavior are visually represented in the store image. The content of FIG. 9 may be displayed as a GUI. A plurality of store images in which color conversion based on a lighting mode has been carried out are displayed together with merchandising values along a time axis. Thus, the way in which the selection of the lighting mode in each time period on the time axis affects the merchandising values is visually understood.

<Screen Image Variations>

The screen images from FIG. 20 to FIG. 24 are merely examples of GUIs constructed by combining various widgets. The screen images of each embodiment may take any form as long as the purpose thereof is to promote product sales by a store. Specifically, the screens displayed by the display unit 81 broadly include GUIs created according to principles such as the following.

(i) When evaluating the product shelving unit layout in a store, in the case where it is desired for the selection of some form of information element to be received, the display unit 81 provides widgets such as a "toggle button", a "radio button", a "list box", a "slider", a "check box", a "spin button (drop-down list)", a "toolbar", a "combo box", an "icon", and a "tree view" for display. A "toggle button" is a widget of which the state changes each time it is pressed. A "radio button" is a widget that allows the input unit 82 to choose one from among a plurality of options. A "list box" is a widget that allows the input unit 82 to receive an operation that selects one or more items from items in the form of a list. A "check box" is a widget that allows the input unit 82 to receive whether or not an item is checked. A "slider" is a widget used to set some kind of value by moving a scrollbar. A "spin button (drop-down list)" is a widget similar to a list box, and ordinarily displays only a selected item. A "toolbar" is a widget configured from buttons and icons arranged in a line vertically or horizontally.

A "combo box" is a widget in which a menu or a list box is added to a text box. A "icon" is a widget for representing individual items that are able to be individually selected. A "tree view" is a widget that represents a tree structure. For example, in the case where a product shelving unit is represented by an icon, it is feasible for the relationship between the product shelving unit and the plurality of products displayed therein to be expressed in a tree view. A "grid view" is a widget having a tabular form corresponding to an array.

(ii) When evaluating the product shelving unit layout in a store, in the case where it is desired for user operations to be guided, widgets such as a "tab" and a "scrollbar" are used. A "tab" is a widget shaped like the tab of a folder, and switches between and displays various items in the same region on a screen. A "scrollbar" is a widget used to display, in a region on a screen, information that is larger than that region.

(iii) When evaluating the product shelving unit layout in a store, in the case where it is desired for text input to be received, a widget such as a "text box" or a "combo box" is used. A "text box" is a widget that allows the user to input text (a character string). A "combo box" is a widget in which a menu or a list box is added to a text box.

(iv) When evaluating the product shelving unit layout in a store, in the case where a response to a user operation is to be fed back to the user, widgets such as a "label", a "tooltip", a "balloon help", a "progress bar", and an "infobar" are used.

A "label" is a static widget for displaying text. A "tooltip" is a widget that is displayed when a finger or a mouse cursor is pointing at an item. A "balloon help" is a widget that is similar to a tooltip. A "status bar" is a widget that displays various kinds of information in the lowermost portion of an ordinary window. A "progress bar" is a widget that displays the progress state of some kind of task, and an "infobar" is a widget that is displayed below a toolbar in a browser.

(v) When evaluating the product shelving unit layout in a store, when image data in the JPEG, TIFF, or GIF formats or the like and document data in the HTML or XML formats are to be displayed, widgets such as a "modal window" and a "palette window" are used. A "modal window" is a child window that does not return control to a parent window when the user does not return some kind of response. A "dialog box" is a window that conveys information such as an error message to the user. A "palette window" is a child window that represents various kinds of functions (also referred to as a utility window). When image data obtained by capturing a scene inside a store, image data obtained by capturing the vicinity of a product shelving unit, sales slip data, and delivery data are to be displayed, the display unit 81 uses a widget such as a "modal window" or a "palette window" to provide this image data, sales slip data, and delivery data for display.

<Product Shelving Unit Icon Generation Method>

In the embodiments, the store screen has been configured from product shelving unit icons. However, the product shelving unit icons are merely exemplary. A virtual store image may be constructed by expressing product shelving unit icons by using a real three-dimensional model. In this case, the product shelving unit icons are configured from shape model data that specifies a product shelving unit shape in three-dimensional coordinates.

The display unit 81 of the tablet terminal 80 then carries out a series of drawing processing such as coordinate conversion, illuminance calculation, texture mapping, and viewport conversion with respect to the shape model data that specifies the product shelving units, and visualizes a three-dimensional model. In the texture mapping here, patterns and character strings that are suggestive of the products displayed in the product shelving units are attached. It thereby becomes possible to identify what kind of shelving unit each product shelving unit constitutes.

<All Lighting Control and Product Shelving Unit Lighting Control Variations>

In the lighting control of FIG. 25A and FIG. 25B, a determination is made as to a timeout of a timer for switching the lighting mode regardless of whether or not a store visitor is present; however, the time out determination may be made only when a store visitor is present. A variation for executing a timeout determination only when a store visitor is present is depicted in FIG. 38. In FIG. 38A, a variable that is a store visitor counter is introduced, and if the store visitor counter is not 0, a timeout determination is carried out. Hereinafter, these flowcharts are described.

FIG. 38A is a flowchart depicting a processing procedure for ceiling lighting control for the case where a timeout is determined when a store visitor is present. In step S51, a timer is reset and a counter is started, and in step S52, one lighting mode is set to the current mode. Thereafter, processing transfers to the loop of step S53 to step S55. Step S53 is entry detection, and step S54 is leaving detection. Step S55 is a determination as to whether or not the store visitor counter is 0. If the store visitor counter is 0, "yes" is determined in S55 and processing returns to S53, and this loop is simply repeated.

If "yes" is determined in step S53, the store visitor counter in S56 is incremented. If "yes" is determined in step S54, the store visitor counter is decremented in S57.

Through decrementing the store visitor counter as described above, if the store visitor counter becomes a value of 1 or greater, "no" is determined in step S55 and processing transfers to step S58, and it is determined whether or not the timer has timed out. If the timer has not timed out, processing transfers to step S53. If the timer has timed out, "yes" is determined in step S58 and a separate lighting mode is selected as the current mode (step S59), the timer is reset and the counter is started (step S60), and processing returns to step S53.

Figure 38B:
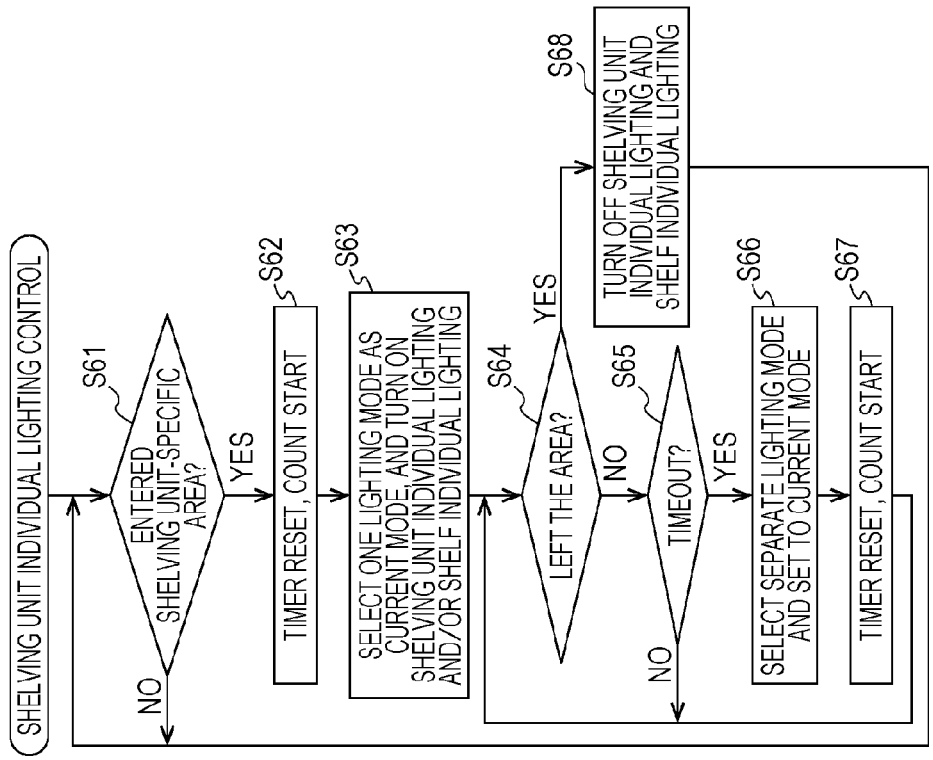
FIG. 38B is a flowchart depicting a product shelving unit individual lighting procedure for the case where a timeout is determined when a store visitor is present.
Figure 38A:
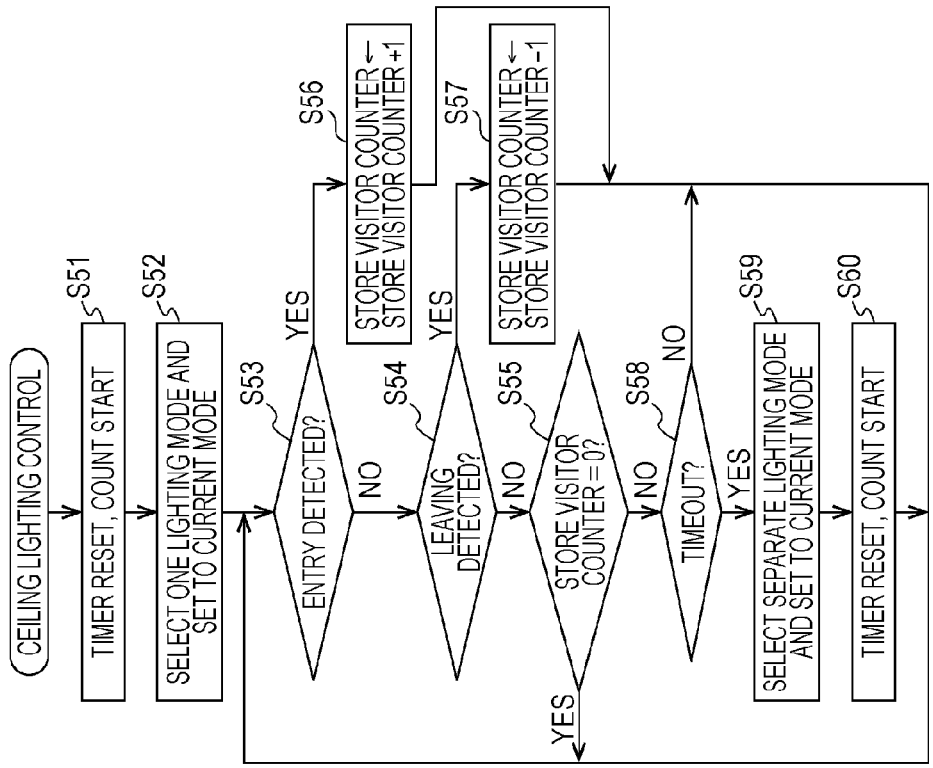
FIG. 38A is a flowchart depicting a processing procedure for ceiling lighting control for the case where a timeout is determined when a store visitor is present.

FIG. 38B is a flowchart depicting a product shelving unit individual lighting procedure for the case where a timeout is determined when a store visitor is present. Step S61 is a determination as to whether or not entry to a product shelving unit-specific area has been detected. If detected, the timer is reset, the counter is started (step S62), one mode is set as the current mode and product shelving unit individual lighting is turned on (step S63), and processing transfers to the loop of step S64 to step S66. Step S65 is a determination as to whether or not a timeout has occurred. If a timeout has occurred, a separate lighting mode is selected as the current mode (step S66), the timer is reset, and the counter is started (step S67).

Step S64 is a determination as to whether or not a store visitor has left the area. If the store visitor has left the area, the product shelving unit and shelf individual lighting is turned off in step S68. By associating the lighting mode chosen by the lighting control with a merchandising value, the accuracy of the merchandising value classification can be further increased.

<Embodiment as a Program>

The present disclosure may be configured as a program module that, by receiving the designation of a store and/or a product shelving unit as an argument and calling a desired application programming interface, returns a desired return value (MD value that has been classified according to a lighting mode). The program code that makes up the program module, namely the program code that causes the processing procedures of FIG. 25 to FIG. 27 and FIG. 30 to FIG. 32 to be carried out by a computer, can be created as follows. To begin, a software developer uses a programming language to write a source program that realizes each flowchart and the functional constituent elements. When writing the source program, the software developer uses class structures, variables, array variables, and external function calls in accordance with the syntax of the programming language to write a source program that embodies each flowchart and the functional constituent elements.

The written source program is passed to a compiler as a file. The compiler interprets this source program and generates an object program. The interpreting by the compiler is made up of processes such as parsing, optimization, resource allocation, and code generation. The program code generated by the code generation includes various types such as processor native code and byte code. The program code may be provided from an application provider server to a plurality of computers in a distributed environment, and may be recorded on a non-transitory computer-readable recording medium and provided to a user.

It should be noted that an invention having a following aspect is included in the aforementioned specific embodiments.

A first aspect of the present disclosure is an information display method in a control system in which a lighting mode is selected from among a plurality of lighting modes, and lighting equipment is controlled at a lighting target area in accordance with the selected lighting mode, the lighting target area including an entirety of at least one store or a portion of the at least one store, the method comprising: generating merchandising values regarding the at least one store, each of the merchandising values representing an index for evaluating a performance of the at least one store; classifying each of the merchandising values in according with each of time periods in which each of the merchandising values is generated; obtaining lighting mode information from the control system, the lighting mode information indicating the lighting mode selected in each of the time periods; and transmitting to the terminal device, each of the classified merchandising values and each pieces of the obtained lighting mode information corresponding to each of the classified merchandising values, in each of the time periods, to display at the terminal device each of the classified merchandising values and each pieces of the obtained lighting mode information.

According to the present aspect, by displaying lighting mode information in association with merchandising values indicating an index for evaluating the performance of a store, the user is able to easily comprehend the causal relationship between lighting mode selection and store visitor behavior. Thus, the user is able to appropriately select a lighting mode in accordance with the characteristics of the ceiling lighting and the shelving unit lighting while the independence of the control system for the ceiling lighting and the control system for the store lighting is maintained.

In the aforementioned aspect, the information display method may further comprising: obtaining from the control system, sales amount information indicating a sales amount for the lighting target area, wherein one of the merchandising values is generated according to the sales amount information, and the merchandising values corresponding to the sales amount information is classified according a first time period in which the sale amount information is obtained from the control system, among the time periods.

According to the present aspect, because a sales amount serving as a merchandising value and lighting mode information corresponding to the sales amount are displayed, the user is able to comprehend an appropriate lighting mode for improving the sales amount of the store.

In the aforementioned aspect, the information display method may further comprising: obtaining from the control system, first visitor number information indicating a number of store visitors who have entered the lighting target area, wherein one of the merchandising values is generated according to the first visitor number information, and the merchandising values corresponding to the first visitor number information is classified according a second time period in which the first visitor number information is obtained from the control system, among the time periods.

According to the present aspect, because the number of times a store visitor has been detected entering the lighting target area, which serves as a merchandising value, and the lighting mode information corresponding to that number of times are displayed, the user is able to comprehend an appropriate lighting mode for improving the number of store visitors, and an appropriate lighting mode for improving the interest of store visitors toward a product.

In the aforementioned aspect, the information display method may further comprising: obtaining from the control system, second visitor number information indicating a number of store visitors who have been detected to extend hands toward the lighting target area, wherein the lighting target area includes a product shelving unit installed inside the store, one of the merchandising values is generated according to the second visitor number information, and the merchandising values corresponding to the second visitor information is classified according a third time period in which the second visitor number information is obtained from the control system, among the time periods.

According to the present aspect, because the number of times a store visitor has been detected extending a hand toward the lighting target area, which serves as a merchandising value, and the lighting mode information corresponding to that number of times are displayed, the user is able to comprehend an appropriate lighting mode for improving the interest of store visitors toward a product.

In the aforementioned aspect, the information display method may further comprising: obtaining from the control system, stay number information indicating a number of store visitors who have been detected to stay for a fixed time or more in front of the lighting target area, wherein the lighting target area includes a product shelving unit installed inside the store, one of the merchandising values is generated according to the stay number information, and the merchandising values corresponding to the stay number information is classified according a fourth time period in which the stay number information is obtained from the control system, among the time periods.

According to the present aspect, because the number of store visitors who have stayed for a fixed time or more in front of the lighting target area, which serves as a merchandising value, and the lighting mode information corresponding to that number of store visitors are displayed, the user is able to comprehend an appropriate lighting mode for improving the interest of store visitors toward a product.

In the aforementioned aspect, the information display method may further comprising: obtaining from the terminal device an instruction indicating the lighting target area for which one merchandising value is to be displayed, among the classified merchandising values wherein the one merchandising value and a piece of the lighting mode information corresponding to the one merchandising value are displayed at the terminal device in accordance with the instruction.

According to the present aspect, because the lighting target area is designated by the user, and a merchandising value for the area corresponding to the operation of the user and corresponding lighting mode information are displayed, the user is able to comprehend the relationship between the lighting mode that improves the performance of the store and the area.

In the aforementioned aspect, the merchandising values may include a first merchandising value and a second merchandising value, the first merchandising value is generated for a first store, the second merchandising value is generated for a second store, and the lighting mode information may include first lighting mode information corresponding to the first merchandising value, and second lighting mode information corresponding to the second merchandising value.

According to the present aspect, because the first merchandising value relating to the first store and the corresponding first lighting mode information, the second merchandising value relating to the second store and the corresponding second lighting mode information are displayed, the user is able to compare relationships between merchandising values and lighting modes in the first store and the second store. Thus, the user is able to comprehend the trends of lighting modes that improve lighting mode store performance.

In the aforementioned aspect, lighting mode information to be displayed by the terminal device and the store in which the merchandising value corresponding to the lighting mode information has been generated may be determined based on a store database that manages store information including any of at least sales information, size information, location area information, and location condition information for the at least one store, and based on input data corresponding to the store information input by a user, and the terminal device associates and displays the merchandising value generated in the determined store and the lighting mode information corresponding to the merchandising value.

According to the present aspect, because a store that matches input data corresponding to store information input by the user is determined from the store database, and a merchandising value relating to the determined store and corresponding lighting mode information are displayed, the user is able to compare relationships between the store features and lighting modes that improve store performance. Thus, the user is able to comprehend lighting mode trends that improve store performance for each store feature.

A second aspect of the present disclosure is a lighting control method in a control system in which a lighting mode is selected from among a plurality of lighting modes, and lighting equipment is controlled at a lighting target area in accordance with the selected lighting mode, the lighting target area including an entirety of at least one store or a portion of the at least one store, the lighting control method comprising: generating merchandising values regarding the at least one store, each of the merchandising values representing an index for evaluating a performance of the at least one store; classifying each of merchandising values in accordance with each of time periods in which each of the merchandising values is generated, each of the merchandising values being generated in the at least one store and representing an index for evaluating a performance of the at least one store; obtaining from the control system lighting mode information, the lighting mode information indicating each of the lighting modes selected in each of the time periods in which each of the classified merchandising values is generated; determining one lighting mode among the plurality of the lighting modes for the lighting target area, based on each of merchandising values and the obtained lighting mode information; and outputting a control command for lighting the lighting target area in the determined one lighting mode, to a network connected to the lighting equipment.

According to the present aspect, by displaying lighting mode information in association with merchandising values indicating an index for evaluating the performance of a store, the user is able to easily comprehend the causal relationship between lighting mode selection and store visitor behavior. Thus, the user is able to appropriately select a lighting mode in accordance with the characteristics of the ceiling lighting and the shelving unit lighting while the independence of the control system for the ceiling lighting and the control system for the store lighting is maintained.

In the aforementioned aspect, the lighting control method may further comprising: periodically repeating a first interval and a second interval, in the first interval each of the plurality of lighting modes being selected and the lighting target area being lit in accordance with the selected lighting mode, and in the second interval the lighting target area being lit in accordance with the one lighting mode determined from the plurality of lighting modes; determining the one lighting mode in the first interval; and controlling the lighting equipment for the lighting target area in accordance with the determined one lighting mode, in the second interval.

According to the present aspect, the user is able to comprehend a suitable lighting mode for improving store performance in the first interval, and lighting control is able to be performed in a suitable lighting mode in the second interval.

The present disclosure makes it possible to manage a large number of stores operated according to merchandising contracts, and may therefore be used in store expansion by franchise contracts.

What is claimed is:

1. An information display method in a control system in which a lighting mode is selected from a plurality of lighting modes, and each of a plurality of lighting equipment is controlled at each of a plurality of lighting target areas in a store in accordance with the selected lighting mode, the method comprising:
  generating, using a processor of a computer, merchandising values regarding the at least one store, each of the merchandising values being a basis for evaluating a performance of the store;
  classifying, using the processor, each of the merchandising values in accordance with each of time periods in which each of the merchandising values is generated;
  obtaining a plurality of lighting mode information, associated with the plurality of electric equipment controlled by a lighting controller, from the control system, each of the plurality of lighting mode information indicating the lighting mode selected in each of the time periods; and transmitting, with a transmitter, to a terminal device, each of the classified merchandising values and the plurality of lighting mode information corresponding to each of the classified merchandising values, in each of the time periods, to display at the terminal device each of the classified merchandising values and the plurality of lighting mode information, wherein each of the plurality of lighting mode information includes information indicating a corresponding target area, a parameter instructing color temperature control for the corresponding lighting equipment, and a value instructing tone control for the corresponding lighting equipment, wherein the plurality of lighting target areas comprise at least a ceiling of the store and a plurality of product shelves provided in the store, wherein the parameter instructing color temperature control designates a brightness of the corresponding lighting equipment, and wherein the value instructing tone control designates at least one of a color temperature of the corresponding lighting equipment and an RGB mixture ratio of the corresponding lighting equipment.

2. The information display method according to claim 1, further comprising:

obtaining, from the control system, sales amount information indicating a sales amount for the store, wherein one of the merchandising values is generated according to the sales amount information, and the merchandising values corresponding to the sales amount information is classified according to a first time period in which the sales amount information is obtained from the control system, of the time periods.

3. The information display method according to claim 1, further comprising:

obtaining, from the control system, first visitor number information indicating a number of store visitors who have entered the store or each portion of the store corresponding to each of the plurality of lighting target areas, wherein the ceiling of the store comprises one of the plurality of lighting target areas, each of the plurality of product shelves comprises one of the plurality of lighting target areas, one of the merchandising values is generated according to the first visitor number information, and the merchandising values corresponding to the first visitor number information is classified according a second time period in which the first visitor number information is obtained from the control system, among the time periods.

4. The information display method according to claim 1, further comprising:

obtaining from the control system, second visitor number information indicating a number of store visitors who have been detected as extending at least one hand toward a product in each of the plurality of lighting target areas, corresponding to each of the plurality of product shelves, wherein one of the merchandising values is generated according to the second visitor number information, and the merchandising values corresponding to the second visitor information is classified according a third time period in which the second visitor number information is obtained from the control system, among the time periods.

5. The information display method according to claim 1, further comprising:

obtaining, from the control system, stay number information indicating a number of store visitors who have been detected as staying for at least a predetermined time in front of each of the plurality of lighting target areas corresponding to each of the plurality of product shelves, wherein one of the merchandising values is generated according to the stay number information, and the merchandising values corresponding to the stay number information is classified according a fourth time period in which the stay number information is obtained from the control system, among the time periods.

6. The information display method according to claim 1, further comprising:

obtaining, from the terminal device, an instruction indicating one of the plurality of lighting target areas for which one merchandising value is to be displayed, among the classified merchandising values wherein one of the plurality of lighting mode information corresponding to the indicated lighting area and one corresponding merchandising value are displayed at the terminal device in accordance with the instruction.

7. The information display method according to claim 6, further comprising displaying, at the terminal device, a layout image including an arrangement layout regarding a plurality of product shelves in the store.

8. A lighting control method in a control system in which a lighting mode is selected from a plurality of lighting modes, and each of a plurality of lighting equipment is controlled at each of a plurality of lighting target areas in a store in accordance with the selected lighting mode, the lighting control method comprising:

generating, using a processor of a computer, merchandising values regarding the store, each of the merchandising values being a basis for evaluating a performance of the store;

classifying, using the processor, each of merchandising values in accordance with each of time periods in which each of the merchandising values is generated, each of the merchandising values being generated in the store and being a basis for evaluating a performance of the store;

obtaining, from the control system, a plurality of lighting mode information, associated with the plurality of electric light equipments controlled by a lighting controller, each of the plurality of lighting mode information indicating each of the lighting modes selected in each of the time periods in which each of the classified merchandising values is generated;

determining one lighting mode of the plurality of the lighting modes for each of the plurality of lighting target areas, based on each of merchandising values and the obtained lighting mode information; and outputting a control command for lighting each of the plurality of lighting target areas in the determined one lighting mode, to a network connected to the lighting equipment, wherein each of the plurality of lighting mode information includes information indicating a corresponding target area, a parameter instructing color temperature control for the corresponding lighting equipment, and a value instructing tone control for the corresponding lighting equipment, wherein the plurality of lighting target areas comprise a ceiling of the store and a plurality of product shelves in the store, wherein the parameter instructing color temperature control designates a brightness of the corresponding lighting equipment, and wherein the value instructing tone control designates at least one of a color temperature of the corresponding lighting equipment and an RGB mixture ratio of the corresponding lighting equipment.

9. The lighting control method according to claim 8, further comprising:

obtaining, from the control system, sales amount information indicating a sales amount for the store, wherein one of the merchandising values is generated according to the sales amount information, and the merchandising values corresponding to the sales amount information is classified according a first time period in which the sales amount information is obtained from the control system, of the time periods.

10. The lighting control method according to claim 8, further comprising:

obtaining, from the control system, first visitor number information indicating a number of store visitors who have entered the store or each portion of the store corresponding to each of the lighting target areas, wherein the ceiling of the store comprises one of the plurality of lighting target areas, each of the plurality of product shelves comprises one of the plurality of lighting target areas, one of the merchandising values is generated according to the first visitor number information, and the merchandising values corresponding to the first visitor number information is classified according a second time period in which the first visitor number information is obtained from the control system, among the time periods.

11. The lightning control method according to claim 8, further comprising:

obtaining from the control system, second visitor number information indicating a number of store visitors who have been detected as extending at least one hand toward a product in each of the plurality of lighting target areas corresponding to each of the plurality of product shelves, wherein one of the merchandising values is generated according to the second visitor number information, and the merchandising values corresponding to the second visitor information is classified according a third time period in which the second visitor number information is obtained from the control system, among the time periods.

12. The lighting control method according to claim 8, further comprising:

obtaining from the control system, stay number information indicating a number of store visitors who have been detected as staying at least a predetermined time in front of each of the plurality of lighting target areas corresponds to each of the plurality of product shelves, wherein one of the merchandising values is generated according to the stay number information, and the merchandising values corresponding to the stay number information is classified according a fourth time period in which the stay number information is obtained from the control system, among the time periods.

13. The lighting control method according to claim 8, further comprising:

obtaining from the terminal device, an instruction indicating one of the plurality of lighting target areas for which one merchandising value is to be displayed, among the classified merchandising values wherein one of the plurality of lighting mode information corresponding to the indicated lighting area and one corresponding merchandising value are displayed at the terminal device in accordance with the instruction.

14. The lighting control method according to claim 13, further comprising displaying, at the terminal device, a layout image including an arrangement layout regarding the plurality of product shelves in the store.

15. The lighting control method according to claim 8, further comprising:

periodically repeating a first interval and a second interval, wherein in the first interval each of the plurality of lighting modes are selected and each of the plurality of lighting target areas are lit in accordance with the selected lighting mode, and in the second interval, each of the lighting target areas are lit in accordance with the one lighting mode determined from the plurality of lighting modes;

determining the one lighting mode in the first interval; and controlling the plurality of lighting equipment for the lighting target areas in accordance with the determined one lighting mode, in the second interval.

* * * * *